US012710551B2

(12) United States Patent
Moore et al.

(10) Patent No.: US 12,710,551 B2
(45) Date of Patent: Aug. 18, 2026

(54) ANIMAL TRACKING SYSTEM USING HIGH-ACCURACY POSITIONING

(71) Applicant: Radio Systems Corporation, Knoxville, TN (US)

(72) Inventors: Pete Moore, Knoxville, TN (US); Marc Brush, Knoxville, TN (US); Ben Prothro, Knoxville, TN (US); Kenneth Wacasey, Knoxville, TN (US); Rick Seltzer, Knoxville, TN (US); Kaleigh Veca Smith, Knoxville, TN (US)

(73) Assignee: Radio Systems Corporation, Knoxville, TN (US)

( * ) Notice: Subject to any disclaimer, the term of this patent is extended or adjusted under 35 U.S.C. 154(b) by 0 days.

(21) Appl. No.: 18/941,818

(22) Filed: Nov. 8, 2024

(65) Prior Publication Data

US 2025/0155587 A1 May 15, 2025

Related U.S. Application Data

(60) Provisional application No. 63/649,171, filed on May 17, 2024, provisional application No. 63/597,993, filed on Nov. 10, 2023.

(51) Int. Cl.
*G01S 19/40* (2010.01)
*A01K 11/00* (2006.01)
(Continued)

(52) U.S. Cl.
CPC ............ *G01S 19/40* (2013.01); *A01K 11/008* (2013.01); *A01K 15/021* (2013.01);
(Continued)

(58) Field of Classification Search
CPC .... A01K 11/006; A01K 11/008; A01K 15/02; A01K 15/023; A01K 29/005;
(Continued)

(56) References Cited

U.S. PATENT DOCUMENTS 7,034,695 B2 * 4/2006 Troxler ................ A01K 15/023 340/539.11
7,602,302 B2 10/2009 Hokuf et al.
(Continued)

FOREIGN PATENT DOCUMENTS

CN 114779302 A 7/2022
EP 4029372 A1 7/2022
(Continued)

OTHER PUBLICATIONS

Decawave, DWM1001 System Overview and Performance, Version 2.1, 2018, 43 pages.
(Continued)

*Primary Examiner* — Stephen R Burgdorf
(74) *Attorney, Agent, or Firm* — Merchant & Gould P.C.

(57) ABSTRACT

An animal tracking system is provided which include various features that are enabled using satellite-based positioning systems, but further are enabled by fine accuracy position detection, such as may be made available through use of realtime kinematic (RTK) positioning or post-processing kinematic (PPK) positioning technologies. These include, for example, various usage techniques in terms of set up and use of virtual boundaries to define containment areas and or exclusion zones, and to both see historical animal positioning within a containment zone and determine likely animal behaviors based on such positioning. Additionally, fine-grained indoor location via radio frequency technologies, switchover among locating technologies, and power management techniques are described, as well as uses thereof.

24 Claims, 53 Drawing Sheets

(51) Int. Cl.

| | |
|---|---|
| ***A01K 15/02*** | (2006.01) |
| ***A01K 27/00*** | (2006.01) |
| ***G01S 19/14*** | (2010.01) |
| ***G01S 19/43*** | (2010.01) |
| ***G01S 19/46*** | (2010.01) |
| ***G01S 19/48*** | (2010.01) |
| ***H04W 4/021*** | (2018.01) |

(52) U.S. Cl.

CPC ............ *A01K 27/009* (2013.01); *G01S 19/14* (2013.01); *G01S 19/43* (2013.01); *G01S 19/46* (2013.01); *G01S 19/48* (2013.01); *H04W 4/021* (2013.01)

(58) Field of Classification Search

CPC .......... G01S 19/14; G01S 19/41; G01S 19/42; G01S 19/43; G01S 19/48; G06F 3/001; G06Q 10/087; G08B 21/0272; H04B 17/00; H04W 52/367

USPC ........................................................ 340/573.1

See application file for complete search history.

(56) References Cited

U.S. PATENT DOCUMENTS

| | | | | |
|---|---|---|---|---|
| 8,587,476 | B2 * | 11/2013 | Hung | G01S 19/51 342/357.31 |
| 8,736,499 | B2 | 5/2014 | Goetzl et al. | |
| 8,897,541 | B2 | 11/2014 | Weisenburger et al. | |
| 8,934,923 | B1 | 1/2015 | Golden | |
| 8,947,240 | B2 | 2/2015 | Mainini | |
| 8,947,241 | B2 * | 2/2015 | Trenkle | A01K 15/021 340/573.3 |
| 8,955,462 | B1 | 2/2015 | Golden | |
| 9,258,982 | B1 | 2/2016 | Golden | |
| 9,861,080 | B1 | 1/2018 | Hathway et al. | |
| 9,924,314 | B2 | 3/2018 | Solinsky et al. | |
| 10,070,627 | B2 | 9/2018 | Tupin, Jr. et al. | |
| 10,349,631 | B2 | 7/2019 | Bonge, Jr. | |
| 10,575,134 | B2 | 2/2020 | Pegg et al. | |
| 10,605,926 | B2 | 3/2020 | Lie et al. | |
| 10,687,514 | B2 | 6/2020 | Sheldon et al. | |
| 10,863,718 | B1 * | 12/2020 | Lazarevic | A01K 15/023 |
| 10,939,250 | B2 | 3/2021 | Pegg et al. | |
| 11,576,243 | B2 | 2/2023 | Coleman | |
| 11,635,529 | B2 | 4/2023 | Pegg et al. | |
| 12,061,476 | B2 | 8/2024 | Zhou et al. | |
| 12,292,527 | B2 | 5/2025 | Rich et al. | |
| 2002/0196151 | A1 * | 12/2002 | Troxler | G08B 21/0277 340/573.3 |
| 2006/0061469 | A1 * | 3/2006 | Jaeger | G01S 5/0294 340/539.13 |
| 2011/0279323 | A1 * | 11/2011 | Hung | G01S 19/51 342/450 |
| 2011/0298619 | A1 * | 12/2011 | O'Hare | A61D 17/002 340/573.1 |
| 2012/0111286 | A1 * | 5/2012 | Lee | A01K 29/005 119/719 |
| 2012/0316771 | A1 * | 12/2012 | Damon | G01C 21/3626 701/442 |
| 2013/0281168 | A1 * | 10/2013 | Chawla | H04W 52/0254 455/574 |
| 2013/0326137 | A1 | 12/2013 | Bilange et al. | |
| 2014/0251232 | A1 * | 9/2014 | Bianchi | G08B 5/224 119/720 |
| 2015/0107531 | A1 * | 4/2015 | Golden | H04W 4/024 119/719 |
| 2016/0205898 | A1 * | 7/2016 | Perrine | A01K 27/001 |
| 2018/0184618 | A1 * | 7/2018 | Gotts | A01K 27/009 |
| 2019/0335415 | A1 | 10/2019 | Fu et al. | |
| 2020/0356088 | A1 | 11/2020 | Schlacks, IV et al. | |
| 2021/0000078 | A1 | 1/2021 | Lazarevic | |
| 2021/0112647 | A1 | 4/2021 | Coleman | |
| 2021/0165109 | A1 | 6/2021 | Yang et al. | |
| 2021/0190503 | A1 * | 6/2021 | Landers | A01K 15/023 |
| 2021/0274749 | A1 | 9/2021 | Wernimont et al. | |
| 2021/0410098 | A1 | 12/2021 | Bao et al. | |
| 2022/0075376 | A1 | 3/2022 | Zhou et al. | |
| 2022/0279760 | A1 | 9/2022 | Ehrman et al. | |
| 2022/0394516 | A1 | 12/2022 | Shire et al. | |
| 2022/0412758 | A1 | 12/2022 | Lv | |
| 2023/0280477 | A1 * | 9/2023 | Seth | G16H 50/30 342/357.23 |
| 2023/0320321 | A1 * | 10/2023 | Hipsley | A01K 27/009 119/859 |
| 2023/0345907 | A1 | 11/2023 | Smith | |
| 2024/0334902 | A1 * | 10/2024 | Scholz | G01S 19/04 |
| 2025/0049000 | A1 * | 2/2025 | Woodhouse | A01K 27/009 |
| 2025/0098634 | A1 * | 3/2025 | Russek-Sobol | A01K 29/005 |
| 2025/0126693 | A1 * | 4/2025 | Coleman | G01S 7/4815 |
| 2025/0130587 | A1 | 4/2025 | Kirk et al. | |
| 2025/0151697 | A1 | 5/2025 | Moore et al. | |
| 2025/0155584 | A1 | 5/2025 | Seltzer et al. | |
| 2025/0267778 | A1 | 8/2025 | Coleman | |
| 2025/0267779 | A1 | 8/2025 | Coleman | |
| 2025/0267780 | A1 | 8/2025 | Coleman | |
| 2025/0275032 | A1 | 8/2025 | Coleman | |
| 2025/0275035 | A1 | 8/2025 | Coleman | |
| 2025/0275036 | A1 | 8/2025 | Coleman | |
| 2025/0275039 | A1 | 8/2025 | Coleman | |

FOREIGN PATENT DOCUMENTS

| | | |
|---|---|---|
| KR | 10-2018-0029704 A | 3/2018 |
| WO | 2021063398 A1 | 4/2021 |

OTHER PUBLICATIONS

Waqar, Adnan, et al., Analysis of GPS and UWB positioning system for athlete tracking, Measurement: Sensors 14 (2021) 100036, 12 pages.

Qorvo, Getting Back to Basics with Ultra-Wideband (UWB), May 2021, 10 pages.

International Search Report for PCT/US2024/055257 mailed Feb. 19, 2025, 17 pages.

* cited by examiner

ANIMAL TRACKING SYSTEM USING HIGH-ACCURACY POSITIONING

CROSS-REFERENCE TO RELATED APPLICATIONS

This application claims the benefit of the U.S. Provisional Application No. 63/649,171, filed on May 17, 2024, and U.S. Provisional Application No. 63/597,993, filed on Nov. 10, 2023, the disclosures of which are hereby incorporated by reference in their entireties.

BACKGROUND

Use of global positioning systems (GPS) or other Global Navigation Satellite Systems (GNSS) has provided many opportunities for tracking a variety of subjects. For example, many smartphones use received GNSS data from navigation satellites to determine a location of the phone. A user can then see their phone location, accurate to within a few meters. This tracking feature allows others to find their phone, see a user location on a map, and even share one user's location with another user. Tracked location data from GPS/GNSS satellites also provides valuable data about a population's movement patterns which provides many opportunities for tracking health, providing advertisements, and tracking a user's daily routine.

In a particular example use, satellite-based positioning systems (inclusive of such GPS and/or GNSS systems) may be used to assist in containment systems. Containment systems often include a wireless communication device that has satellite tracking capabilities. A user can define a boundary surrounding an area of interest, and a wireless communication device can use GPS/GNSS tracking to determine if it has moved beyond the boundary. For example, an alarm may sound if a subject has moved past the boundary on a construction site where it can be difficult to determine a user's location without GPS/GNSS.

Such satellite-based positioning systems have, in recent years, been sought to be used in the context of animal tracking and containment. Physical fences can be expensive to build and maintain. Further, they cannot be removed once constructed. Further, underground wire fences, which utilize magnetic and/or very low frequency (VLF) RF signals to determine a position of a subject relative to the wire boundary, are also expensive to install since a trench must be dug to bury the wire. Underground wire fences also cannot be changed once buried. Thus, GPS/GNSS tracking of an animal tracking device provides containment capabilities without the need to install any other physical structures. In this context, an animal may wear a GPS/GNSS-enabled collar or other tracking device, and as the animal approaches a virtual boundary, the tracking device may then generate audio or other stimulus feedback indicating the animal should turn back.

Satellite-based containment systems have significant technical challenges. For example, satellite-based tracking is generally only accurate up to a few meters. Accordingly, in the context of animal containment, an animal may receive unexpected feedback, for example due to a false positive of the system determining the animal is outside the boundary, when the animal is in fact still within the boundary. Or, the system may fail to provide feedback until the animal is outside of the intended containment area, thereby potentially exposing the animal to hazardous conditions. Still further, a satellite-based location signal may be lost entirely, and a stimulus might not be generated at all, allowing the animal to pass the virtual boundary without receiving any feedback at all. These problems become worse when trees or houses obstruct the signal between the tracking device and the satellite. The imprecise nature of GPS/GNSS tracking results in limited capabilities of wireless animal containment. For example, virtual boundaries cannot be used where high accuracy is needed and animal tracking is not as accurate.

In addition to the above issues, satellite-based containment systems are generally limited to outdoor applications, as satellite reception may be unavailable or unpredictable indoors. Some wireless containment systems simply do not concern themselves with indoor animal monitoring, as it is assumed that the animal is indoors and therefore need not be further contained. Other systems use localized wireless communication devices (e.g., Bluetooth beacons, and the like) to define general zones within which particular animal activities are allowed or disallowed (e.g., at feeders, at doorways, and the like). Such systems typically will rely on a singular beacon that communicates with an animal tracking device to either register the activity of the animal or to generate a stimulus to the animal (e.g., to discourage particular behavior).

These systems are generally effective, but may be limited in terms of accuracy. Because these systems often rely on signal strength or connection to define areas of interest, they will generally form approximately spherical areas of control or exclusion. Additionally, depending on signal strength, signal attenuation through walls, and the like, intended control zones may be difficult to manage, or may inadvertently extend across levels in a building; for example, a control setup in an upstairs bedroom to keep a pet out of that room may inadvertently result in generation of a stimulus when the animal is located in a room on a floor directly below that bedroom if signal strength settings are not managed appropriately.

SUMMARY

Generally, an animal tracking system is provided which is enabled using satellite-based positioning systems, but further include various features that are enabled by fine accuracy position detection, such as may be made available through use of fine-adjustments made possible via, e.g., real-time kinematic (RTK) positioning and/or post processing kinematic (PPK) technologies. The animal tracking systems and methods described herein include, for example, various usage techniques in terms of set up and use of equipment to define containment areas and or exclusion zones, and to both see historical animal positioning within a containment zone and determine likely animal behaviors based on such positioning. Further, techniques for improved power consumption, reception, and usability are provided.

In additional aspects, such an animal tracking system may incorporate features that support fine-grained location capabilities when an animal and animal tracking device are positioned in an area where satellite-based positioning is unavailable, such as within a building. In some aspects, a fine-grained radio frequency locating technology may be incorporated into an animal tracking device, and may involve use of one or more multi-antenna beacons operable to determine relative position and movement of an animal tracking device. Such a system allows customized, fine-grained definition of zones and sub-zones of monitoring and exclusion. Techniques for efficient setup and management of various versions of such a system, including at least fine-grained satellite-based positioning and optional radio-frequency locating technologies are also provided.

In a first aspect, an animal tracking system is disclosed. The animal tracking system includes an animal tracking device comprising a housing affixable to an animal, a memory positioned within the housing, and a processor operatively connected to the memory and positioned within the housing. The animal tracking device further includes a global positioning unit communicatively connected to the processor, and at least one wireless communication interface. The memory stores instructions which, when executed by the processor, cause the animal tracking device to perform: determining a location of the animal tracking device relative to a virtual boundary based on a position determined via the global positioning unit; based on the animal tracking device satisfying a predetermined criteria, obtaining observation data via the at least one wireless communication interface from a base station having positional accuracy greater than that of the global positioning unit to determine an adjusted location having improved accuracy relative to the position determined via the global positioning unit; and based on the animal tracking device not satisfying the predetermined criteria, operating at least a portion of the at least one wireless communication interface in a low power mode and using an unadjusted version of the location of the animal tracking device.

In a second aspect, an animal tracking system includes an animal tracking device. The animal tracking device includes a housing affixable to an animal, a memory positioned within the housing, and a processor operatively connected to the memory and positioned within the housing. The animal tracking device further includes a global positioning unit communicatively connected to the processor, and at least one wireless communication interface. The memory stores instructions which, when executed by the processor, cause the animal tracking device to perform: determining a location of the animal tracking device relative to a defined virtual boundary based on a position determined via the global positioning unit; obtaining a location adjustment via the at least one wireless communication interface from a base station having positional accuracy greater than that of the global positioning unit to determine an adjusted location; and in a virtual boundary definition mode, determining a plurality of adjusted locations and defining a virtual boundary based on a sequence of the plurality of adjusted locations.

In a further aspect, a method includes determining, at a first time, a location of an animal tracking device relative to a virtual boundary based on position data determined via a global positioning unit of an animal tracking device. The method also includes, in response to the animal tracking device satisfying a predetermined criteria based at least in part on the location, obtaining observation data via at least one wireless communication interface of the animal tracking device, the observation data being derived from positional data of a base station having positional accuracy greater than that of the global positioning unit and used at the animal tracking device with the position data determined via the global positioning unit to determine an adjusted location having improved accuracy relative to the location as independently determined via the global positioning unit. The method further includes determining, at a second time, a second location of the animal tracking device relative to a virtual boundary based on position data determined via a global positioning unit of an animal tracking device, the second location being different from the first location, and, in response to the animal tracking device not satisfying the predetermined criteria based at least in part on the second location, operating at least a portion of the at least one wireless communication interface in a low power mode and using an unadjusted version of the location of the animal tracking device.

In a third aspect, a method of operating an animal tracking system is provided. The method includes determining a location of an animal tracking device relative to a defined virtual boundary based on a position determined via a global positioning unit of the animal tracking device, and obtaining a location adjustment via a wireless communication interface of the animal tracking device from a base station having positional accuracy greater than that of the global positioning unit to determine an adjusted location. The method further includes determining whether a feature of the virtual boundary is active based, at least in part, on whether the adjusted location has a positional accuracy that is greater than a predetermined threshold, and based on a determination that the positional accuracy is greater than the predetermined threshold, determining whether the adjusted location is within a virtual boundary. The method further includes, in response to determining that the adjusted location is outside of or has crossed the virtual boundary while the virtual boundary is in an active mode, initiating a stimulus at the animal tracking device.

In a further example, an animal tracking system includes an animal tracking device comprising: a housing configured to attach to a tracking device affixable to an animal; a memory positioned within the housing; a processor operatively connected to the memory and positioned within the housing; a global positioning unit communicatively connected to the processor; at least one wireless communication interface; and an inertial measurement unit (IMU). The memory stores instructions which, when executed, cause the animal tracking device to perform: at a first time, determining a location of the animal tracking device relative to a defined virtual boundary based on a position determined via the global positioning unit; obtaining observation data via the at least one wireless communication interface from a base station having positional accuracy greater than that of the global positioning unit to determine an adjusted location; inputting the adjusted location into a predictive model of the; and at a second time after the first time, determining a second location of the animal tracking device using data received from the inertial measurement unit, the second location being based on the adjusted location. Determining the second location of the animal tracking device is performed without obtaining observation data from the base station with respect to the second location.

In a still further example, an animal tracking system includes an animal tracking device and a remote computing device. The animal tracking device includes a housing configured to attach to a tracking device affixable to an animal, a memory positioned within the housing, a processor operatively connected to the memory and positioned within the housing, a global positioning unit communicatively connected to the processor, and at least one wireless communication interface. The memory stores instructions which, when executed by the second processor, cause the animal tracking device to perform: determining a location of the animal tracking device relative to a defined virtual boundary based on a position determined via the global positioning unit, and transmitting location data via the at least one wireless communication interface. The remote computing device includes a second wireless communication interface, a second memory, and a second processor operatively connected to the second memory. The second memory stores instruction which, when executed by the processor, cause the remote computing device to perform: receiving location data from the animal tracking device via the second wireless communication interface; receiving observation data from a base station having positional accuracy greater than that of the global position unit of the animal tracking device; determining an adjusted location for the animal tracking device using the location data received from the animal tracking device and the observation data received from the base station; and transmitting the adjusted location to the animal tracking device via the second wireless communication interface. The animal tracking device issues a stimulus responsive to determining the location of the animal tracking device from the adjusted location is outside an allowable zone of the defined boundary.

In a further aspect, an animal tracking system includes an animal tracking device that includes a housing designed to be attached to an animal's tracking device. The tracking device also contains a memory and a processor that are operatively connected. Additionally, the tracking device is equipped with a global positioning unit that is connected to the processor and can receive first positioning data. The tracking device has one or more wireless communication interfaces, including at least a first wireless communication interface. This first wireless communication interface enables data exchange between the processor and one or more remote computing systems. Moreover, at least one of the wireless communication interfaces is configured to obtain second positioning data based on the relative position of the tracking device to one or more wireless communication devices. The memory of the tracking device stores instructions that, when executed by the processor, cause the tracking device to perform several actions. These actions include determining whether the tracking device can receive first positioning data or second positioning data. If the tracking device can receive first positioning data, it determines the location of the tracking device based on this data. However, if the tracking device cannot receive first positioning data but can receive second positioning data, it utilizes the second positioning data instead to determine the position of the tracking device.

In a further aspect, a method involves tracking the position of an animal tracking device relative to a virtual boundary area. Firstly, the location of the animal tracking device is determined using first positioning information from a global positioning unit, along with observation data received through the tracking device's wireless communication interface. Subsequently, it is determined whether the location of the tracking device falls within a predefined zone. If the tracking device is within the predefined zone, second positioning data from the wireless communication interface is utilized instead of the first positioning data to determine the position of the tracking device. This is applicable during at least a portion of the time when the tracking device is positioned within the predefined zone. The wireless communication interface is configured to obtain the second positioning data based on the relative position of the tracking device to one or more wireless communication devices.

In a further aspect, an animal tracking system includes an animal tracking device that includes a housing designed to attach to an animal's tracking device. The tracking device includes a memory, a processor that is operatively connected to the memory and positioned within the housing, and a global positioning unit that is communicatively connected to the processor. The global positioning unit is configured to receive first positioning data. The tracking device also has a first wireless communication interface that enables data exchange between the processor and one or more remote computing systems. This first wireless communication interface is configured to obtain positioning data, which includes observation data, from a base station with higher positional accuracy than the global positioning unit. This allows the tracking device to determine an adjusted location with improved accuracy compared to the position determined solely through the global positioning unit. Additionally, the tracking device is equipped with a second wireless communication interface that can obtain second positioning data based on the relative position of the tracking device to one or more wireless communication devices. The tracking device also includes an inertial measurement unit that is configured to determine an estimated position based on historical position, speed, and direction. The memory of the tracking device stores instructions that, when executed by the processor, cause the tracking device to perform several actions. These actions include determining whether the location of the tracking device is within a predefined zone within a virtual boundary area, based on the adjusted location and the second positioning data. If the tracking device is outside the predefined zone, it utilizes the adjusted location as the position of the tracking device. However, if the tracking device is within the predefined zone, it uses the second positioning data instead of the adjusted location to determine the position of the tracking device during at least a portion of the time it is positioned within the predefined zone. If both the adjusted location and the second positioning data are unavailable, the tracking device utilizes the estimated position based on data received from the inertial measurement unit as the current position of the tracking device.

In a further aspect, an animal tracking system includes an animal tracking device that includes a housing designed to attach to an animal tracking device. The tracking device contains a memory, a processor that is operatively connected to the memory and positioned within the housing, and a global positioning unit that is communicatively connected to the processor. The tracking device also has a first wireless communication interface that is configured to obtain observation data from a base station with higher positional accuracy than the global positioning unit. This observation data is used to determine an adjusted location that offers improved accuracy compared to the position determined solely by the global positioning unit. Additionally, the tracking device is equipped with a second wireless communication interface that can obtain second positioning data based on the relative position of the tracking device to one or more wireless communication devices. The memory of the tracking device stores instructions that, when executed by the processor, cause the tracking device to perform several actions. These actions include determining whether the tracking device is within a virtual boundary area based on either the adjusted location or the second positioning data. The tracking device also records position data based on either the adjusted location or the second positioning data, and transmits this position data to a server. It is worth noting that either the animal tracking device or the server is configured to generate a map that depicts the virtual boundary area and display the position data on a computing device.

In a further aspect, a method involves generating a display that includes a map of historical animal tracking device locations. At the animal tracking device, the position data of the tracking device is determined based on either the first positioning information from a global positioning unit and observation data received via a first wireless communication interface, or the second positioning information from a second wireless communication interface that obtains second positioning data based on the relative position of the animal tracking device to one or more wireless communication devices. The position data of the animal tracking device is then sent to a server. At the server, the position data of the animal tracking device is stored to create a historical record of the tracking device's positions. The server also receives a request from a remote computing device regarding the position data of the animal tracking device within a predetermined time period. In response to this request, the server generates a map that depicts the virtual boundary area and displays the position data corresponding to the predetermined time period.

In a further aspect, animal tracking system includes a server and an animal tracking device. The animal tracking device includes a housing that can be attached to an animal that contains a memory and a processor that are operatively connected. Additionally, the tracking device is equipped with a global positioning unit that is communicatively connected to the processor. The tracking device also has a first wireless communication interface that is configured to obtain observation data from a base station with higher positional accuracy than the global positioning unit. This observation data is used to determine an adjusted location with improved accuracy relative to the position determined solely by the global positioning unit. Furthermore, the tracking device is equipped with a second wireless communication interface that can obtain second positioning data based on the relative position of the tracking device to one or more wireless communication devices. The memory of the tracking device stores instructions that, when executed by the processor, cause the tracking device to perform several actions. These actions include determining whether the tracking device is within a virtual boundary area based on either the adjusted location or the second positioning data. The tracking device also records position data based on either the adjusted location or the second positioning data and transmits this position data to the server. On the other hand, the server is configured to generate a map that depicts the virtual boundary area and displays the position data. This map can be viewed on a computing device.

In a further aspect, an animal tracking system includes an animal tracking device that includes a housing designed to be affixable to an animal. The tracking device contains a memory, a processor that is operatively connected to the memory and positioned within the housing, and a global positioning unit that is communicatively connected to the processor. The tracking device also has a first wireless communication interface that is configured to obtain observation data from a base station with higher positional accuracy than the global positioning unit. This observation data is used to determine an adjusted location that offers improved accuracy relative to the position determined solely by the global positioning unit. Additionally, the tracking device is equipped with a second wireless communication interface that can obtain second positioning data based on the relative position of the tracking device to one or more wireless communication devices. The memory of the tracking device stores instructions that, when executed by the processor, cause the tracking device to perform two actions. Firstly, the tracking device determines position data based on either the adjusted location or the second positioning data. Secondly, based on this position data, the tracking device determines whether it is located within a virtual boundary area. Furthermore, the tracking device also determines whether it is positioned within a specific sub-zone. These sub-zones comprise different types, and the action taken by the tracking device varies depending on the type of sub-zone in which it is positioned.

In a further aspect, a method includes, at the animal tracking device, determining position data of the tracking device based on either first positioning information obtained from a global positioning unit or observation data received via a first wireless communication interface. Alternatively, the position data can also be determined based on the second positioning information obtained from a second wireless communication interface, which relies on the relative position of the tracking device to one or more wireless communication devices. Once the position data is obtained, it is sent to a server. At the server, based on the received position data, it is determined whether the animal tracking device is positioned within a virtual boundary area. Additionally, a determination is made as to whether the animal tracking device is positioned within a sub-zone, which is chosen from a range of different definable types of sub-zones located within the virtual boundary area. The specific type of sub-zone in which the animal tracking device is positioned dictates the action that will be taken by the tracking device.

In a further aspect, an animal tracking system includes a server and an animal tracking device. The animal tracking device includes a housing that can be attached to an animal's tracking device and contains a memory and a processor. The tracking device is equipped with a global positioning unit that is connected to the processor. It also has a first wireless communication interface that can obtain observation data from a base station with higher positional accuracy than the global positioning unit. This observation data is used to determine an adjusted location with improved accuracy compared to the position determined solely by the global positioning unit. The tracking device also has a second wireless communication interface that can obtain second positioning data based on the relative position of the tracking device to wireless communication devices. The memory of the tracking device stores instructions that, when executed by the processor, allow the tracking device to periodically record position data based on the adjusted location or the second positioning data in a log of historical position data. The tracking device then transmits this position data to the server. On the other hand, the server is configured to analyze the position data and determine one or more predicted actions of the animal corresponding to the animal tracking device. The server generates a display that includes an analysis of these predicted actions, which can be viewed on a remote computing system.

In a further aspect, a method includes, at the animal tracking device, position data is periodically recorded based on either an adjusted location obtained using positioning data from a global positioning unit and observation data obtained via a first wireless communication interface from a base station, where the adjusted location has improved accuracy compared to the positioning data from the global positioning unit, or second positioning data obtained using a second wireless communication interface that relies on the tracking device's relative position to wireless communication devices. The recorded position data is transmitted to the server. At the server, the position data is analyzed to determine one or more predicted actions of the animal associated with the tracking device. The server generates a display that includes an analysis of these predicted actions, which can be viewed on a remote computing system.

In a further aspect, a server includes a processor, a communication interface, and a memory that stores instructions for its operation. When executed, these instructions cause the server to perform various actions. Firstly, the server receives position data from an animal tracking device. This position data includes a collection of historical positions of an animal, as well as adjusted location data and second positioning data. The adjusted location data comprises positioning data from the animal tracking device's global positioning unit, along with observation data obtained from a base station at the tracking device. This adjusted location data offers improved accuracy compared to the positioning data solely obtained via the global positioning unit. The second positioning data pertains to the relative position of the tracking device in relation to one or more wireless communication devices. Furthermore, the server analyzes the received position data to determine one or more predicted actions of the animal associated with the tracking device. Finally, the server generates a display that presents an analysis of these predicted actions. This display is designed to be viewed on a remote computing system.

In a further aspect, a method of initializing a Realtime Kinematic (RTK) base station in an environment involves several steps. In the base station initialization process, the method includes entering an initialization mode and receiving trusted observation data from one or more other RTK base stations that are operating in a base station mode. This trusted observation data is utilized as the observation data for the base station. The method transitions from the initialization mode to the base station mode at the RTK base station. The method involves transmitting the observation data so that it can be received by another rover device.

In a further aspect, an animal tracking system includes an animal tracking device that includes a GPS interface and a wireless communication interface. Additionally, there is an RTK base station which comprises a processor and a memory that stores instructions for its operation. The RTK base station performs various actions, such as entering an initialization mode and receiving trusted observation data from one or more other RTK base stations that are operating in a base station mode. The trusted observation data is then used as the observation data for the RTK base station. The RTK base station also transitions from the initialization mode to a base station mode. Furthermore, the observation data is transmitted by the base station for receipt by the animal tracking device.

In a further aspect, an animal tracking system includes an animal tracking device that includes a processor, a memory, a GPS interface, and a wireless communication interface. There is also an RTK base station that comprises a processor and a memory storing instructions for its operation. The base station performs various actions, such as entering an initialization mode and receiving trusted observation data from one or more other RTK base stations that are operating in a base station mode. The trusted observation data is then used as the observation data for the RTK base station. Additionally, the base station transitions from the initialization mode to a base station mode and transmits the observation data for receipt by the animal tracking device. Meanwhile, the memory of the animal tracking device stores instructions that, when executed, allow the tracking device to identify the RTK base station and obtain the observation data through the wireless communication interface. This observation data is used to improve the accuracy of the location data obtained by the animal tracking device via the GPS interface, relative to relying solely on the positioning data obtained through the GPS interface.

In a further aspect, an animal tracking system includes an animal tracking device that features a housing designed to be attached to a standard tracking device worn by an animal. Within this housing, there is a memory module and a processor that are interconnected, with the processor also linked to a global positioning unit (GPS) for receiving initial location data. Additionally, the tracking device is equipped with a wireless communication interface that enables data transmission between the processor and external computing systems. Notably, this interface can also retrieve observation data from a base station with superior positional accuracy, allowing the system to calculate a more precise location for the tracking device than what the GPS data alone would provide. The memory within the tracking device stores specific instructions that, when executed by the processor, carry out a range of functions. These functions include activating a mode for defining boundaries, wherein the tracking device tracks its movement to automatically capture a series of positions while in this mode. A user can then signal the end of the boundary definition mode, prompting the tracking device to apply either a smoothing or curve-fitting process to the tracked positions, resulting in a defined boundary line. Upon concluding this mode, the system generates a virtual boundary that incorporates the created boundary line as part of its perimeter, effectively establishing a containment area for the animal.

In a further aspect, an animal tracking system includes a computing system including at least one computing device with a processor and memory. It also includes an animal tracking device, which has a housing that can be attached to an animal. The housing contains a memory and a processor. The animal tracking device is equipped with a global positioning unit that is connected to the processor and can receive first positioning data. The tracking device also has a wireless communication interface that allows data exchange between the processor and remote computing systems. The wireless communication interface can obtain observation data from a base station with higher positional accuracy than the global positioning unit. This observation data is used to determine a more accurate location for the animal tracking device, improving the accuracy of the position determined solely by the first positioning data from the global positioning unit. The memory of the animal tracking device stores instructions that, when executed by the processor, cause the tracking device to perform certain actions. These actions include initiating a boundary definition mode, in which the device's movement is tracked using the first positioning data and observation data to automatically capture a series of positions, and receiving a user indication to terminate the boundary definition mode. The memory of a computing system stores instructions that, when executed by the processor, cause the server to perform certain actions. These actions include initiating a smoothing operation or a curve-fitting operation on the series of positions to obtain a boundary line, and generating a virtual boundary that is bounded, at least in part, by the boundary line after exiting the boundary definition mode.

In a further aspect, a method of defining a virtual boundary for an animal tracking system starts by initiating a boundary definition mode on the animal tracking device. The animal tracking device is equipped with a global positioning unit that can receive GPS data and a wireless communication interface that can receive observation data from a base station with higher positional accuracy than the global positioning unit. This observation data is used to determine an adjusted location for the animal tracking device, improving the accuracy compared to relying solely on the GPS data. While in the boundary definition mode, the method involves tracking the movement of the animal tracking device using both the GPS data and the observation data to automatically capture a series of positions along the path. The method also includes receiving an indication from the user to terminate the boundary definition mode. After that, the method initiates either a smoothing operation or a curve-fitting operation on the series of positions to obtain a boundary line. Finally, the method generates a virtual boundary that is partially or entirely bounded by the boundary line.

In a still further aspect, a method of defining a virtual boundary for an animal containment system includes receiving, at a display on a user computing device, a definition of a virtual boundary on a map user interface; receiving an adjustment to the map image to shift a position and/or orientation of the map image to correlate a known location of an animal tracking device to a known position on the map image, wherein the known location of the animal tracking device is based on position data obtained from a global positioning unit of the animal tracking device and observation data having positional accuracy greater than that of the global positioning unit; and storing the adjustment as a map offset associated with the virtual boundary.

DETAILED DESCRIPTION

Figure 1:
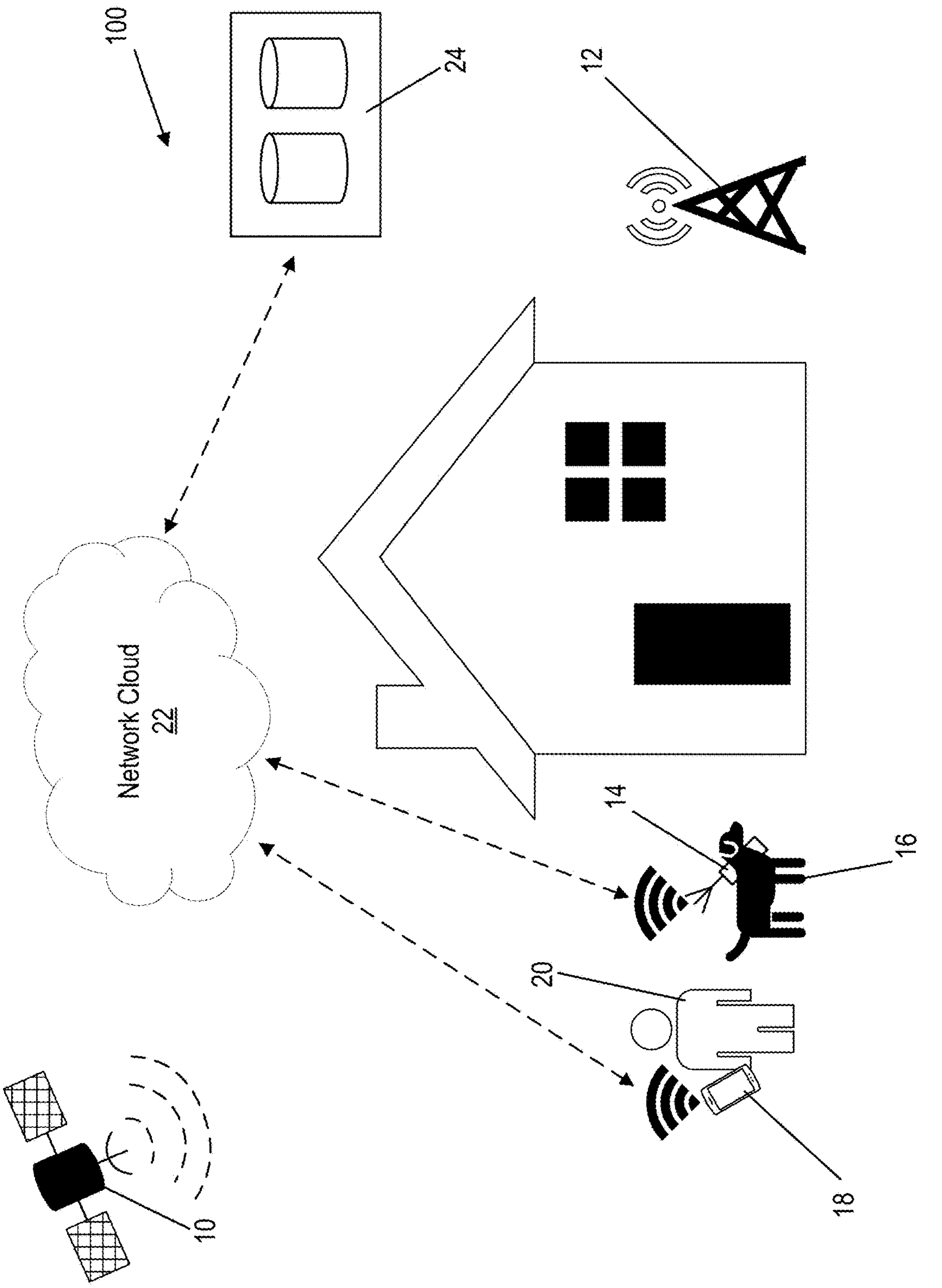
FIG. 1 illustrates an example animal tracking system using fine-grained satellite-based location features, in accordance with examples of the present disclosure.

Various embodiments will be described in detail with reference to the drawings. Reference to various embodiments does not limit the scope of the claims attached hereto. Additionally, any examples set forth in this specification are not intended to be limiting and merely set forth some of the many possible embodiments for the appended claims.

As briefly described above, embodiments of the present disclosure are directed to techniques and technical features of an animal tracking system incorporating Realtime Kinematics-based (RTK) and or post-processing kinematic (PPK) tracking features. For context, RTK and/or PPK systems generally operate by enhancing GNSS data received from satellite systems (e.g., GPS, Galileo, BeiDou, GLONASS, etc.) at a tracking device, for example by correcting the received signals by using additional received signals from a base station with a known location. The base station is equipped with a receiver that measures GPS signals from the satellites and calculates the position of the base station, with increasing accuracy over time. Using the calculated position, the base station generates observation data that other devices, such as the tracking device, can use to enhance their own locating capabilities. The base station then transmits observation data to the tracking device, for example using a separate long-range radio frequency (RF) communication link or other data communications link. The tracking device processes the received observation data from the base station. Accordingly, a tracking device, using both GNSS data and the positional observation data from a base station implementing RTK and/or PPK technologies, may achieve centimeter level positional accuracy. Data used for locating a subject or determining its position is known as positioning data and include GNSS data, position data, observation data, historical position data, processed position data, calculated position data, and the like.

In some implementations, an RTK system measures the carrier phase difference between the GNSS signals received at the base station and the tracking device. To calculate, the RTK system may measure the difference in the high frequency wave of the carrier signal received at the base station and the carrier signal received at the tracking device. Carrier phase measurements in combination with observation data provides higher accuracy than typical code-based measurements used in GNSS systems. By processing this information, a tracking device is able to track a subject with greater precision and accuracy than by only using GNSS signals.

In example implementations, an animal tracking system is enhanced via use of high-accuracy location enhancement to improve accuracy and provide greater feature flexibility to users. Through the increased accuracy, virtual boundaries are able to be used at a much finer detail, thus, the boundaries can be used to more accurately track an animal's position relative to a boundary. Accordingly, features included in a high-accuracy tracking system may be implemented to keep a tracked animal out of, or within, much smaller areas. In addition, a user can create precise corridors to allow an animal to pass between different sections of the user's property, or between properties (e.g., along pathways or sidewalks) due to the increased accuracy. The user may also set timing of particular pathways or permission features, improving flexibility of use of virtual containment or boundary areas.

In some examples, an animal tracking system using RTK or PPK technologies allows a user to, with tracking device on hand, traverse a perimeter of an intended containment area, or at least a portion thereof. Through use of the high-accuracy positioning that is available via such technologies, the user may be able to define a virtual boundary useable for subsequent containment. In some examples, the traversed perimeter may define custom, non-rectangular boundaries for specific containment zones, virtual barriers, and the like.

Furthermore, a user may view these boundaries overlaid on a satellite image (e.g., in a map view). Because the positional accuracy of the boundary created via this method is high, the boundary may be considered as more accurate than the position of the satellite image itself. Accordingly, user interface features may be provided that allow a user to manipulate the satellite image such that a known location on the satellite image corresponds to the known position or paths along which the boundary traversal occurred (e.g., more accurately locating a corner of a property to a position of the tracking device when the user carried the tracking device along the perimeter of the property). This manipulation of the satellite image, for example shifting the satellite image left/right, up/down, may be stored associated with a tracking device or with a user account for future use as an offset. Accordingly, in the future, the user may more accurately see the correspondence between animal position and a position on the satellite image or map view regarding a specific location of the animal (e.g., a pinpoint location where the animal may elect to dig, relieve itself, and the like).

In some examples, an animal tracking system using RTK and/or PPK technologies as described herein includes generation of user interfaces that may provide further detail regarding animal behavior to the user. For example, heat maps may be generated based on historical positioning of an animal tracking device when in use. Such heat maps may be tailored toward presentation of only data points where high positional accuracy is available, and may include examples where the detected position is within a predetermined threshold (e.g., 1-2 feet) of a previous detected position, or data points may include those where an animal lingers for a predetermined period of time. Accordingly, a user may conveniently be able to detect, via graphical depiction, likely activities of the animal from past position and/or movement.

Still further, in the example implementations, historical position data may be analyzed, for example at a cloud computing system communicatively connected to an animal tracking device, such as a collar. The cloud computing system may implement one or more pattern matching techniques, such as via artificial intelligence (AI) systems. By comparing positional data relative to boundaries or known objects, dwell times, and the like, such a system may predict or suggest to a user likely activities of the animal during a predetermined period of time (e.g., sleeping, digging, running, relieving itself, eating, and the like). Additionally, predicted animal behavior may be used as a basis for determining whether some type of alert or corrective action (e.g., a stimulus) should be applied at an animal tracking device.

In addition to the above, a user may define various types of containment areas that are comparatively specific in terms of location. While existing GNSS based containment systems generally allow definition of an outer boundary, through use of the improved positional accuracy of RTK and/or PPK technologies, an animal containment system in accordance with the present disclosure may allow a user to define significantly smaller or more specific barriers or exclusion zones, such as virtual gates or barriers. Such barriers may be limited in time (e.g., only active at particular times of day, days of the week, or in response to particular conditions, such as weather), or in response (e.g. eliciting different feedback or stimulus to an animal who approaches different types of barriers). Additionally, relatively narrow paths may be defined that allow an animal to traverse between containment zones at particular times of day, or in response to deactivation of virtual gates, and the like. In examples, a user may define discontinuities in containment barriers that are defined using such systems, where such discontinuities may be present temporarily (operating as virtual gates) or leading to pathways along which an animal may be allowed to traverse.

In example implementations of the present disclosure, a high-accuracy animal tracking system may have some significant additional power requirements relative to existing GPS-based containment systems. Accordingly, example embodiments described here include techniques for conserving power, for example by selective use of particular location and/or communications functionality. In some implementations, an animal tracking system may be used in a containment context, and may activate corrective location signaling when an animal is within a predetermined threshold distance of a boundary, or when GPS signals are also available (indicating that the animal is outside and/or near a boundary, thereby requiring greater positional accuracy). In other circumstances, a communication circuit used to receive observation data included within an animal tracking device may be disabled or placed in a low power mode. Such techniques may utilize the improved location information obtained from use of a highly-accurate tracking or containment system, while conserving energy when it is comparatively less important to have fine positional accuracy.

Still further, a location-enhanced animal tracking system may utilize different timing or type of stimulus based on determined accuracy of animal position. For example, in circumstances when RTK-based positioning is not enabled or is at comparatively low confidence (e.g., when a base station is unavailable or not providing accurate signaling correction), a warning stimulus, such as a sound, vibration, ultrasonic signaling, and/or other stimulus, may be delivered to an animal as the animal approaches a barrier from a further distance. By contrast, when positional accuracy is high, stimulus might only be activated as the animal approaches the barrier more closely, or a more assertive stimulus might be applied (e.g., an electrical stimulus). In examples, both distance thresholds may be adjustable by a user, e.g., via a mobile application.

Moreover, some embodiments include a system of installing base stations for efficient use with multiple animals, or switching between towers. For example, an animal tracking device may switch among available base stations that may be nearby based on relative signal strength or communicated accuracy. The present application further describes improvements in a user's map synchronization on a computing device through surveying. Still further, observation data may be received from more than one base station improving accuracy of overall positional correction.

Still further, in some implementations of an animal tracking device, antenna features may be incorporated which alleviate potential conductivity concerns. For example, an antenna may be integrated into an animal tracking device, and may be positioned such that it is maintained on a top (back) portion of the tracking device, for example via a counterbalancing weight or by positioning the antenna on an opposite side of the tracking device as compared to circuitry (which act as a counterbalancing weight). Additionally, in some implementations, multiple antennas may be integrated into an animal tracking device, such that the tracking device may be worn in a variety of orientations or ways while a best antenna may be selected via software on the tracking device for ensuring GPS and RTK signal reception.

In some embodiments, an RTK system uses GPS L1 and L2 signals broadcasted from the orbiting the Earth. Each signal consists of two parts, the L1 including the coarse acquisition code and the precision code. L1 signals are also transmitted at 1575.42 MHz. L2 is a more recently added signal to GPS that includes the P (Y) code and M code. L2 signals are transmitted at 1227.60 MHz. An RTK system may use a dual-frequency GNSS receiver to track both of types of signals. Other signal types may be broadcasted as well by different GNSS satellites (e.g., L5 signals) and may similarly be adjusted to obtain high-accuracy location.

In some embodiments, a base station is fixed as in a static RTK or PPK system. Static systems feature a base station that is located at a fixed position that is used to calibrate tracking. In alternative embodiments, the base station may use moving baseline RTK/PPK position techniques to position base station while it is moving. Further, RTK systems may also include additional rover receivers for tracking of additional subjects. Rover stations help users guide equipment or accurately survey the area. Multiple rovers or tracking devices may also be included.

In some cases, RTK base stations may require significant time for calibration at the time of initialization. In some implementations if the present disclosure, an initializing base station may operate in an initialization mode and may obtain observation data from one or more other base stations. The initializing base station may then utilize this inherited observation data as its own observation data, thereby shortening a time of initialization. In some instances, the initializing base station may be programmed to access a list of available trusted base stations, or otherwise identify trusted correction information, such that the correction information may be reliably adopted. This avoids the possibility of inheriting observation data from a similarly inaccurate base station, which may also be in the process of calibrating, may be positioned far from the initializing base station, or the like.

Further, RTK or PPK systems may utilize dead reckoning tracking techniques to estimate the tracking device's position in combination with GPS or when GPS is unavailable. Dead reckoning involves calculating a current position based on previous position, direction traveled, and speed components. Tracking devices may feature an accelerometer, gyroscope, or compass to collect this data and estimate its position. Other integrated management systems may also be used to combine data from multiple sources to estimate a more accurate position of a tracked subject.

GNSS also offers lower accuracy and precision when the tracked subject is indoors. Walls and the roof of a building impede the satellite signals, which results in lower accuracy, if GNSS signals are able to be received at all. Accordingly, a containment system often cannot properly operate in an indoor environment. While RTK or PPK base stations can help improve accuracy while the tracked animal is indoors, constantly monitoring for RTK signals can quickly drain a tracking device's battery. Thus, additional tracking systems that are suitable for indoor environments can also be used in conjunction with RTK and GNSS or on a separate basis to track an animal of interest.

One such example is an ultra-wideband (UWB) tracking system. UWB tracking systems use ultra-wideband signals that include a frequency of greater than 500 MHz. The high frequency allows for a high transfer rate of data between a receiver and transmitter. Generally, UWB transmitters are within a short distance of the receiver. These increased transmission speeds allow tracking devices to provide even greater accuracy.

UWB tracking systems utilize a variety of techniques to transmit necessary signals between a beacon and a tag that enable tracking. One example includes utilizing a tracking device with two antennas. The two antennas each receive the same transmitted signal from a beacon with a known location. The distance between the two antennas is also known. Each antenna receives the signal from the beacon at a different phase. Using the known distance between the antennas and difference of phase, the tracking device calculates the direction of the beacon in the form of the signal angle of arrival (AoA). With the angle of arrival known, the system can calculate the direction from the tracking device to the beacon.

Example methods for determining distance between the tracking device and beacon include using Time of Flight (ToF). Time of flight calculations include a tag transmitting a signal including the tag's identifier and timing information to a beacon for identification. The timestamp of the transmission from the tag can then be subtracted from the timestamp of the reception by the beacon. This technique is known as one-way ranging. Calculations are completed by either the beacon or tag. In other systems, the beacon then replies with an additional signal with the beacon transmission timestamp. The tag receives the signal and subtracts the beacon transmission time from the total time between the tag's original transmission and reception of the reply. This time is recorded and transmitted to the beacon. This technique is known as two-way ranging. The beacon or tag can calculate the distance between the tag and beacon by multiplying this calculated time by the speed of light, which results in the total distance between the two. Using the same process with two other beacons the system can calculate the location of the tag using triangulation. These signal transmissions can be reversed and the tag can perform the calculations and receive the timing information from the beacon, or the tag may send a signal, receive a reply, and calculate the ToF without transmitting the time back to the beacon. In addition, the tracking device may transmit the ToF or calculated position to a remote computing device over a separate wireless communication interface such as Wi-Fi.

In some example implementations described herein, the animal tracking device is implemented to utilize utilizes GNSS signals and observation data (e.g., RTK and/or PPK observation data) when such signals are available (e.g., when the animal tracking device is outdoors), and detect when such signals are unavailable. In these instances, another locating technology, such as a radio frequency locating technology (e.g., the UWB technology being an example) may be used in locating the animal tracking device with high accuracy. Accordingly, regardless of whether satellite-based location services are available, the animal tracking device may be tracked with high accuracy within a desired containment environment that includes both indoor and outdoor locations.

Still further, in some implementations where location signals are unavailable, an animal tracking device in accordance with the present disclosure may include other locating assistance features, such as those which may track speed and direction of movement of the animal tracking device. As such, if an initial position of the animal tracking device is known, subsequent positions may be obtained for at least a period of time using that speed and position data. This may enable lower frequency position determinations, or may improve location of the animal tracking device in situations where other types of position data may be available only intermittently.

Overall, high accuracy in tracking animal location enables a number of benefits within the context of the present disclosure. For example, capture and storage of high accuracy location information associated with an animal tracking device may allow a system to predict or detect specific actions of the animal, especially when combined with historical data, or other physiological and movement data. Additionally, by tracking positions of an animal within a virtual boundary area, obstacles within that virtual boundary area may be able to be inferred. A learned map of an environment within a virtual boundary may be obtained upon collection of an adequate amount of location data from such an animal tracking device. Still further, fine-grained interaction data between an animal wearing the animal tracking device and people, animals, or objects may be detected, monitored, and summarized for display to a user, for example via a user interface generated at a mobile application communicatively connected to a server that receives such location data from the animal tracking device (or from the animal tracking device directly).

I. Animal Tracking System, Containment and Exclusion Zones, Device Arrangements

FIG. 1 illustrates an example environment of an animal tracking system that utilizes RTK-based positional adjustments. In the shown embodiment, satellite 10 broadcasts GNSS data that satellite position and time of transmission. The GNSS signals are received by base station 12 and an animal tracking device, shown as an animal collar 14. Both animal collar 14 and base station 12 calculate their respective position using the received GNSS data. Base station 12 uses the received signals from satellite 10 to calculate its position to high accuracy. Base station 12 may use additional GNSS data from one or more other satellites to calculate its position and generate observation data. Further, base station 12 transmits observed metrics received from satellite 10, which may be used, at animal collar 14. Animal collar 14 then uses the received base station signals to correct GNSS data received from satellite 10. Animal collar 14 uses the corrected GNSS data to calculate its corrected position.

As described herein, an animal tracking system may be used for either generalized animal tracking, or in combination with one or more containment processes or features. Accordingly, as described herein, an animal tracking system may be utilized as an animal containment system, for example when a virtual boundary is established for containment of an animal wearing an animal tracking device, such as may be included within a housing affixable to an animal (e.g., implemented as animal collar 14). However, the systems described herein are not limited to only containment applications, but instead have use for tracking generally. Additionally, animal tracking, in this context, corresponds to the animal tracking device acquiring and/or maintaining information about its location, and does not presume or require realtime knowledge of that location at a remote device.

In some example embodiments, the base station 12 may broadcast observation data, such that any devices nearby may receive that data and correct their relative positions to achieve high accuracy positioning. Such observation data may include a precise position of the base station and location of one or more reference points, satellite or clock corrections, ionospheric and tropospheric delay information, and other information that might affect GPS/GNSS accuracy.

In some examples, the base station 12 may transmit observation data directly to devices within proximity of that station using radio frequency signals. In alternative examples, the base station 12 may transmit observation data via Wi-Fi, cellular, wired, or other communication protocols or methods. In some particular examples, low frequency or ultra-low frequency radio frequency signaling may be used. In such instances, observation data may be transmitted either directly or indirectly (e.g., via one or more intermediary server devices).

In some circumstances, the animal collar 14 may be configured to provide a stimulus, such as a sound, ultrasonic stimulus signal, vibration, or electrical stimulus, in response to the animal 16 moving outside of a predefined virtual boundary. Examples of such virtual boundaries are described below. In general, the virtual boundary may be maintained as a set of coordinates or vectors within memory of the animal collar 14 (circuitry of which is described below), and when a position of the animal collar, either unadjusted or adjusted, is determined at the collar, that position may be compared to the area defined by the virtual boundary to determine if the animal is within or approaching the virtual boundary. Accordingly, various stimulus signals may be generated in response (e.g., if the animal is approaching the boundary or outside the boundary). A definition of one or more such virtual boundaries may be defined using either the animal collar 14 or mobile device 18, and synchronized back to the animal collar 14 via the network cloud 22 in accordance with example implementations described herein.

In some examples, the corrected, or adjusted, position of the animal collar 14 may also be transmitted to a mobile device 18, either periodically or in near real time. In example animal collar position may be transmitted from the animal collar to the network cloud 22 for retrieval by the mobile device 18. The mobile device 18 may be configured to display the position of animal collar 14 (and animal 16) to user 20. The position can be stored as data that is sent either from animal collar 14 or mobile device 18 to network cloud 22, which sends the data to data store 24.

In the present application, for convenience, an animal 16 wearing a tracking device, such as an animal collar 14 as described herein, may be referred to as a tracked animal. It is understood that the term "tracked animal" may refer to the animal and activities thereof, or may refer to the animal tracking device itself, as well as operations of such an animal tracking device when worn by an animal for which location tracking is desired.

While only a single satellite is shown, satellite 10 may include one or more satellites that broadcast GNSS data. This data includes satellite position and time of transmission data, but may also include other data. Base station 12 is shown as within proximity to a house, although, it can be a greater distance away or placed within the house. Furthermore, while a single base station is illustrated, two or more base stations may be utilized, including correction data from as many base stations as may be necessary to achieve high accuracy while maintaining reasonable computational complexity.

In addition, animal collar is illustrated as a collar, however, it may attach (or affix) to a leg of animal 16 or attach by other means (e.g., as a harness). Further, user 20 can program animal collar 14 using mobile device 18 and an associated mobile application. Mobile device 18 and animal collar 14 may connect through Wi-Fi, Bluetooth, cellular service (e.g., LTE, 5G, and the like), USB connection, or other connection methods that allows data to be exchanged between the two devices.

In some examples, the animal collar 14 and mobile device 18 are configured to connect to network cloud 22, and exchange data via a cloud account associated with the user of the mobile device 18. Network cloud 22 allows mobile device 18 and animal collar 14 to connect to the internet and data store 24. In this embodiment, data store 24 is a server that may store components to execute a mobile animal tracking application, animal movement statistics, or boundary data associated with virtual boundaries discussed below.

In addition, in some example embodiments the network cloud 22 may be used for some postprocessing of location data received from the animal collar 14 and/or base station 12. In such examples, the network cloud 22 may be implemented as one or more cloud computing devices or server devices. The network cloud 22 may implement both computing and storage capabilities, and as such include one or more processing systems and memory or storage systems. In particular examples, the network cloud 22 may calculate position of an animal collar 14 at high accuracy, for example using postprocessing kinematic (PPK) techniques after receiving both location data from the animal collar 14 (e.g. as determined from GPS/GNSS signals) and observation data from a base station 12. The network cloud 22 may also implement one or more predictive models, such as machine learning models usable to predict animal location or behavior, or to classify past animal location as behavior based on traits or habits of that animal or other similar animals. Example details regarding such predictive analytics are described further below.

Generally speaking, any of these techniques, including postprocessed location determinations, predicted animal behavior or classified past animal behavior, may also be used in selectively operating aspects of an animal collar 14. For example, by predicting with high confidence that an animal that is moving toward a virtual boundary is simply moving to a favorite location near the boundary and is not testing the boundary, certain high accuracy location capabilities of the overall system may remain disabled or otherwise in a low-power mode. Or, predicting that an animal is exhibiting particular behavior, such as boundary challenges, despite being relatively far away from a virtual boundary, may allow the system to initiate a high accuracy location determination and activate certain additional virtual boundaries, change threshold distances away from a boundary at which corrective action may be taken, and the like.

In some embodiments, the system 100 uses RTK Observation Space Representation (OSR) data for position corrections determined by the animal collar 14. OSR includes the base station 12 receiving raw GNSS observation data from the satellite 10. The base station 12 may receive additional GNSS observation data from additional satellite. Further, the base station measures the total observable errors from each satellite without any knowledge of the source or cause of each error. This method provides fast and highly accurate RTK fixes, typically within 3-10 seconds, when the antenna has a good view of the sky. The data is a lump sum correction for each satellite that encompasses all sources of error. OTR has fast fix times, such as within 3-10 seconds. The fast fix times can be beneficial for applications requiring immediate accuracy. In addition, OTR provides highly accurate corrections when the antenna has a clear view of the sky.

In some embodiments, the system 100 uses state space representation (SSR) for RTK corrections. SSR models the individual error sources and transmits parameters describing these errors. This allows for more efficient data transmission and enables features like network RTK and precise point positioning (PPP). Further, SSR includes a network of reference stations, rather than the single base station 12, that decorrelate and estimate different GNSS error components such as satellite clocks, orbits, signal biases, ionospheric, and tropospheric delays. Once the different GNSS error components are calculated, a server can estimate the observation data from any arbitrary position within the region covered by the physical base stations. The observation data can then be provided to the animal collar 14 for position determination. SSR requires fewer physical base stations to provide coverage over large geographic regions. This is because the corrections are calculated in a centralized manner and can be broadcast over a wide area, making it suitable for applications that need broad coverage but can tolerate slightly lower accuracy and slower fix times. Further, SSR calculates more precise corrections by separating and estimating different GNSS error components. The corrections can also be broadcast over a wide area, providing flexibility in positioning.

Figure 2:
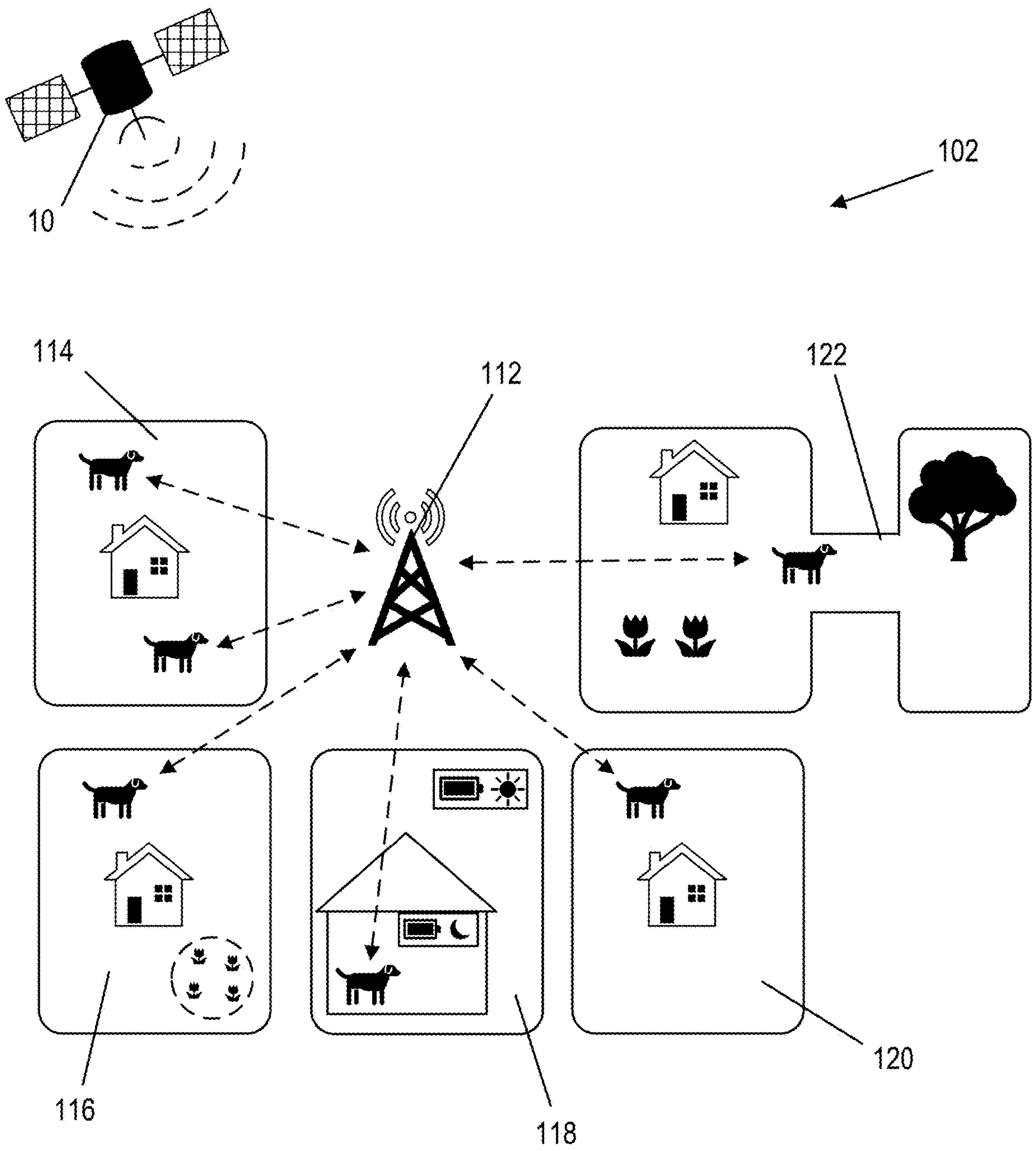
FIG. 2 illustrates a further example of an animal tracking system using fine-grained satellite-based location features, in accordance with examples of the present disclosure.

FIG. 2 illustrates further details of an example environment in which an animal tracking system may be implemented. In the example shown, an animal tracking system 100 incorporates RTK technologies, as discussed above, including an animal collar and animal base station as described above.

In the illustrated embodiment, animal tracking system 100 includes a GNSS satellite 110 that broadcasts to one or more tracking devices, for example that are attached to one or more animals (e.g., animals). As described in further detail below, animal tracking devices may include a collar, a collar portion, or other similar structure. Further, satellite 110 transmits GNSS signals to base station 112. Base station 112 further transmits data to the tracking devices so each tracking device may be used in one or more of the various containment areas 114-122.

In the illustrated embodiment, base station 112 communicatively connects to multiple animal tracking devices to assist in definition of a plurality of containment zones, such as containment areas 114-122, or determining an adjusted or corrected location of an animal collar. Specifically, the base station 112 transmits observation data to one or more of the animal tracking devices described above in conjunction with FIG. 1. In some embodiments, the tracking device may also transmit data to base station 112. Base station 112 provides a transmission range of a kilometer or more to allow many tracking devices to receive its signals. This broadcast range permits many different users to connect to the RTK system and implement better containment boundaries to keep an animal within a predetermined zone. For example, a 5G tower may operate as a base station for each of the animal tracking devices. In other embodiments, the system uses a base station specifically designed for communicating with tracking devices and is further described in association with FIG. 16. In other embodiments, each containment system of containment areas 114-122 include their own base station.

The shown animal tracking system includes a plurality of containment areas 114-122. In some examples, a containment area may be associated with one or more tracking devices, such as the animal collar depicted in FIG. 1. Each corresponding tracking device is configured to prevent the tracked animal from exiting a virtual boundary defined by the containment area. The containment area may be defined, at least in part, using satellite coordinates, such as GNSS coordinates as adjusted using RTK. The definition of the containment area may be created in a variety of ways, for example using a tracking device or using a mobile device, either graphically or via physical traversal of a virtual boundary. The containment area, and virtual boundary, may be provided to the tracking device for purposes of assessment as to whether the tracked animal leaves the virtual boundary defined by the containment area. As noted above, the tracking device may initiate a stimulus to the animal in the event the animal exits the containment area associated with a corresponding tracking device, thereby encouraging the animal to not leave the corresponding containment area. Stimulus may include, e.g., sounds, vibration, ultrasonic and/or electrical stimulus, etc. as the tracked animal approaches or reaches the virtual boundary of the configured containment area.

In one example implementation, containment area 114 includes multiple animal tracking devices that are contained within the same virtual boundary. Each animal tracking device is set to be contained within the same virtual boundary. Containment area 116 includes an animal tracking device that includes a smaller exclusion zone within the boundary. Smaller exclusion zones can be configured to keep an animal from entering certain predefined areas within the containment area. An exclusion zone may be set up, for example, at a garden or patch of flowers where an animal may dig or otherwise cause damage.

In containment area 118, the animal tracking device detects the location of the tracking device as within the home or outside. If the tracking device is within the home, then the tracking device may be configured to either stop receiving observation data, thereby reducing data requirements, or may place a GNSS/GPS unit into a sleep mode or low power mode. Once the tracking device is detected outside the home, the tracking device enters into an active mode, reactivating the GNSS/GPS unit, and optionally restarting acquisition of observation data from one or more base stations. In other embodiments, the tracking device detects if the animal is actively moving or resting and then determines whether to enter into a low power mode.

In the example of containment area 120, a tracking device attached to an animal is maintained within a designated boundary. In addition, containment area 122 includes two boundary zones that are connected through a corridor. This narrower corridor arrangement, in which two boundary zones are connected via a connecting path typically 1-3 meters in width (e.g., approximately 3-10 feet) is made possible by way of refinement of location using RTK. That is, the animal tracking device may, when able to adjust location via RTK, reliably maintain a location with less variability or inaccuracy, so narrower or smaller spaces may be effectively used for containment. While shown as a straight corridor, other embodiments may include a curved corridor connecting two different boundary zones. Further, additional containment features may also be associated to base station 112, although not shown here.

Figure 3:
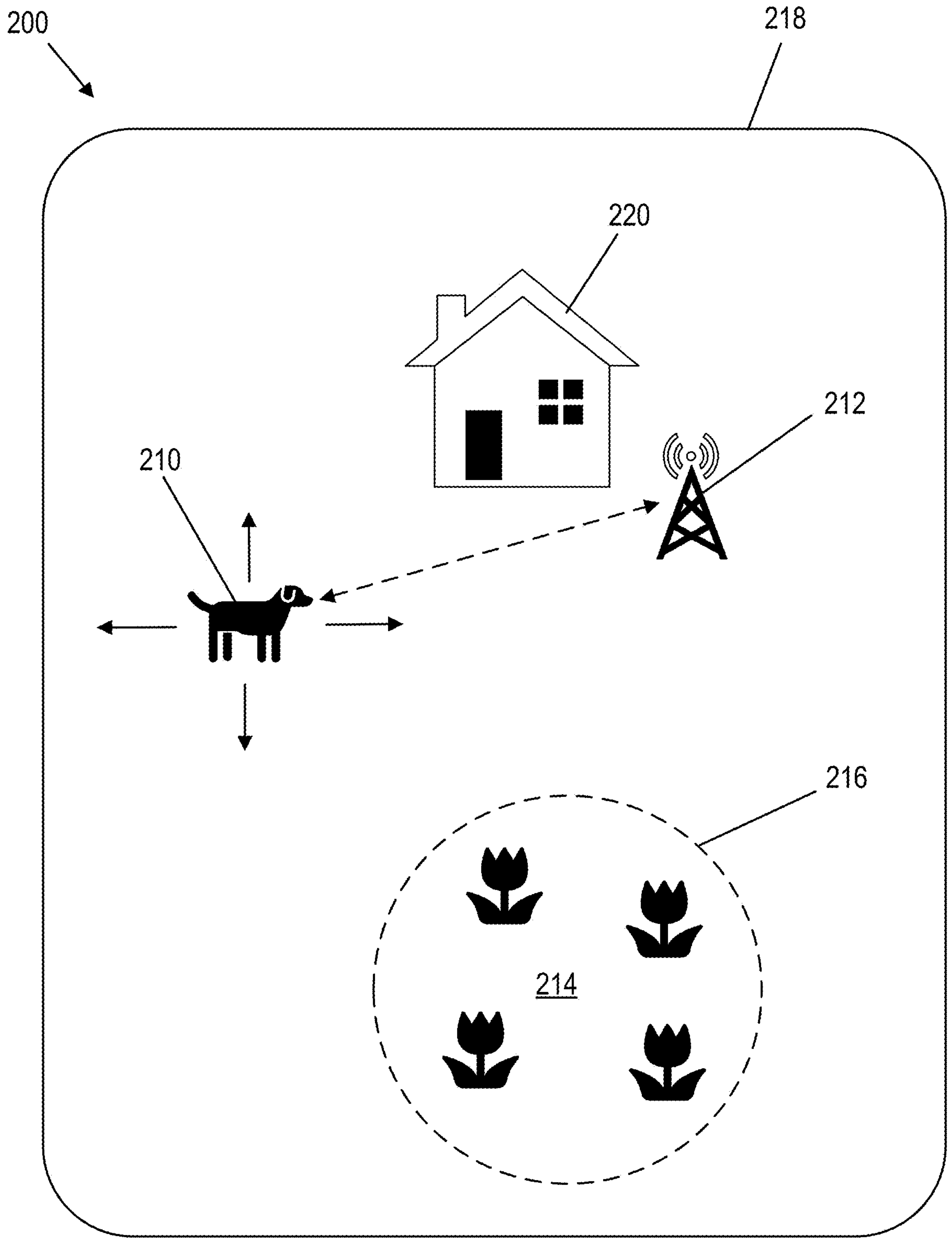
FIG. 3 illustrates an example animal tracking system using fine-grained satellite-based location features to define an exclusion zone, in accordance with examples of the present disclosure.

FIG. 3 illustrates an example of an animal tracking system with an interior exclusion zone. In this embodiment, an animal tracking system 200 includes a tracked animal 210 that includes a tracking device. The animal tracking system 200 may represent an example system or portion thereof of FIGS. 1-2, in the context of the containment area 116.

In the example shown, a tracked animal 210, and specifically an associated tracking device (not shown for simplicity), receives observation data from base station 212. This data allows the tracking device connected to tracked animal 210 to determine an accurate location of the tracked animal. By determining an accurate location, the tracked animal is excluded out of exclusion zone 216 that protects flower bed 214. Further, exclusion zone 216 is placed within boundary 218 along with house 220.

In the shown embodiment, the tracking device of tracked animal 210 receives GNSS data from orbiting satellites for location determination. Further, the tracking device of tracked animal 210 receives location data from base station 212, which is used to correct the GNSS satellite data for better locating capabilities in accordance with RTK methods. As the tracked animal 210 moves within boundary 218, animal tracking system 200 accurately determines position of the tracked animal 210. The location may be transmitted and shown on a mobile device or other computing device (e.g., device 18 of FIG. 1). Further, the system may send an alert when tracked animal 210 crosses boundary 218 or into exclusion zone 216.

Further, animal tracking system 200 is configured to set exclusion zones that are substantially smaller than boundary 218. With the increased accuracy from RTK tracking, exclusion zone 216 is defined with a radius of only a few feet. Previous systems that only relied on GNSS data without RTK support required a wider area of containment or exclusion due to a limited accuracy of a few meters. Thus, a smaller area such as a waste container or garden could not be effectively excluded without excluding a wider area or receiving false positive feedback.

In other embodiments, exclusion zone 216 may take a different shape or even a much smaller area. As a tracked animal approaches the perimeter of exclusion zone 216, the tracking device attached to tracked animal 210 will determine whether a location of a tracked animal is within a predetermined distance and provide a warning so the tracked animal is prevented from entering exclusion zone 216. In some embodiments, the tracking device of tracked animal 210 may not provide a stimulus or warning until the animal crosses the perimeter of exclusion zone 216. In additional embodiments, animal tracking system 200 may include other devices that compute the location of tracked animal 210 based on GNSS data and base station data. In other embodiments, the tracking device attached to the tracked animal 210 also communicatively connects to Wi-Fi, Bluetooth devices, or cellular networks.

The illustrated embodiment shows exclusion boundary restricting tracked animal 210 from entering flower bed 214. Additional exclusion zones may also be defined to keep tracked animal 210 away such as away from house 220. Other zones may encompass furniture, children's toys, or even areas inside that a user may not desire tracked animal 210 to reach or approach. While not shown, other embodiments may also include multiple exclusion zones due to multiple flower beds trash containers, or gardens.

Figure 4:
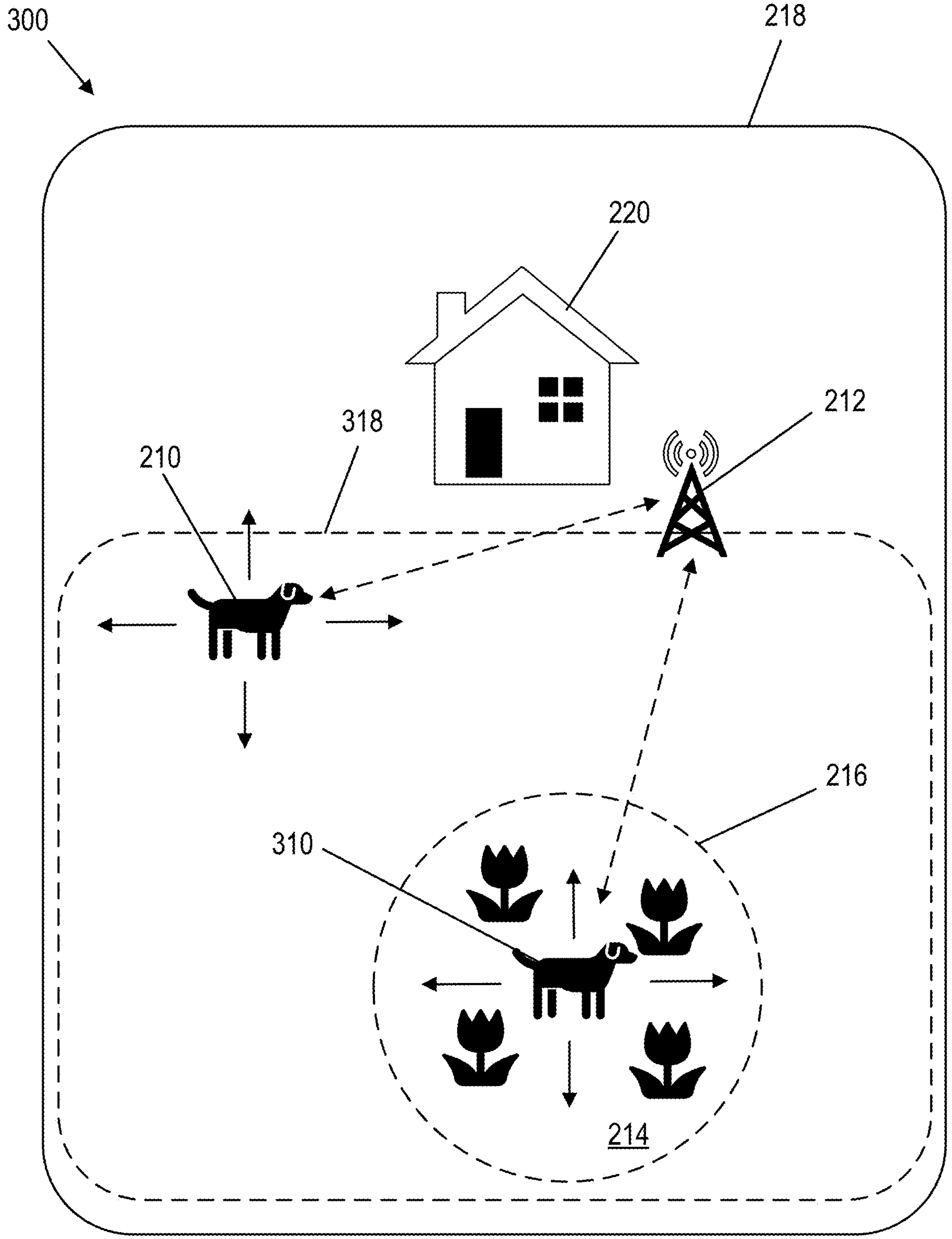
FIG. 4 illustrates an animal tracking system implemented according to aspects of the present disclosure in which a plurality of animals are tracked concurrently.

FIG. 4 illustrates a further example of an implementation of an animal tracking system 300. In the illustrated embodiment, animal tracking system 300 includes the same components as described above, and additionally includes tracked animal 310 in addition to tracked animal 210. That is, both tracked animals 210, 310 may be associated with a separate tracking device (e.g., a collar) that stores information descriptive of the virtual boundary 218. In this example, tracked animal 310 is allowed to access exclusion zone 216 and flower bed 214 within, while tracked animal 210 is discouraged from doing so (e.g., by way of sound, vibration, or stimulus as noted above). That is, user may desire to keep tracked animal 210 from entering an area because of destructive tendencies such as to dig or jump. However, tracked animal 310 may be better behaved, so the user will allow tracked animal to enter the restricted area.

Still further, in some examples, the tracked animals 210, 310 may be treated differently in other ways. That is, in some instances, different virtual boundaries and/or other exclusion zones may be defined. For example, virtual boundary 218 may only be applicable to tracked animal 310, and may be assigned to a tracking device associated with that animal, while a further virtual boundary 318 (e.g., defined in a "backyard") such that two tracking devices may be defined with overlapping virtual boundaries and/or zones.

In other words, the animal tracking system 300 may differentiate between the tracking device attached to tracked animal 210 and the tracking device attached to tracked animal 310, thus, allowing different animals to be located in different areas. This may be implemented, for example, by uniquely programming the tracking device that is associated with each animal 210, 310. In some embodiments, a user may define individualized virtual boundaries for each animal tracking device within the virtual boundary 218 itself; for example, the user may restrict tracked animal 210 to one area within boundary 218 (e.g., within boundary 318) and restrict animal 310 to a different area within boundary 218 (e.g., a similar overlapping or non-overlapping region). For example, two animals may not get along; by enabling stimulus at tracking devices of animals 210, 310 when the animals are within a predetermined proximity of one another, the animals may be allowed to remain outside without a physical barrier being erected to separate them.

It is therefore recognized that, as described below, although individual virtual boundaries, exclusion zones, and the like may be described in association with a particular tracked animal and/or tracking device, those virtual boundaries may be individually selectable and used in association with two or more such animals or animal collars. That is, once a virtual boundary is defined, it may be saved and reused in association with other animal collars or other animal tracking devices. Alternatively, or in addition, further boundaries may be defined for different animals, such that two different animal tracking devices may have overlapping or non-overlapping areas in which animals are permitted, common or specific exclusion zones, common or animal-specific responses to proximity of an animal to particular areas, and the like.

It is noted that in FIGS. 3-4, the base station 212 is present within the virtual boundary 218 at a particular user's premises. However, the present disclosure is not so limited. In some example embodiments, a base station 212 may be positioned at a residence or property of a user, for example when the property is geographically distant from other properties. However, in other examples, a single base station 212 (as seen in the example of base station 112 of FIG. 2), or a network of base stations 212 may be distributed throughout a geographical region or neighborhood, such that a base station may provide adjusted positional data to animal tracking devices within range of that base station, but located within a plurality of different, unaffiliated containment areas defined by different virtual boundaries (e.g., as seen in FIG. 2). Still further, in some examples, a gateway may be placed at a residence or property of a user, for example connected to a home WiFi network and grid power. Such a gateway may be used to communicate with the animal tracking device and a remote base station (e.g., base station 112) to exchange adjustment information to be applied to the position determined by the animal tracking device, as received from the base station.

Figure 5:
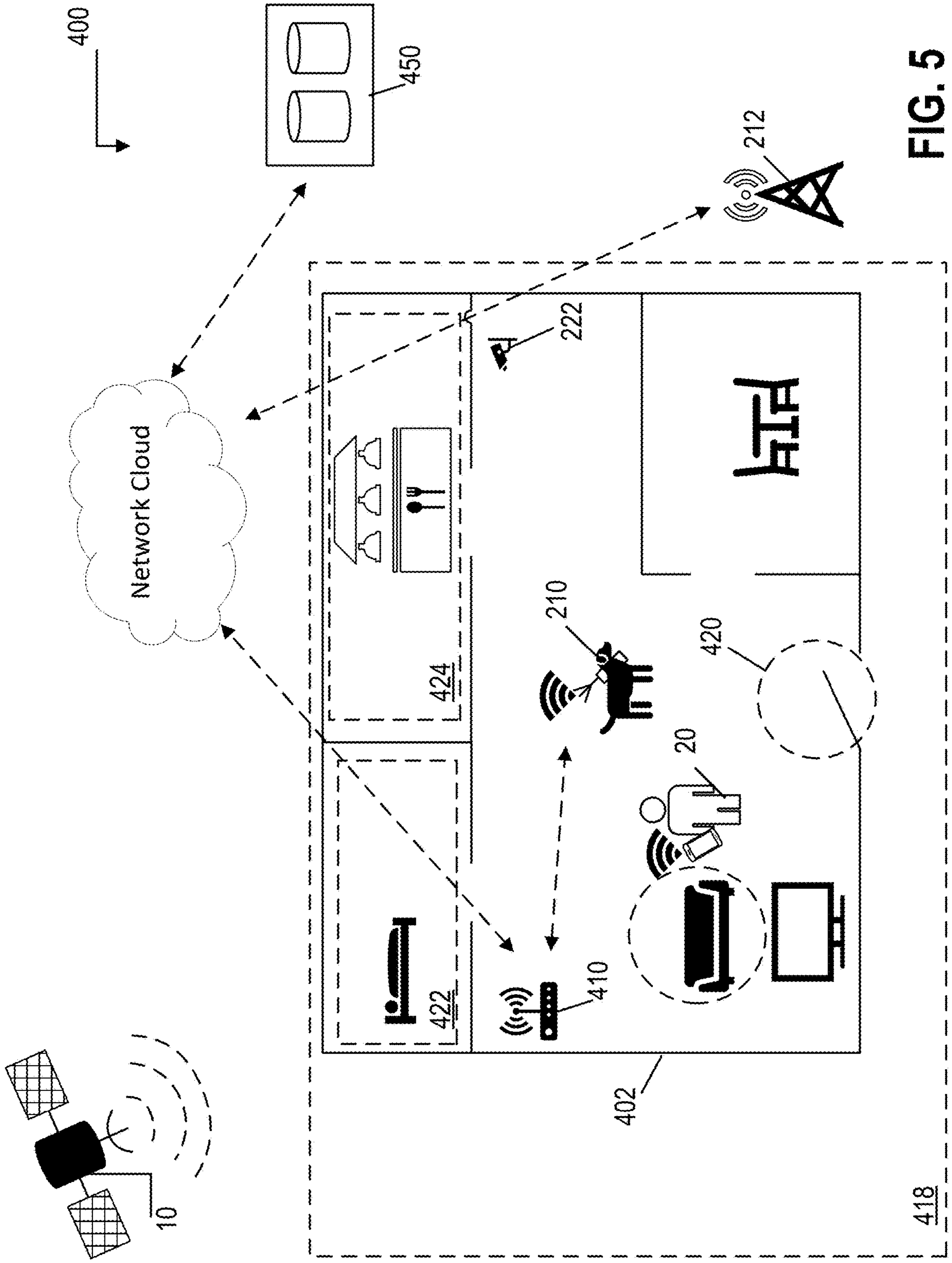
FIG. 5 illustrates an example of an animal tracking system using fine-grained interior location features, in accordance with examples of the present disclosure.

FIG. 5 illustrates an example of an animal tracking system 400 in accordance with the present disclosure. The animal tracking system 400 is usable in both indoor and outdoor applications, in example embodiments. In the specific configuration as shown, a tracking device associated with tracked animal 210 may move between an interior or indoor environment and an outdoor environment. In the outdoor environment, a virtual boundary 418 may be defined. In indoor environment may be defined within a building, such as a residence 402. In the example shown, the tracked animal 210 may be tracked using an animal collar as described below. The animal color may communicate, in various embodiments, with a satellite 10, a base station 212, as well as one or more internal communication devices, such as an ultra-wideband communication unit 410. A user 20 may operate a mobile device to control the animal tracking device associated with the tracked animal 210.

In the example shown, an entry region 420 may be defined at an entryway of the residence 402. The entry region 420 may be a region at which communication methodologies change at the animal collar, for example between a first communication methodology using the satellite 10 and base station 212 (e.g., when outside) and a second methodology using ultra-wideband communication unit 410 (e.g., when inside).

Additionally, within the residence 402, a plurality of sub-zones may be defined, shown as sub-zones 422, 424. As described further below, each of them may be defined as having a three-dimensional volume, and may trigger specific responses of an animal tracking device. In particular, the ultra-wideband communication unit 410 may, in combination with the animal tracking device, assist in determining a three-dimensional position of that device, thereby allowing fine-grained, indoor control, and tracking of the animal. For example, the tracking system includes a plurality of subzones 422, 424 within the virtual zone 418 overall or within the residence 402 more specifically. These subzones may include knowledge zones that surround furniture and the front door, as well as, e.g., exclusion zones covering the kitchen and bedroom. Further details regarding such an arrangement are described below.

In some examples, the animal tracking system 400 may be integrated with one or more other connected devices. In the example shown, a security camera 222 is present within the residence 402. In response to certain detected actions, the animal tracking system 400 may trigger an integration with the security camera to trigger activity of the security camera. Alternatively, if the security camera is configured for continuous monitoring, a notification from the animal tracking system 400 regarding actions of the tracked animal 210 may include a link to directly access information from other integrated IoT devices such as the security camera 222 to view activities of the animal. In that way, the user 20 may easily remotely or locally monitor activities of the animal when not in the same room or when otherwise away, directly in response to notifications issued by an animal tracking device. Such a feature is described below in conjunction with FIG. 47.

In some embodiments, the animal tracking system 400 is configured to continue tracking the animal 210 with the tracking device when it is located indoors. While RTK offers tracking capabilities inside buildings, the UWB-based tracking provides high accuracy and precision tracking with lower power consumption while indoors. Thus, the tracking device is configured to suspend RTK tracking capabilities upon entering the virtual zone that encompasses the house and begin tracking via UWB instead. Utilizing an alternative tracking system allows for tracking and containment features to extend to the indoor environment without the power consumption of relying on RTK. Further, the UWB tracking connects to the network cloud and can store data in a remote server similarly to the RTK system.

II. Example Hardware for Base Station, Animal Tracking Device, User Device

Referring now to FIGS. 6-9, details regarding an example hardware implementation of components of an animal containment system are provided, in accordance with some embodiments described herein. The hardware implementation includes one or more base stations, one or more animal tracking devices, such as an animal collar, and one or more user computing devices, such as a mobile computing device.

Figure 6:
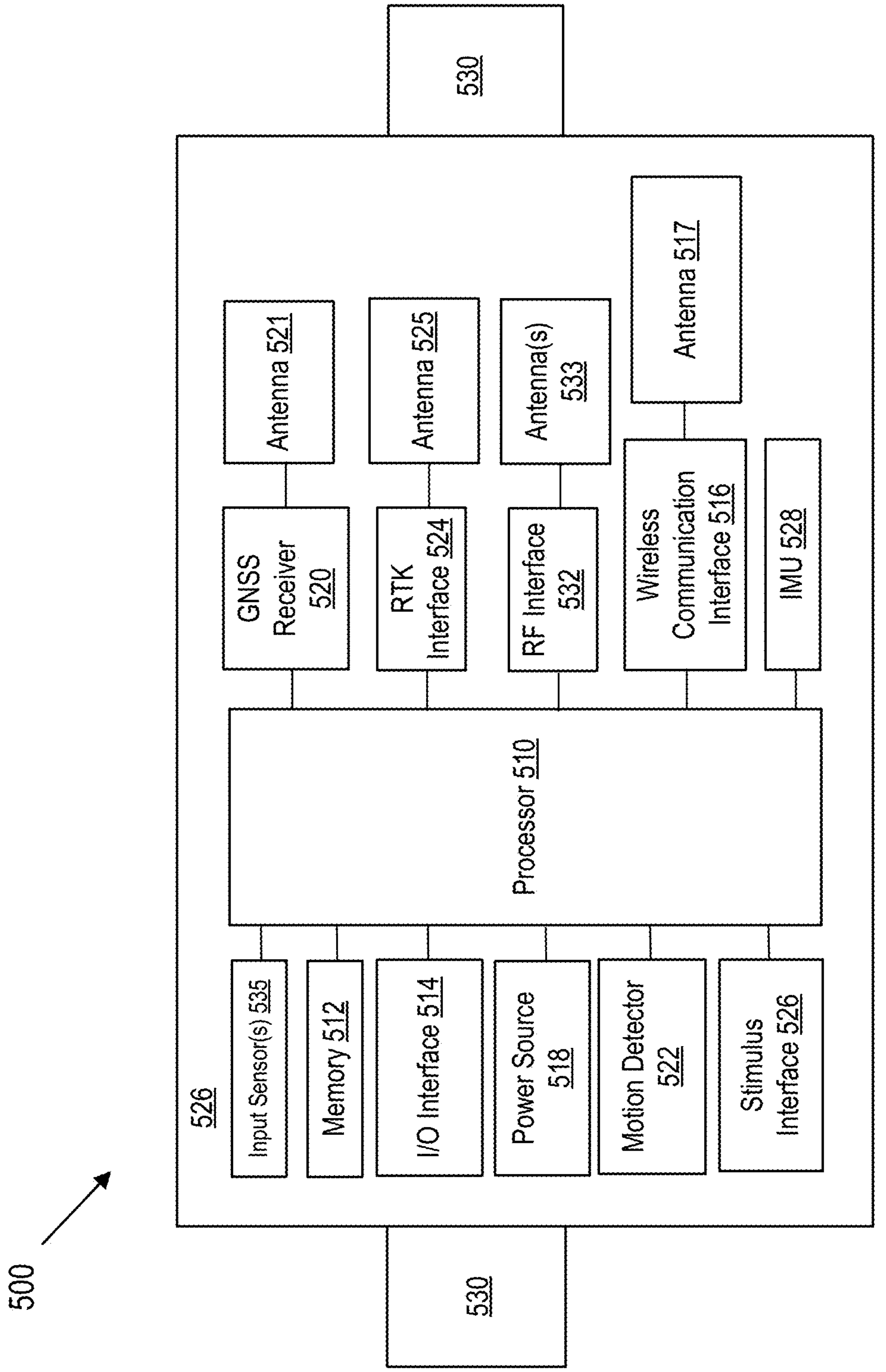
FIG. 6 illustrates an example animal tracking device implementing aspects of the present disclosure.

FIG. 6 illustrates an example animal tracking device 500, for example which may be implemented within an animal collar. The animal tracking device 500 represents one possible implementation of animal tracking devices as may be used herein, such as the animal collar 14 of FIG. 1. In the shown embodiment, animal tracking device includes processor 510, memory 512, I/O Interface 514, wireless communication interface 516, power source 518, GNSS receiver 520, motion detector 522, RTK interface 524, stimulus interface 526, and optionally, inertial measurement unit (IMU) 528.

As shown, processor 510 is configurable to execute instructions stored in memory 512 to perform various collar functions. Example collar functions may include: receiving information regarding virtual boundaries and exclusion zones, determining a current location and speed based on received data, reading data from other components, updating dynamic corridors, providing alerts based on boundary violations, generating stimuli and other necessary data for performing other operations. Further, data such as boundary coordinates, timing data, activity tracking, keep out area data, virtual gate data, and other needed data to perform the previously mentioned functions and features.

The processor 510 may be implemented as a central processing unit (CPU), digital signal processor (DSP), or other similar device, and may be embodied as a standalone unit or as a device shared with components of the device, within a collar 100 as described herein. The processor 510 may include memory for storing the software instructions. Alternatively, the memory 512 may be maintained as a separate memory device for storing the software instructions that is electrically connected to the processor for the bi-directional communication of the instructions, data, and signals therebetween.

In the example shown, I/O interface 514 corresponds to an interface to one or more input devices, such as buttons or wired data input leads, that allow a user to set animal tracking device 500 in different modes such as on/off, a high or low accuracy mode, or pair the collar through Bluetooth with a separate computing device, such as a mobile device. In other embodiments, I/O interface connects to lights that can indicate a status of the collar such as low battery, operating error, or other such events.

In the example shown, wireless communication interface 516 may have an integrated or separate antenna 517, and may be configured for connection to one or more of Wi-Fi, Bluetooth, cellular services (e.g., LTE, 5G and the like), long range RF communication, mesh communication (e.g., via Thread or other protocols), or other communication methods to allow for the transfer of data. In some examples, an integrated circuit capable of multi-band communication is utilized to allow for communication according to any of a plurality of wireless protocols. In use, the wireless communication interface 516 may be used to exchange data from the animal tracking device 500 to a network cloud (e.g., cloud 22 of FIG. 1), for exchange of data with a user device, such as mobile device 18. In some examples, the wireless communication interface 516 may further include an ultra-wideband (UWB) antenna and interface configured to communicate via UWB protocols to determine direction and distance information relative to another object, thereby allowing generation of fine-grained location information when within a building (e.g., a residence 402).

In some embodiments, the wireless communication interface 516 also includes wireless ranging capabilities. Wireless ranging is a technology that allows devices to measure the distance between them using wireless signals. In some embodiments, wireless ranging works by calculating the time it takes for a signal to travel from one device to another and back again, also known as "time-of-flight" measurement. This information can then be used to determine the precise distance between the two devices. For example, the wireless communication interface 516 may perform Wi-Fi Round Trip Time (RTT).

In some embodiments, the wireless communication interface 516 uses Received Signal Strength Indicator (RSSI) to determine distance between itself and a transmitting device. RSSI is a measurement of how strong a wireless signal is when it's received by a device, like a phone or laptop. The wireless communication interface 516 may receive RSSI data from another device and provide the data to the processor 510. The processor 510 then determines a distance to the transmitting device based on the RSSI data. For example, The RSSI data may include a standard RSSI strength for a known distance. Further, the wireless communication interface 516 may also determine the strength or amplitude of the received signal and provide the data to the processor 510. The processor 510 then determines the distance to the transmitting device by comparing the known distance strength data to the determined strength of the received signal.

In the example shown, power source 518 may be a battery that is either rechargeable or replaceable and supplies power to all components. For example, power source 518 may be a lithium-ion, alkaline, or other rechargeable or disposable battery.

In the example shown, GNSS receiver 520 receives data in the form of signals from satellites that provide such data. Further, GNSS receiver 520 may include a patch antenna and a demodulator, shown as antenna 521. The patch antenna is merely exemplary, and it is recognized that the GNSS receiver 520 may utilize any of a variety of types of antennas as may provide adequate reception capabilities suitable for animal tracking applications.

In the example shown, motion detector 522 supplies motion data to the processor 510. In examples, the motion detector may include an accelerometer and/or gyroscope, and provides movement data that may include velocity, speed, direction, or acceleration. Other types of motion detection could be used as well.

In the example shown, an RTK interface 524 may also be included. In example implementations the RTK interface comprises an RF communication interface configured to receive location adjustment data from an RTK base station. The RTK interface 524 may utilize an RF antenna 525, and may be configured to select an appropriate base station for communication. In some examples, the RTK interface 524 may be configured to communicate RTK information with a base station via an intermediary gateway, which may be located at the location of the animal tracking device. In some instances, the RTK interface 524 may be implemented using a different type of communication protocol other than RF or low-frequency RF, such as Wi-Fi, cellular, wired, or the like.

Additionally, in the example shown, the animal tracking device 500 includes a stimulus interface 526. The stimulus interface 526 may provide a stimulus to the animal tracked, based on actuation by the processor 510. In example embodiments, the stimulus interface may include a speaker and/or electrical stimulus interface, and is configured to deliver sound, vibration, or electrical stimulus to an animal in response to the processor 510 determining whether predetermined criteria are met. Example criteria may include a location of the animal tracking device 500 relative to a virtual boundary defining a containment area or exclusion zone, or may be in response to a detected noise or motion made by the animal (e.g., barking, lunging, and the like).

In some example embodiments, the animal tracking device 500 may include an inertial measurement unit (IMU) 528. The IMU 528 senses how an object is moving in space. The IMU 528 may include package of sensors that provide data to describe an object's motion including its orientation, velocity, and/or position. The IMU 528 may be a gyroscope accelerometer. The processor 510 may receive data from the IMU 528 that is used when determining the position of the tracking device 500 or a direction of movement. The processor 510 may also receive location data and use additional information local to the animal tracking device, such as received via motion detector 522 to determine the position of the tracking device 500. In some embodiments, the processor 510 may use a current location and past locations of the animal tracking device 500 along with data readings received from the IMU 528 and implement a model useable to accurately predict a location of the animal tracking device 500 without renewed receipt of location data for at least some period of time (e.g., on the order of 1-5 seconds). Accordingly, in embodiments which use an IMU 528, the animal tracking device 500 may reduce a frequency of polling and/or calculating position and/or observation data using the GNSS receiver 520 and/or RTK interface 524. In some embodiments, the processor 510 also connects to a magnetometer that provides an orientation direction of the tracking device 500 relative to Earth's magnetic field.

Collar strap 530 may be a nylon strap, leather, or other material that can attach to an animal. It may further include clips or hook-and-loop straps to attach one side to the other. In alternative embodiments, other types of attachment mechanisms for the animal tracking device may be used. For example, a harness, or a clip to other attachment mechanisms may be utilized.

In the example shown, the animal tracking device 500 may include one or more additional input sensors 535. The additional input sensors 535 may take a number of forms, and capture further information about animal behavior. In example implementations the additional sensors 535 may include, e.g., a microphone, a gyroscope, an accelerometer, a heart rate monitor, a temperature sensor, and the like. Accordingly, activity, sounds, or health activity of the animal wearing the animal tracking device may be captured and used, in combination with position information, to inform animal behavior in a way that may be tracked, stored, and reported to a user.

Figure 7:
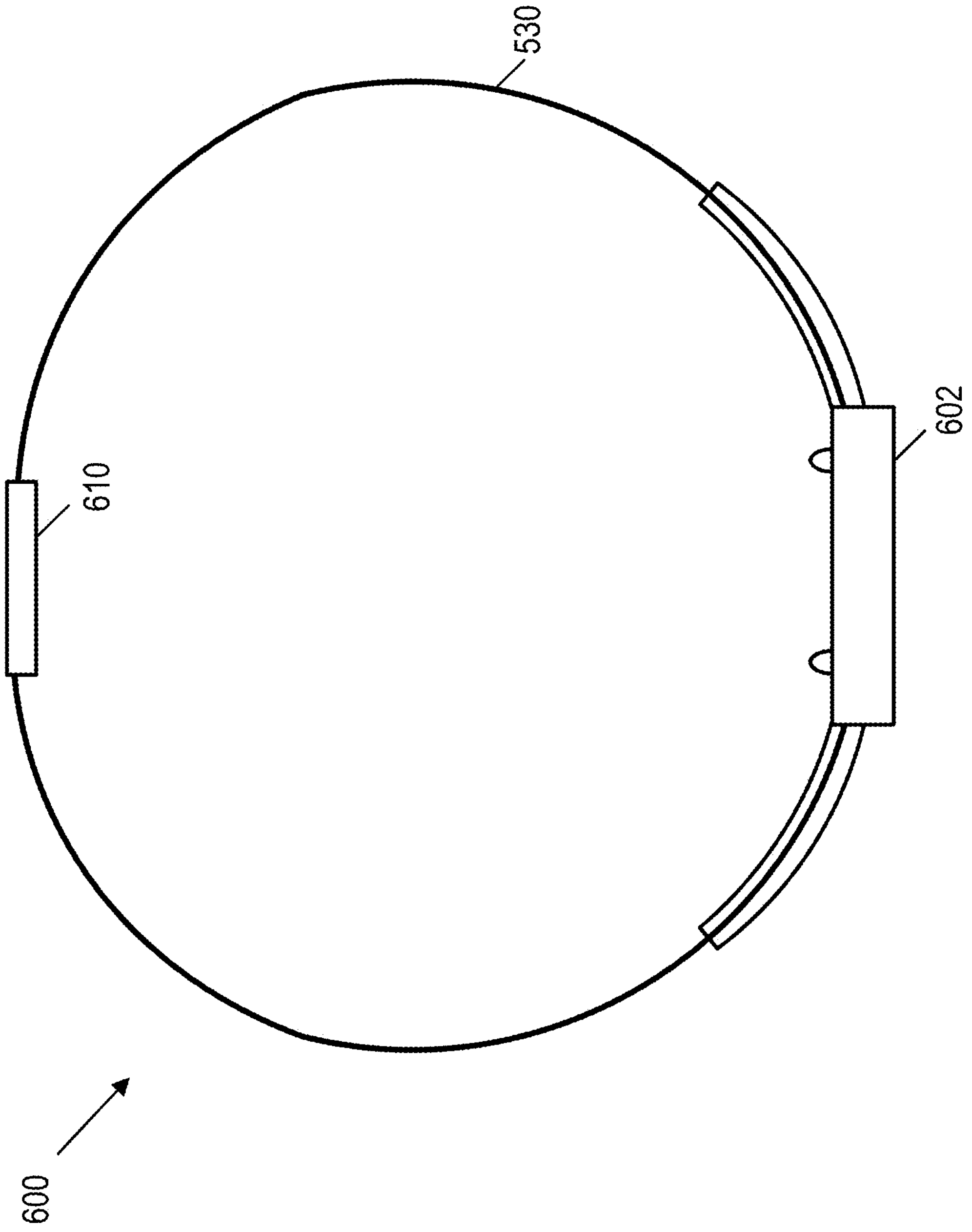
FIG. 7 illustrates an example physical depiction of the animal tracking device of FIG. 6.

FIG. 7 illustrates an example physical appearance of an animal collar 600. The animal collar 600 may implement the animal tracking device of FIG. 6, and includes a housing 602 for containing the electrical and communication components described above in FIG. 5. In the example shown, the housing 602 retains batteries and other components, and typically will hang under a neck of the wearing animal. In the example shown, an antenna module 610 may be positioned opposite the housing 602 along the collar strap 530. A wired connection between the housing 602 and antenna module 610 may be provided such that the communication interfaces (including at least the GNSS receiver 520 and RTK interface 524) may be located within the housing 602 but their associated antenna interfaces may be located on a back neck area of an animal, thereby ensuring improved reception due to position. Details regarding one possible antenna arrangement that may be used in the present disclosure is illustrated in U.S. Patent Publication No. 2023/0301532, the disclosure of which is incorporated by reference in its entirety.

In alternative embodiments, other arrangements for maintaining position of an antenna in a location to maximize likely reception are possible as well. For example, in some embodiments multiple antenna arrays may be dispersed along the length of the collar strap 530. In other embodiments, a GNSS receiver (e.g., GNSS receiver 520) or other wireless communication interfaces may be collocated with the antenna within a model separate from the housing 602. In still further embodiments, other communication interfaces may be collocated with the antenna within the antenna module 610. Such communication interfaces may be connected, via wired or wireless connection, to circuitry within the housing 602, including a processor (e.g., such as processor 510).

Figure 8:
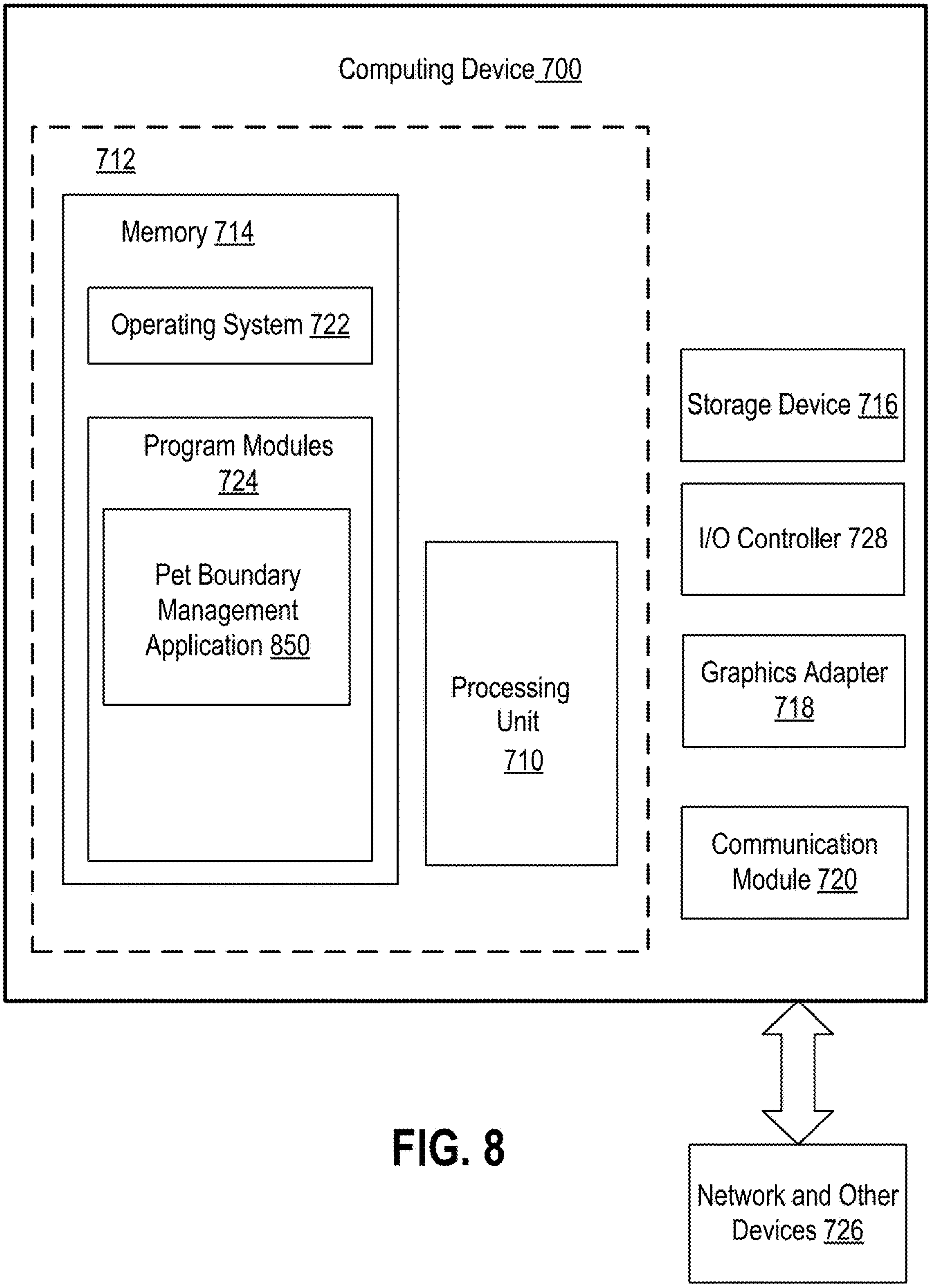
FIG. 8 illustrates an example computing device that can perform various features and aspects of an animal tracking system.

Some of the features discussed in this disclosure are implemented using one or more computers. For example, the mobile device 18, cloud service 22, and the like may be implemented using various types of mobile devices, servers, and the like. FIG. 8 is a block diagram that illustrates a computing system 700 according to some embodiments. Illustrated are the one or more processor 710 coupled to a chipset 712. Also coupled to the chipset 712 are a memory 714, a storage device 716, a graphics adapter 718, and a network adapter 720. In one embodiment, the functionality of the chipset 712 is provided by operating system 722, program modules 724, and an I/O controller 728. In another embodiment, the memory 714 is coupled directly to the processor 710 instead of the chipset 712.

The storage device 716 is any non-transitory computer-readable storage medium, such as a hard drive, compact disk read-only memory (CD-ROM), DVD, or a solid-state memory device. The memory 714 holds instructions and data used by the processor 710. In an instance where the computing system 700 implements a mobile device such as mobile device 18, the memory 714 may be configured to store instructions that, when executed, implement an animal boundary management application 850. As discussed further below, such an animal boundary management application may manage communications between the computing system 700 and other devices, such as an animal tracking device, base stations (e.g., RTK base stations and/or ultra wideband base stations), server systems, and the like, to coordinate creation of virtual boundaries using the hardware and software systems described herein, as well as to control settings provided to an animal tracking device (e.g., animal collar) and/or base stations, and receive notifications and other data from servers and/or animal tracking devices in response to, e.g., determined location data from animal tracking devices.

I/O controller 728 can connect to a pointing device that may be a mouse, track ball, or other type of pointing device, and is used in combination with a keyboard to input data into the computing system 700. The graphics adapter 718 displays images and other information on a connected display. The network adapter 720 couples the computing system 700 to a network and other devices 726.

As is known in the art, a computing system 700 can have different and/or other components than those shown. In addition, computing system 700 can lack certain illustrated components. For example, the computer can be formed of multiple blade servers linked together into one or more distributed systems and lack components such as keyboards and displays. Moreover, the storage device 716 can be local and/or remote from the computing system 700 (such as embodied within a storage area network (SAN)).

Figure 9:
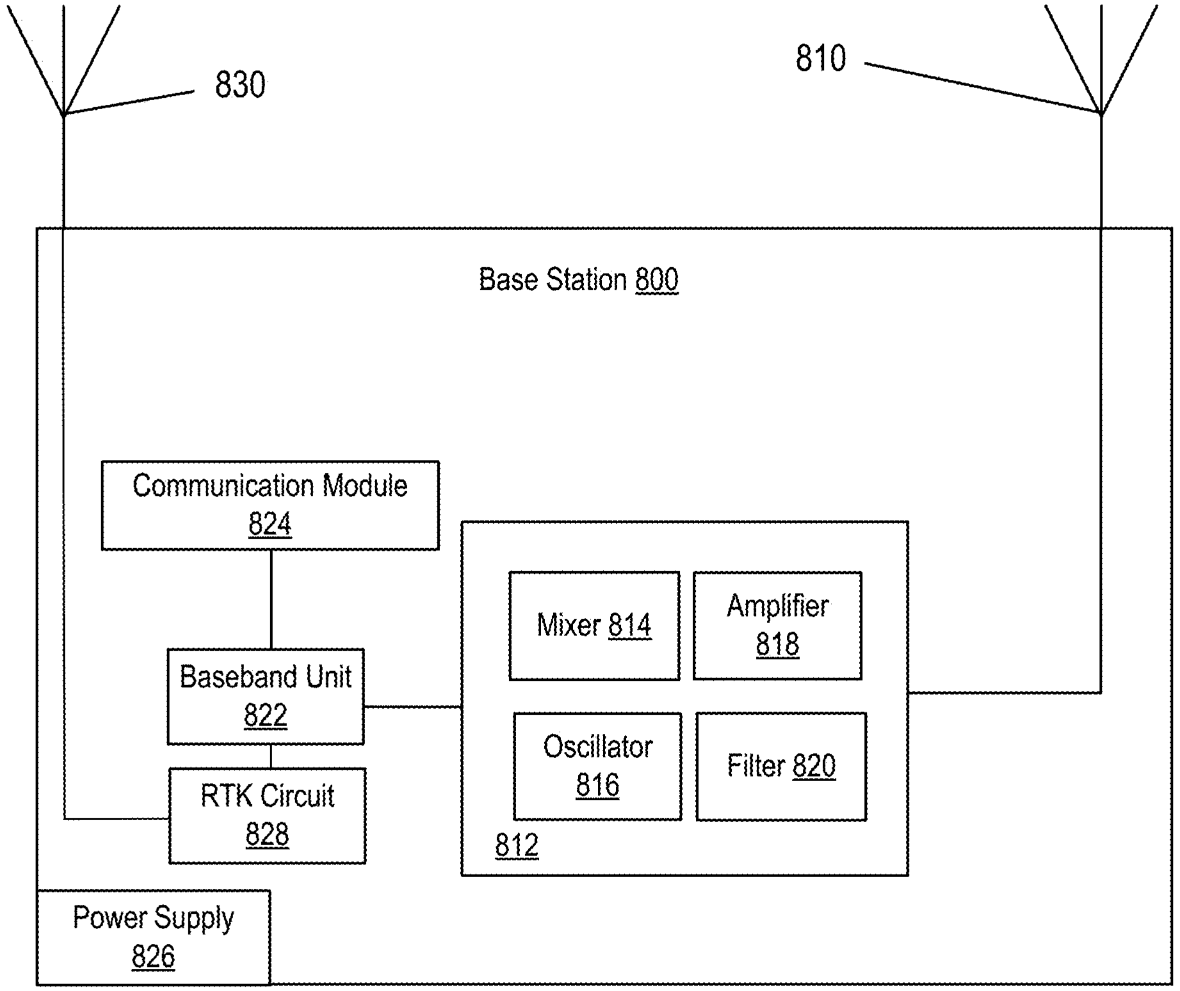
FIG. 9 illustrates an example positioning base station used in an animal tracking system.

FIG. 9 illustrates an example base station 800 is shown that may be used in an animal tracking system in accordance with aspects of the present disclosure. In the shown embodiment, base station 800 includes antenna 810 that receives GNSS signals from satellites and passes the signals to demodulator 812. Demodulator 812 includes mixer 814 to change the frequency of the received signals by mixing the received signals with a signal produced by oscillator 816. Amplifier 818 then increases the voltage level of the received signals and filter 820 removes noise and other unwanted signals from the produced signal that is then passed to baseband unit 822 for data processing. In addition, base station 800 includes communication module 824 for communicating data with other devices and power supply 826 that supplies power to each included component. Further, RTK circuit receives calculated positional data from baseband unit 822 and transmits the positional data using antenna 830.

In the shown embodiment, base station 800 may be used as any of the previously described base stations and may be configured to perform the previously described features.

Further, 810 may be a patch antenna configured for GNSS signal reception, quadrifilar helix antennas, loop antenna, yagi antenna or other types of antennas capable of receiving electromagnetic signals. Demodulator 812 may include other components than those listed or more. Further, it may be a GNSS signal demodulator. Baseband unit 822 may include other components such as a memory, processor, controller, I/O module, or other components configured to process data. Power supply 826 is configured to supply power at a specific voltage and current ratings based on each individual components needs. In some embodiments, antenna 810 and antenna 830 are the same, and are used by a transceiver.

In example implementations, the base station 800 may be configured to generate observation data, also referred to herein as observation data. The observation data may include information about satellites from which it receives signals including a number of clock cycles, clock phase, and the like. This data may be provided to an animal tracking device such as those described herein, either directly or indirectly, for use in computing corrections to GPS/GNSS locations obtained by such animal tracking devices. Details regarding use of such observation data are provided below.

Figure 10:
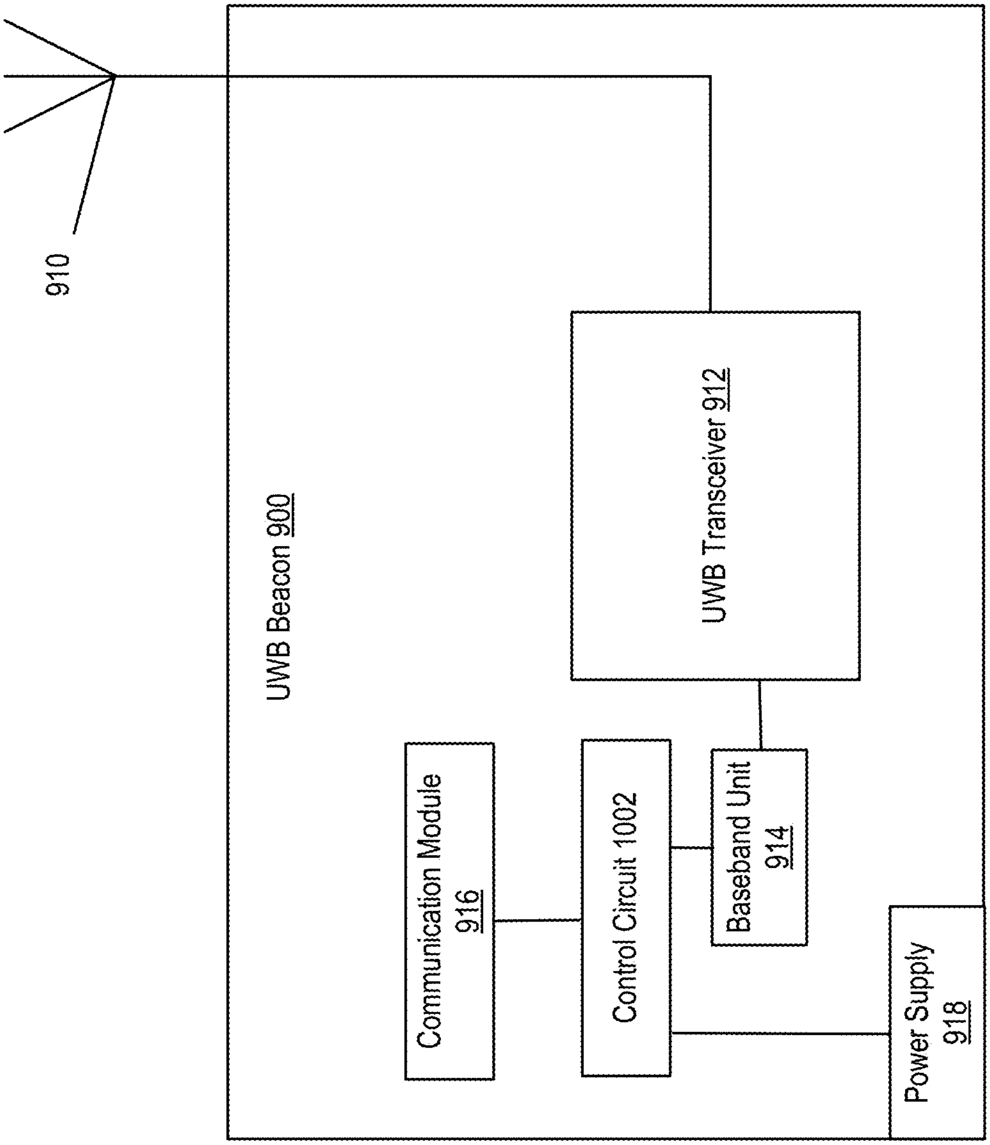
FIG. 10 illustrates an example ultra-wideband beacon used in the tracking systems described herein.

FIG. 10 illustrates an example ultra-wideband beacon used in the tracking system of FIG. 5. UWB beacon 900 includes antenna 910. As previously described, a tracking device can determine its location using UWB. For example, the antenna 910 is configured to receive a signal transmitted from a tracking device, such as an animal collar. The signal is processed and demodulated through UWB transceiver 912. The signal may include a broad-spectrum signal and may utilize pulse position modulation, with data encoded in particular pulse timing within a frame to encode digital information. The baseband unit 914 processes the received digital data to determine the contents of the received signal. In some examples, the baseband unit 914 determines the timestamp and identification data of the transmitting tracking device. After determining a reply signal is required, the baseband unit 914 generates a signal with its own identification data and timestamp, which the signals are then passed to UWB transceiver 912 for modulation and processing. Antenna 910 transmits the modulated signal back to the tracking device for further location determination. In addition to these components, UWB beacon 900 includes a communication module 916 that transmits data. For example, received tracking information may transmitted to a remote computing device or the communication module 916 may be used to initialize the UWB beacon 900. Power supply 918 supplies power to the components within included with UWB beacon 900.

In various examples, either the UWB beacon or tracking device may determine its location relative to the other device using time-of-arrival (TOA) based positioning. For example, in some embodiments, the timing of receipt of signals at the UWB beacon 900 may allow the UWB beacon to determine its position relative to the tracking device, for example when the tracking device has emitted signals received at the UWB beacon 900. From this, the UWB beacon 900 may communicate that position information to the tracking device, to enable the tracking device to extrapolate its position relative to a known position of the beacon, or the beacon 900 may determine a position of the tracking device given that the beacon knows its own position. In alternative arrangements, when the UWB beacon is positioned at a known location, the beacon may communicate its position to the tracking device, which may determine its own position by calculating a position and angle vector relative to that known position via UWB signaling.

In examples, although disclosed as a UWB beacon 900, other types of wireless communication devices may be used that implement ranging and/or communications capabilities, for communication with, and distance determinations relative to, an animal tracking device, such as an animal collar. As such, when referencing devices herein which communicate with an animal tracking device, it is further contemplated that, using wireless signal strength, time of flight, phase angle of wireless signals, or other methodologies such devices may be used to perform one or both of wireless communication and ranging functionalities, either alone or in combination with the animal tracking device itself.

III. Tracking System Setup and General Operation

Figure 11:
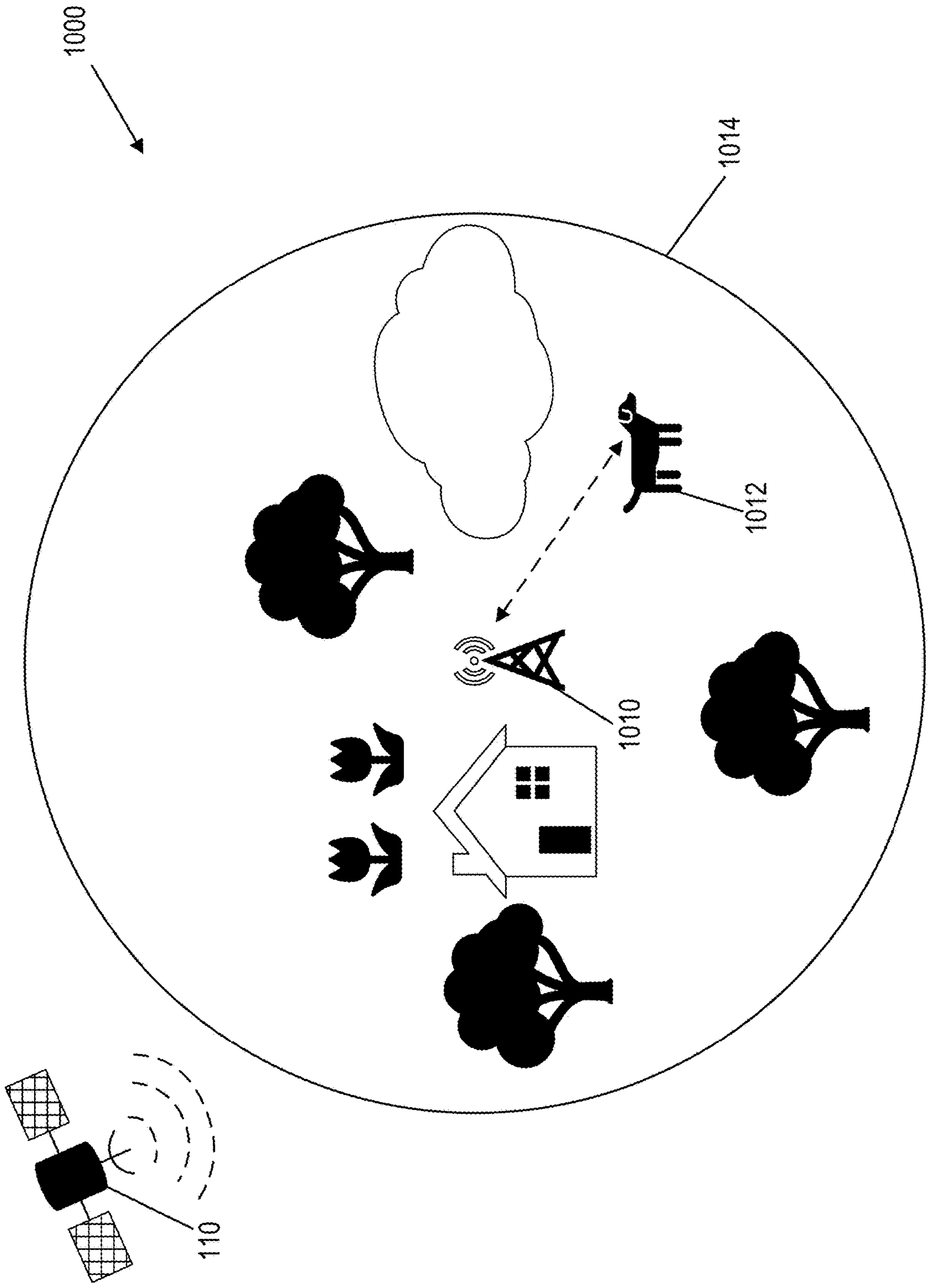
FIG. 11 is a schematic diagram illustrating initialization of a positioning base station at a premises, in accordance with an example implementation.

Referring to FIGS. 11-18, example setup processes are described for use of an animal tracking system in accordance with the present disclosure. FIG. 11 illustrates an example initialization of a base station. In the shown embodiment, the animal tracking system 1000 includes base station 1010 that receives GNSS signals from satellite 110. These signals are used to initialize base station 1010, which then surveys its position. Using this data, base station 1010 can provide correction signals or communicate with a tracking device attached to tracked animal 1012. The correction signals may be used to determine an adjusted location of the tracked animal 1012 relative to a defined boundary 1014 for containing tracked animal 1012.

In the context of use of RTK-based positioning, the base station 1010 may take several minutes before it achieves high accuracy. This is at least in part due surveying its position using signals from satellite 110 can take a period of time before base station 1010 knows its location at the centimeter level because the base station 1010 typically will need a large number of readings to be able to obtain an averaged position that is sufficiently accurate. Further, noise, interference, weather, and other obstructions may cause base station 1010 to decrease its accuracy in calculating its position. Thus, corrected signals from the base station 1010 that are transmitted to an animal tracking device will also lose accuracy. With the loss of accuracy, features described herein may not operate as intended. Accordingly, in some cases, in the context of the present disclosure the animal tracking system 1000 determines that accuracy has decreased below a predetermined threshold, then the animal tracking system 1000 may begin deactivating features. For example, the tracking device 1010 may no longer provide a feedback or stimulus once tracked animal 1012 crosses boundary 1014 to prevent false corrections, or may do so at a different time. In other embodiments, keep out zones, dynamic corridor forming, virtual gates, and other features described herein may be disabled. In still further embodiments, the tracking device attached to tracked animal 1012 may enter a power saving mode and suspend operations, such as transmission of its location over a wireless network, until accuracy is restored above the predetermined threshold. The predetermined threshold may be calculated based on an average of accuracies obtained over a period of time, or it may be set by a user.

Figure 12:
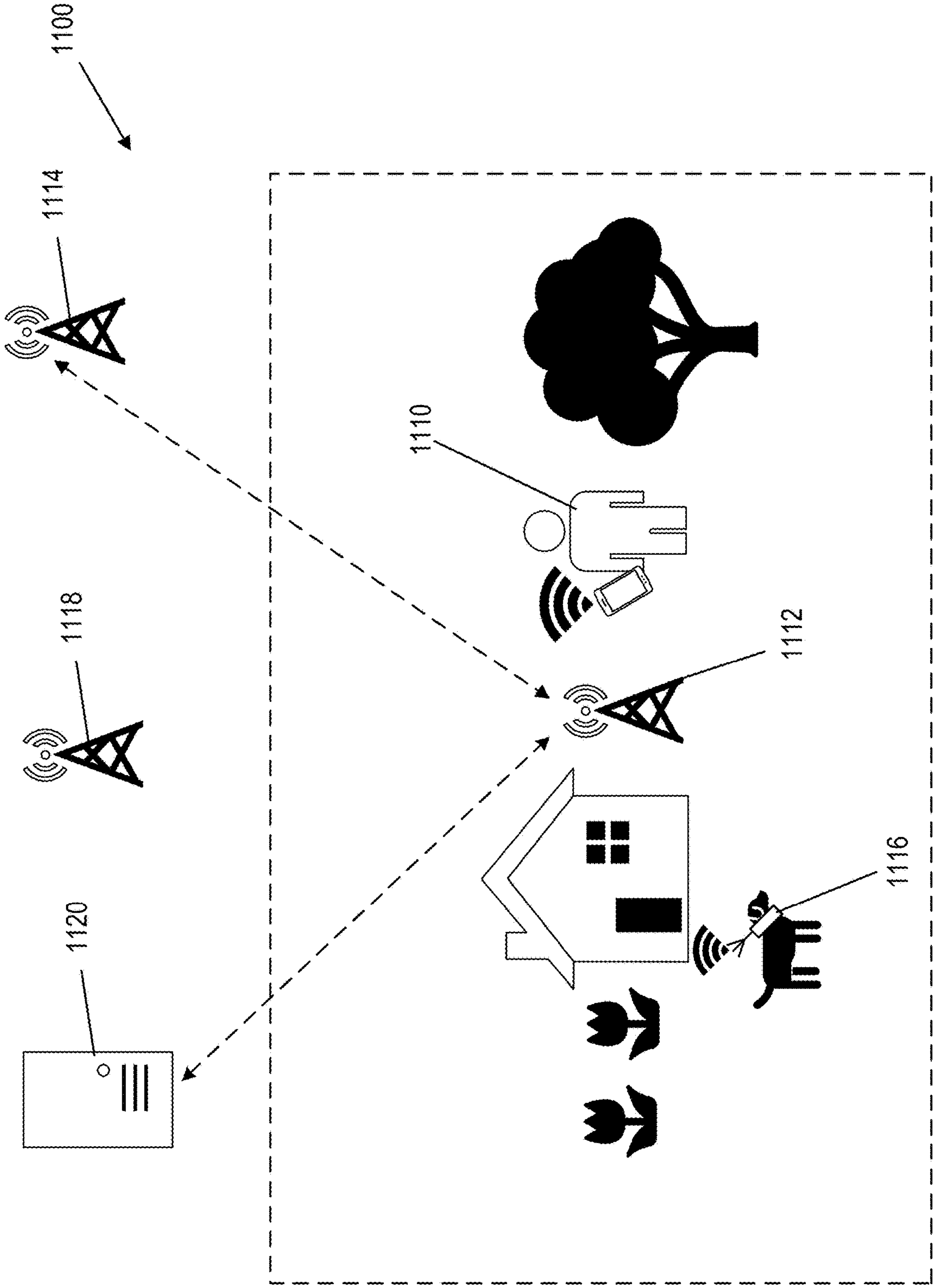
FIG. 12 is a schematic diagram illustrating rapid initialization of positioning a base station at a premises based on availability of a proximate base station, in accordance with an example implementation.

FIG. 12 illustrates a further environment 1100 usable to assist in establishing a high accuracy correction signal from a RTK base station 1112, for example for use in conjunction with tracking an animal 1116 via a tracking device. In the implementation shown, the RTK base station 1112 may either be programmed to, or instructed to by a mobile device associated with a user 1110, identify one or more other base stations from among a plurality of base stations, to receive trusted observation data. The other base stations may include one or more base stations, such as RTK base stations 1114, 1118, and the initializing RTK base station 1112 may identify one or more than one of these base stations as trusted, to receive observation data therefrom. For example, the initializing RTK base station 1112 may retrieve data from a server 1120, for example identifying trusted observation data that is available, and may be associated with one or both of the RTK base stations 1114, 1118. The initializing RTK base station 1112 may enter an initialization mode (e.g., such as a rover mode) to retrieve observation data associated with one of these other base stations, and then may enter a base station mode, using the observation data as its own observation data, given that the data has been considered trusted. Observation data may be considered trusted based on, for example, the other base station having a known position (e.g., being controlled by a reliable entity, such as a manufacturer of the animal tracking system) or having generated consistent observation data over a period of time, thereby indicating that it is reliable. Additionally, the observation data may be considered trusted if it comes from an RTK base station that is within a threshold distance from the initializing RTK base station 1112.

In accordance with the present disclosure, the use of observation data from another base station for purposes of initialization of an initializing RTK base station 1112 has a number of advantages in terms of speed of accurate calibration. Specifically, the initializing RTK base station 1112 may quickly achieve a high degree of accuracy (e.g., centimeter-level accuracy) for positioning within an hour, as compared to a many-hour, or day-plus long calibration process as the RTK base station 1112 would otherwise slowly calibrate its position from RTK-based corrections.

Figure 13:
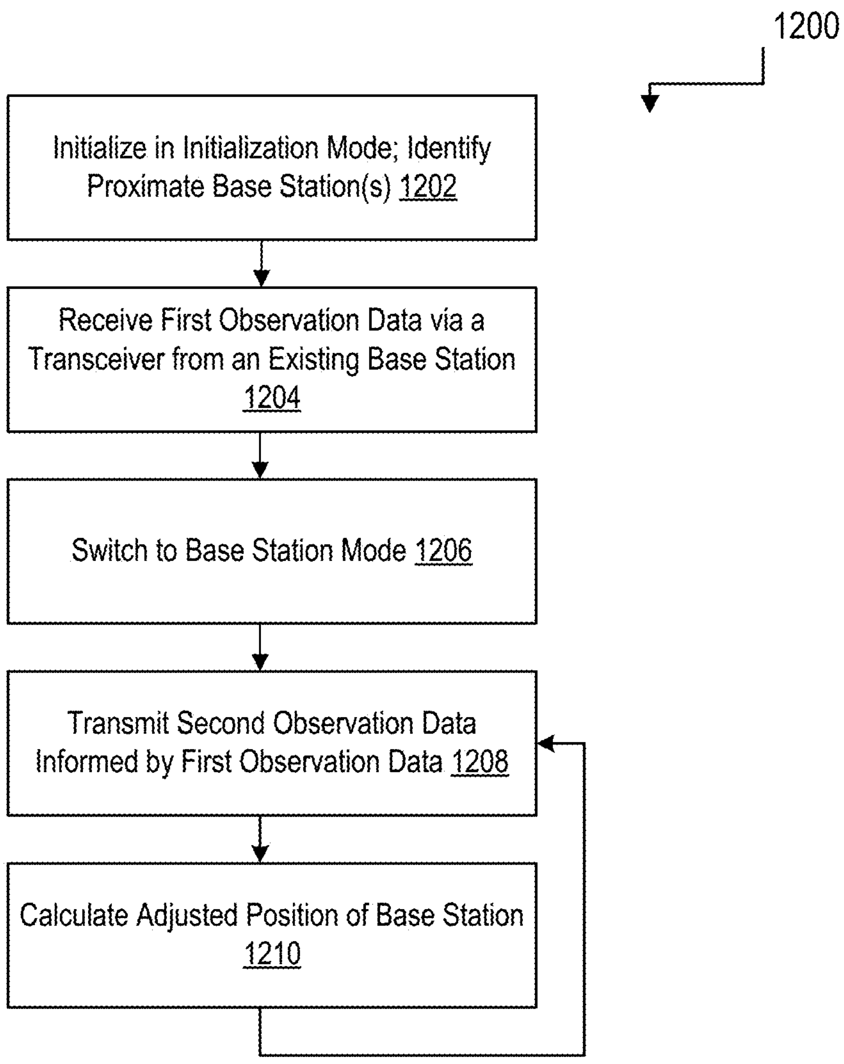
FIG. 13 is a flowchart of a method of rapid initialization of fine-grained satellite-based location features, in accordance with examples of the present disclosure.

FIG. 13 illustrates a method 1200 of quickly initializing anarchy keep a station in accordance with the above described principles. In the example shown, an initializing RTK base station may enter an initialization mode, and identify one or more proximate base stations thereto (step 1202). The identification of proximate base stations may be based on information stored at a server, such as server 1120 of FIG. 12, or may be downloaded to the initializing RTK base station at the time of initialization. In examples, one or more than one such base station may be considered a trusted base station, or its observation data may be considered trusted observation data.

In the example shown, the method 1200 includes receiving observation data from another existing base station, such as the one or more base stations identified in step 1202 (step 1204). Once trusted observation data is obtained from another base station, the initializing RTK base station may transition to a base station mode (step 1206). In the base station mode, the now initialized RTK base station may begin to transmit second observation data that is informed by the first observation data received from the other one or more RTK base stations (step 1208). The second observation data may be a replication of the first observation data received from the other base stations, or may be calculated based on that received observation data. For example, the second observation data may be a calculated average of the observation data received from two or more trusted RTK base stations other examples or implementations are possible as well.

In the example shown, the method 1200 includes calculating an adjusted position of the RTK base station (step 1210). The adjusted position may be utilized as further observation data, and output by the base station for further correction. Accordingly, after an RTK base station is initialized using trusted observation data from other base stations, it may then continue to capture GPS readings and perform in averaging using new GPS readings and the existing observation data to improve accuracy further.

Figure 14:
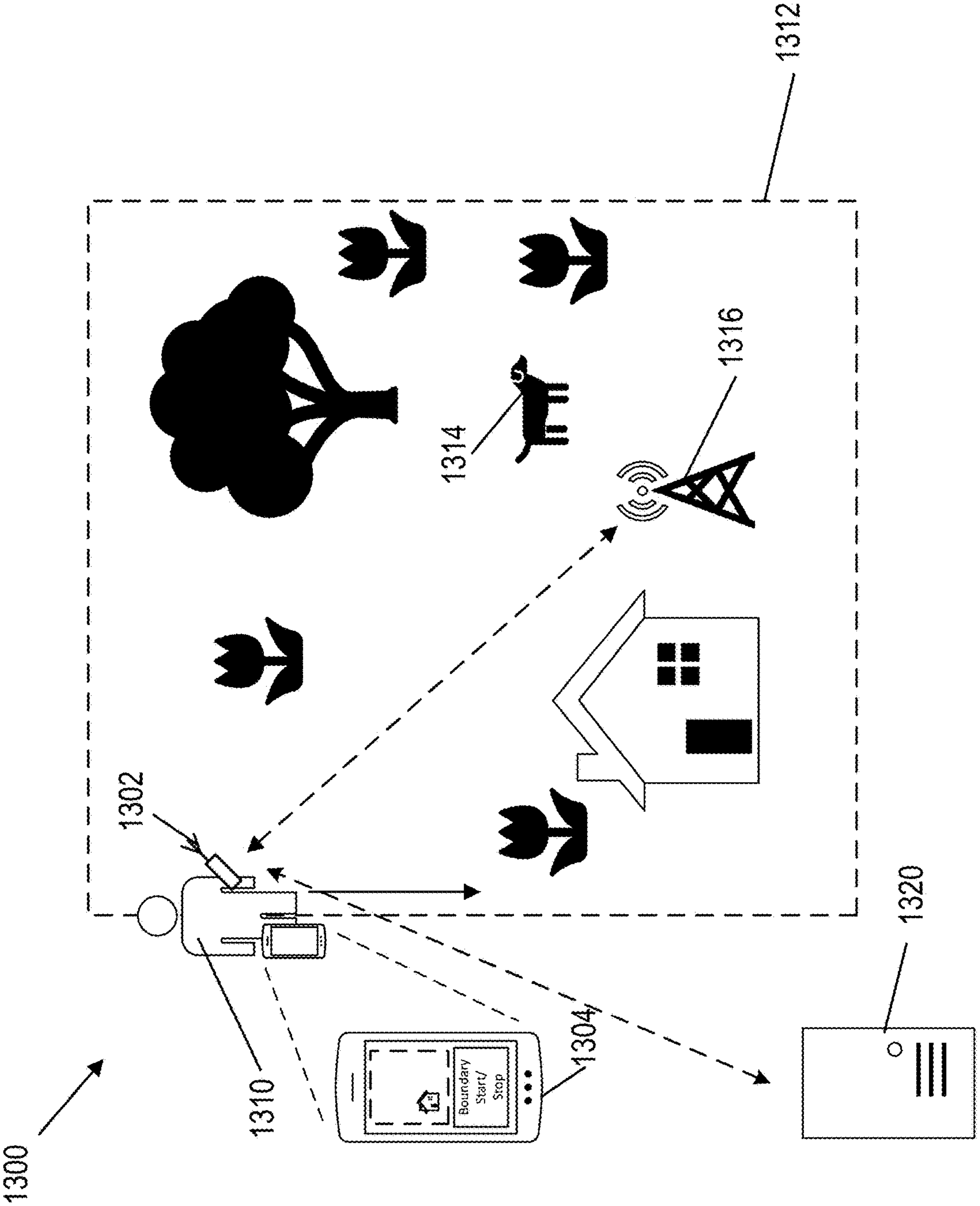
FIG. 14 illustrates an example schematic illustration of a process for establishing a boundary of an animal tracking system.

FIG. 14 illustrates an example method 1300 for establishing a boundary of an animal tracking system. In the shown embodiment, a user 1310 traverses the perimeter of boundary 1312 to establish it as a containment area for tracked animal 1314. In doing so, the user 1310 may carry an animal tracking device, such as animal tracking device 1302, while the animal tracking device is operating in a high-accuracy mode (e.g., receiving positional adjustment via RTK). In such an arrangement, base station 1316 provides observation data to the animal tracking device 1302 while that device is held by or attached to user 1310.

In use, a user may initiate a boundary definition process, and may traverse a boundary after the animal tracking device enters a boundary definition mode. Initiation of the boundary definition process may occur by pressing a setup button on the animal tracking device, or may be entered via a user interface of a mobile device 1304, which may communicate the changed mode to the animal tracking device. Once in the boundary definition mode, the animal tracking device may capture high-accuracy positions at a high frequency, via both GPS/GNSS data and observation data as the user traverses a desired path or boundary. Once complete, the user may terminate the boundary definition mode on the animal tracking device or within the user interface, thereby terminating capture of the boundary positions. An overall boundary may then be calculated, at the animal tracking device, the mobile device, or at a server 1320 receiving the high-accuracy positions. The boundary defined by the path walked by the user may be refined and/or simplified, as discussed below, and displayed to the user at mobile device 1304 for review and confirmation. Upon confirmation, the user may select to keep the boundary as all or a portion of a virtual boundary for the animal tracking device 1302. The animal tracking device may then be programmed with the virtual boundary and affixed to an animal (e.g., animal 1314) such that a stimulus may be generated in response to the animal traversing the virtual boundary.

It is noted that in some examples, the calculation of position of the animal tracking device may be done at the time of traversing the path using RTK observation data at the animal tracking device, or may be completed after the fact at the animal tracking device or at the server, for example using PPK techniques.

It is noted that in various embodiments, a number of post-processing techniques may be performed on the positions recorded along the boundary. For example, one or more smoothing or curve-fitting processes may be employed to reduce the number of data points required to define the boundary, thereby simplifying the boundary definition, and in turn simplifying subsequent calculation of a position of the animal tracking device relative to the boundary.

Figure 15:
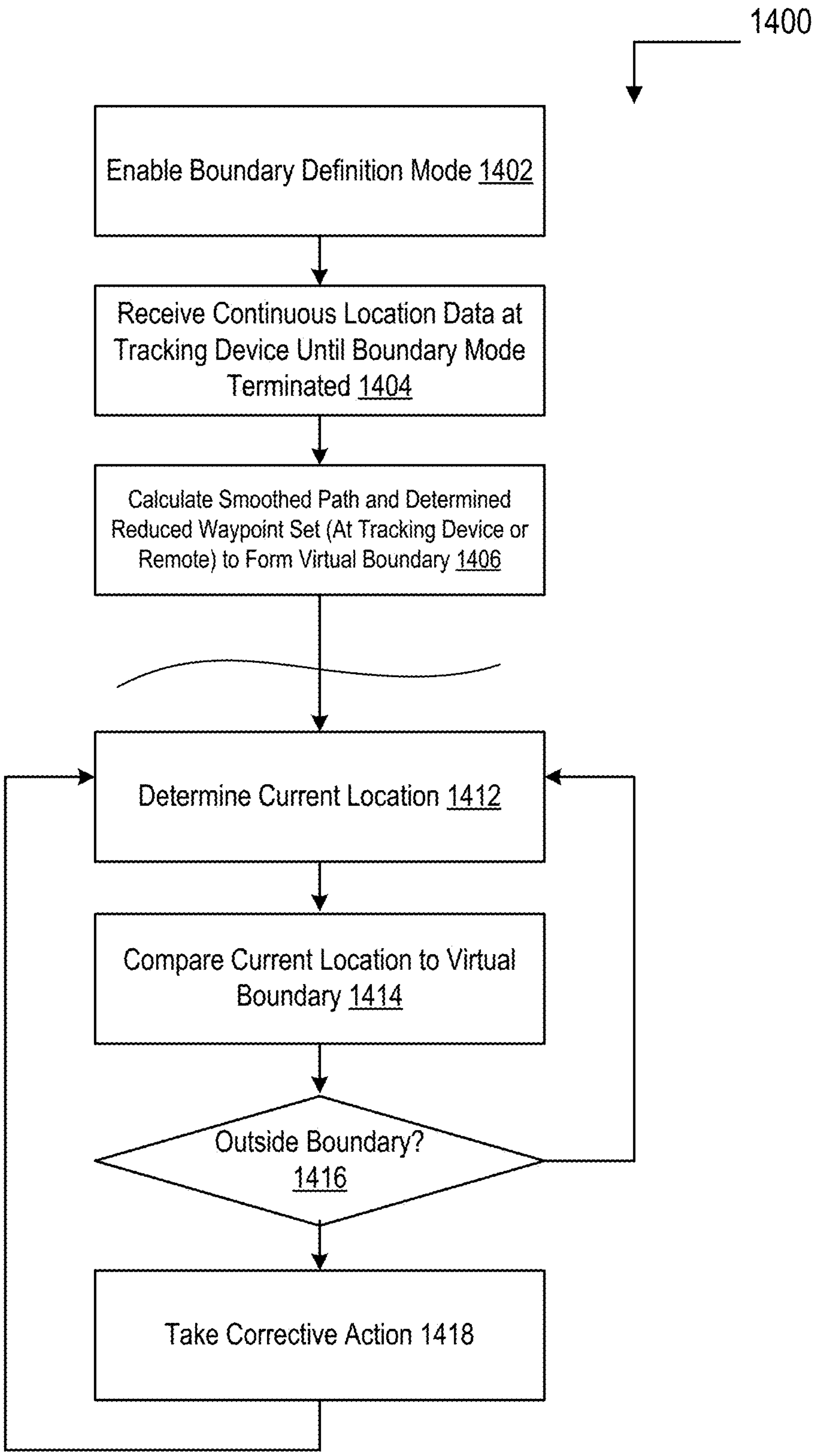
FIG. 15 illustrates a flowchart of a method of establishing a virtual boundary for an animal tracking system.

FIG. 15 illustrates a detailed overall method 1400 for boundary definition and usage, in which a boundary is defined by a user traversing at least a portion of the boundary while carrying an animal tracking device enabled with RTK-based observation data, in accordance with example embodiments of the present disclosure.

In the example shown, the method includes initiating a boundary definition mode of the animal tracking device (step 1402). Initiating the boundary definition mode may include initiating such a mode from a control option within a user interface of an animal containment or boundary management application, as illustrated in FIG. 14. The method includes, upon entry of the boundary definition mode, receiving continuous location data at the animal tracking device (step 1404). The continuous location data includes a series of data points defined by received satellite data as well as observation data from an RTK base station, thereby enabling determination of a high accuracy location of the animal tracking device. The series of data points corresponding to locations generally will track a path traversed by the user while carrying the animal tracking device while in the boundary definition mode. The data points may be captured at a high frequency rate (e.g., 1-10 position determinations per second), resulting in a large number of data points being captured along a traversed path. The boundary definition mode may be terminated, thereby halting collection of data points as part of the path.

In the example shown, the method further includes calculating a smoothed path and obtaining a reduced waypoint set (step 1406). Calculating a smoothed path may include performing a smoothing operation or a curve fitting operation on the series of data points representing traversed locations to arrive at a definition of a line that can represent part or all of a virtual boundary. Example line smoothing or curve fitting operations may include use of a moving average (e.g., a simple or exponential moving average), gaussian smoothing, spline interpolation, Local regression (e.g., LOESS) smoothing, use of an iterative end-point fit algorithm (e.g., Ramer-Douglas-Peucker), use of a Kalman filter or Bezier curve, or other smoothing techniques. For example, in an example iterative end-point fit algorithm, a recursive subdivision of line segments between points is performed, with midpoints being eliminated that are within a specified tolerance of a line segment formed between two endpoints. A Gaussian smoothing process uses a Gaussian function to perform a moving filter along a set of data points. This smoothing process may be performed at the animal tracking device itself, or alternatively, at a server or other computing device remote from the animal tracking device, which receives the set of waypoints from the animal tracking device.

Depending on the particular shape of the path used to form a virtual boundary and algorithm used, the extent of reduction of data points may vary; however, it is noted that use of the various algorithms described above may reduce the data points by a significant amount and thereby reduce the number of points defining a virtual boundary that are used in determining whether an animal has crossed the defined virtual boundary.

Optionally, the now calculated boundary may be sent to a mobile device of a user, who may review and confirm the boundary corresponds to an intended position of the boundary. For example, a map may be shown with the virtual boundary overlaid thereon, and the user may enter confirmation of the boundary line or otherwise modify the boundary line graphically prior to confirmation. Once confirmed, the virtual boundary may be stored and used at the animal tracking device.

In the example shown, after the boundary definition mode is complete, the animal tracking device may be used to track the animal relative to the now-smoothed and defined virtual boundary. In that context, the animal tracking device may be configured to determine its current location (at step 1412). This may include use of both satellite-based location data and RTK observation data to determine a high-accuracy position of the animal tracking device, and optionally logging the location data for use (e.g., as described below). It may also, or alternatively, include use of UWB-based techniques for locating the animal tracking device. That current location may then be compared to the defined virtual boundary (step 1414). In example implementations described herein, a variety of algorithms may be used by an animal tracking device to determine if it is within, outside, or approaching a virtual boundary. For example, a variety of Point-in-Polygon algorithms (e.g., ray casting, winding number, or the like), bounding box, or Haversine formulas could be used. Additionally, for boundaries of arbitrary shape, various GIS tools and/or genetic algorithms might be implemented.

If outside the virtual boundary (at operation 1416) and the virtual boundary is acting as a containment area, one or more corrective actions are taken (step 1418), and the animal tracking device may continue to update its location and generate notifications and/or stimuli in response thereto. If within the virtual boundary, location monitoring and/or logging may be performed. Corrective actions may include generating a log entry or notification, as well as emitting a sound or vibration, generating an ultrasonic and/or electrical stimulus, and the like. In some examples, an electrical stimulus may be generated as described in U.S. patent application Ser. No. 18/469,977, entitled “Electrical Stimulus Device, Such as an Animal Collar, and Variable Pulse Stimulation Circuit”, the disclosure of which is hereby incorporated by reference in its entirety. Similarly, if the virtual boundary is acting as an exclusion zone, corrective actions may be taken upon entry into the area defined by the virtual boundary, analogous to the above.

Referring to FIG. 15 generally, the method 1500, including both RTK-corrected position capture and subsequent smoothing or curve fitting, has the effect of generating a very highly accurate virtual boundary while reducing the number of datapoints required to define the boundary locations. This reduces the storage requirements associated with the boundary definition, and reduces the computational complexity of comparing a detected position relative to the boundary, since typically, the position is compared to all of the boundary points to determine its position relative to a virtual boundary.

Figure 16:
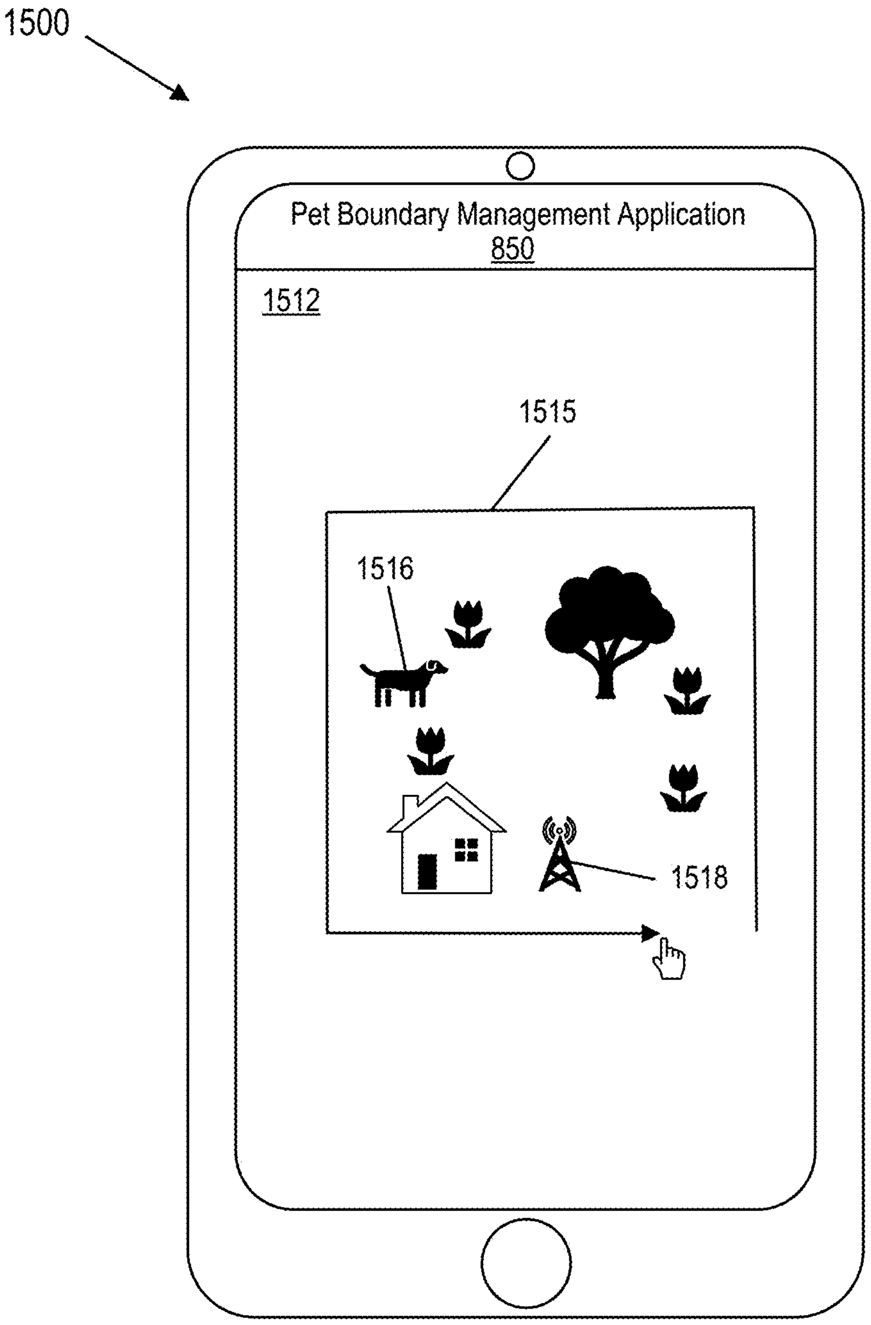
FIG. 16 illustrates an example schematic of a further process for establishing a boundary of an animal tracking system using an animal boundary management application.

FIG. 16 illustrates an alternative example method for establishing a boundary of a animal tracking system using a boundary management application. In the shown embodiment, a user may utilize a mobile device 1500 which includes animal boundary management application 850. Using animal boundary management application 850, the user can interact with interface 1512 that displays a map of the property at which a containment area is to be established. The user can draw boundary 1514 around the desired perimeter to contain tracked animal 1516. Interface 1512 additionally displays the location of tracked animal 1516, which can be an icon or picture of tracked animal 1116, In addition, base station 1518 is used to ensure high accuracy of the position of tracked animal 1516 and boundary 1514 in accordance with the previously disclosed systems and methods.

In addition to the above examples of establishing a boundary, other techniques may be used. For example, in some embodiments, a virtual boundary may be created at a perimeter of a property by presenting, to a user of the mobile device 1500, a property at a predetermined address (e.g., either an address at which the user is currently located based on a GPS location of the mobile device, or based on a user-entered address). The user may select the property and the mobile device may send a request to a remote system. The request may indicate to retrieve, from public property records, coordinate data describing boundaries of the selected or identified property. In response, either the mobile device 1500 or a cloud account 22, may create the virtual boundary in accordance with the coordinate data, and may initiate synchronization of the virtual boundary to the animal tracking device. In this way, the user may quickly define at least one type of virtual boundary for use at a property without requiring detailed setup operations by the user. Similar methods of establishing other types of virtual boundaries may be used as well where public records data is available.

Regardless of which method of establishing a boundary is used, in example embodiments, boundary definitions may be translated into a representation of a virtual boundary that is synchronized with a user account, for example at a cloud account 22. The definition of the virtual boundary may be associated with an intended animal by associating the virtual boundary with a particular animal tracking device that is linked to the user account, and the definition of the virtual boundary may be communicated to the animal tracking device for use (if, for example, the virtual boundary was defined on the user device rather than on the animal tracking device).

Figure 17:
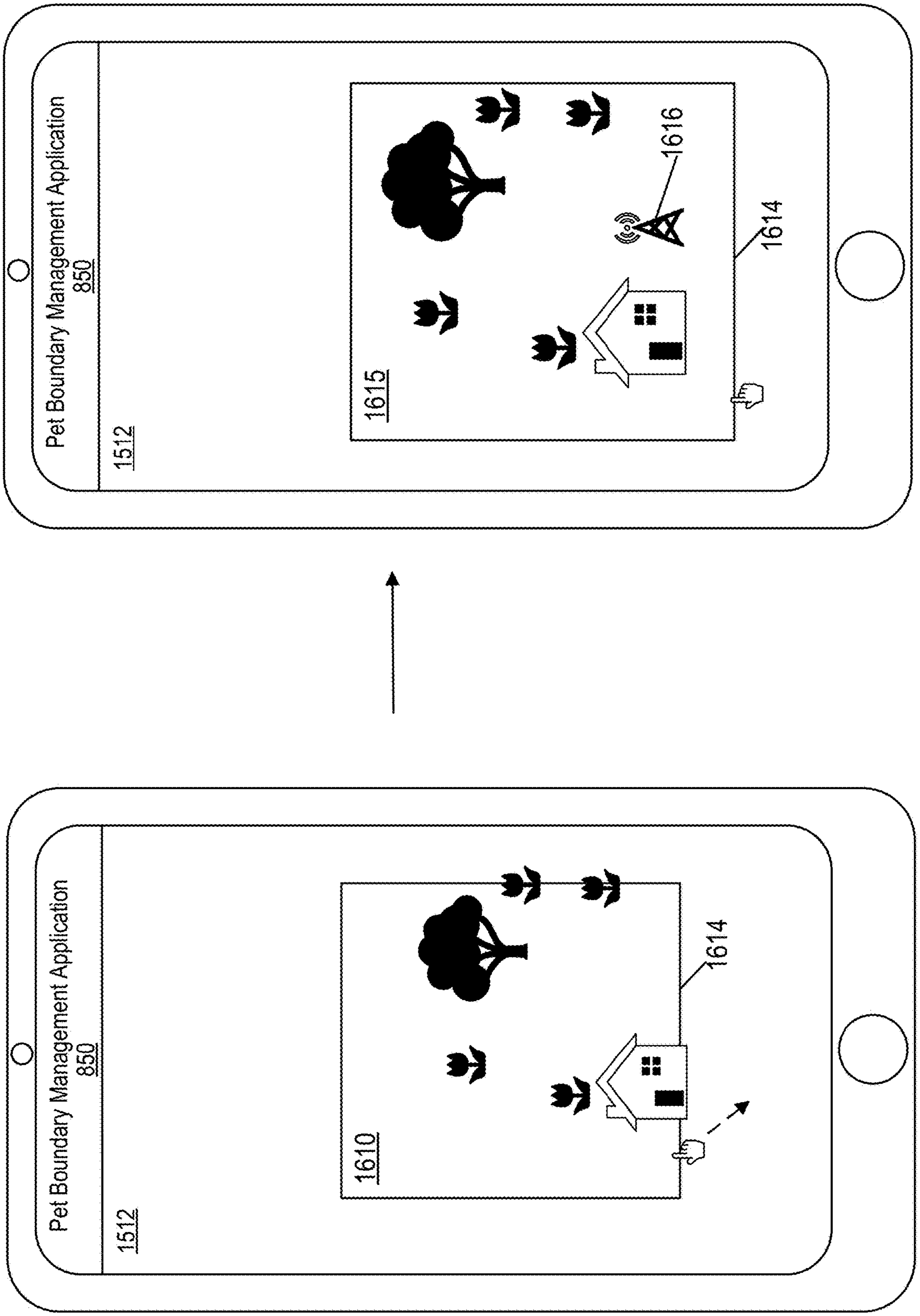
FIG. 17 illustrates a schematic of aligning satellite images with an established virtual boundary created in accordance with the present disclosure.

FIG. 17 illustrates an example of a map synchronization technique for an animal tracking system. In this embodiment, a boundary map 1610 shows a satellite GNSS boundary 1614 placed on a map, but is misaligned with respect to where the user desires boundary 1614 to be placed. This may occur, for example, even in circumstances where the user may traverse the boundary using adjusted location coordinates (e.g., via base stations). Generally, this is because the positioning of satellite image tiles is imperfectly aligned with actual GPS positions. Accordingly, to allow a user to more accurately define the location of the boundary relative to the satellite image, within a user interface the user may be enabled to shift the depicted or virtual boundary, as seen in the adjustment from boundary map 1610 to boundary map 1612, such that the boundary is better aligned with its intended position.

In particular, in the shown embodiment, a user may set a virtual boundary through either an application on a mobile device, traversing the boundary with a tracking device, or other methods for configuring a boundary for the tracking device. Due to GNSS satellite drift, interference, or incorrect satellite image positioning, the boundary may not correspond to the actual boundary the user desires. Thus, the user may manually shift the satellite image relative to the boundary as depicted in the user interface. This shift may be stored as an offset value within the user account, such that future depiction of satellite images with an overlay of a virtual boundary or position of an animal tracking device may better align with actual positioning. Because animal tracking devices as described herein operate with significantly greater accuracy as compared to prior types of devices, the application of an offset to the underlying satellite image also rules the user to better see specific positions where an animal may be doing specific activities (e.g., spending time in particular plant beds, digging, sleeping, relieving itself, and the like).

In alternative embodiments, the map shift may be performed prior to definition of the virtual boundary. In that instance, a known position of an animal tracking device may be correlated to a known position on a map user interface in a satellite image (e.g., by a positional indicator on the satellite image), and the user may shift the satellite image to align the position indicator with a known position of the animal tracking device. The user may then define a virtual boundary using the satellite image to reliably align with intended physical locations. It is noted that although one position is described, this alignment may be done at two or more known positions of the animal tracking device.

Figure 18:
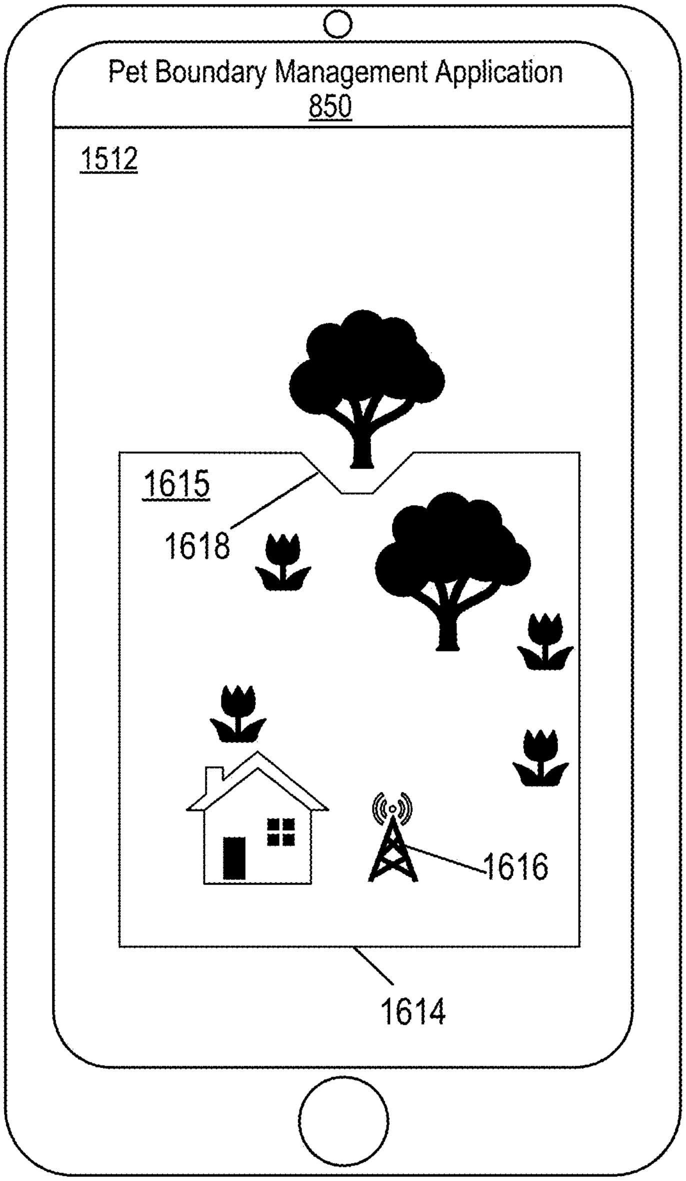
FIG. 18 illustrates automated boundary editing using an animal tracking system and animal boundary management application.

FIG. 18 illustrates a user interface of a mobile device implementing a boundary management application as described herein. As illustrated, a virtual boundary 1614, which may be defined using any of the techniques previously described, may be presented in a map view on a user interface 1512. The virtual boundary 1614 may be positioned around a desired property 1615 which may have various obstacles or hazards to be avoided. In the example shown, once a user defines a boundary, and particularly when at least portions of the boundary are defined on a graphical user interface rather than traversing the boundary, the boundary may cross hazardous areas. Accordingly, an automated virtual boundary line adjustment may be performed to establish an adjusted boundary 1618. The adjusted boundary may automatically be set to avoid detectable hazardous conditions, or conditions otherwise annotated within a map user interface as being hazardous. Such hazardous conditions might include, e.g., rivers/streams, cliffs, large/dead trees, and the like.

Figure 19:
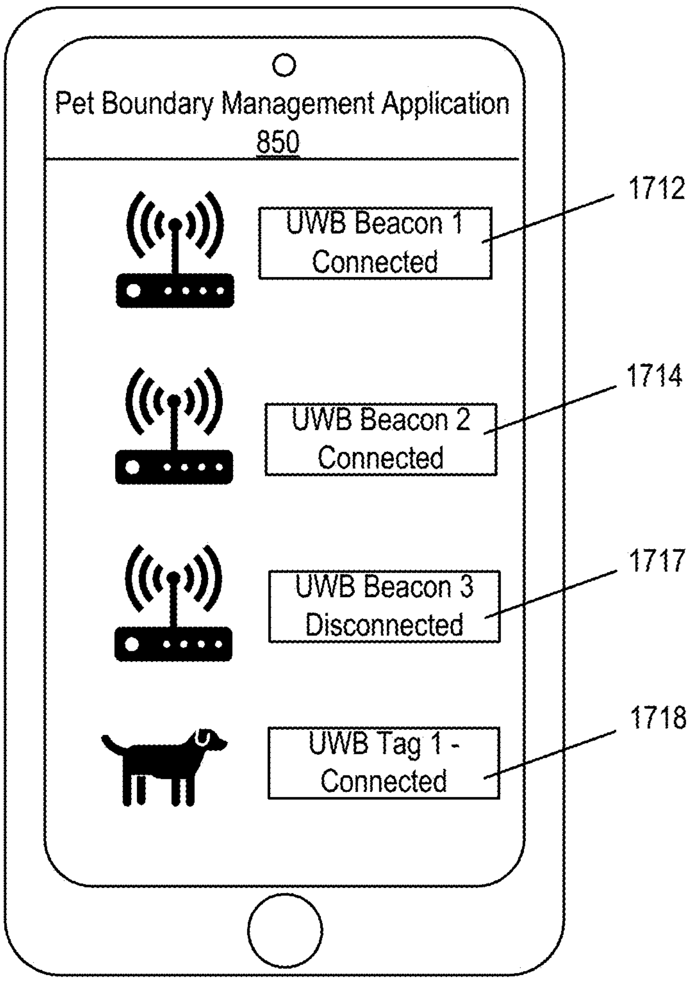
FIG. 19 illustrates setup of an example radio-frequency-based portion of an animal tracking system using an animal boundary management application, according to an example embodiment.

FIG. 19 illustrates a setup screen for a boundary management application 850 installable on a mobile device to assist with setup of virtual boundaries. In the illustrated embodiment, the boundary management application 850 includes status indicator 1712, 1714, 1716, and tag status indicator 1718. Each of these status indicators provide the current connection status of each device. Further, a user may interact with each indicator to further configure the settings of the corresponding device, such as initializing one of the beacons.

Figure 20:
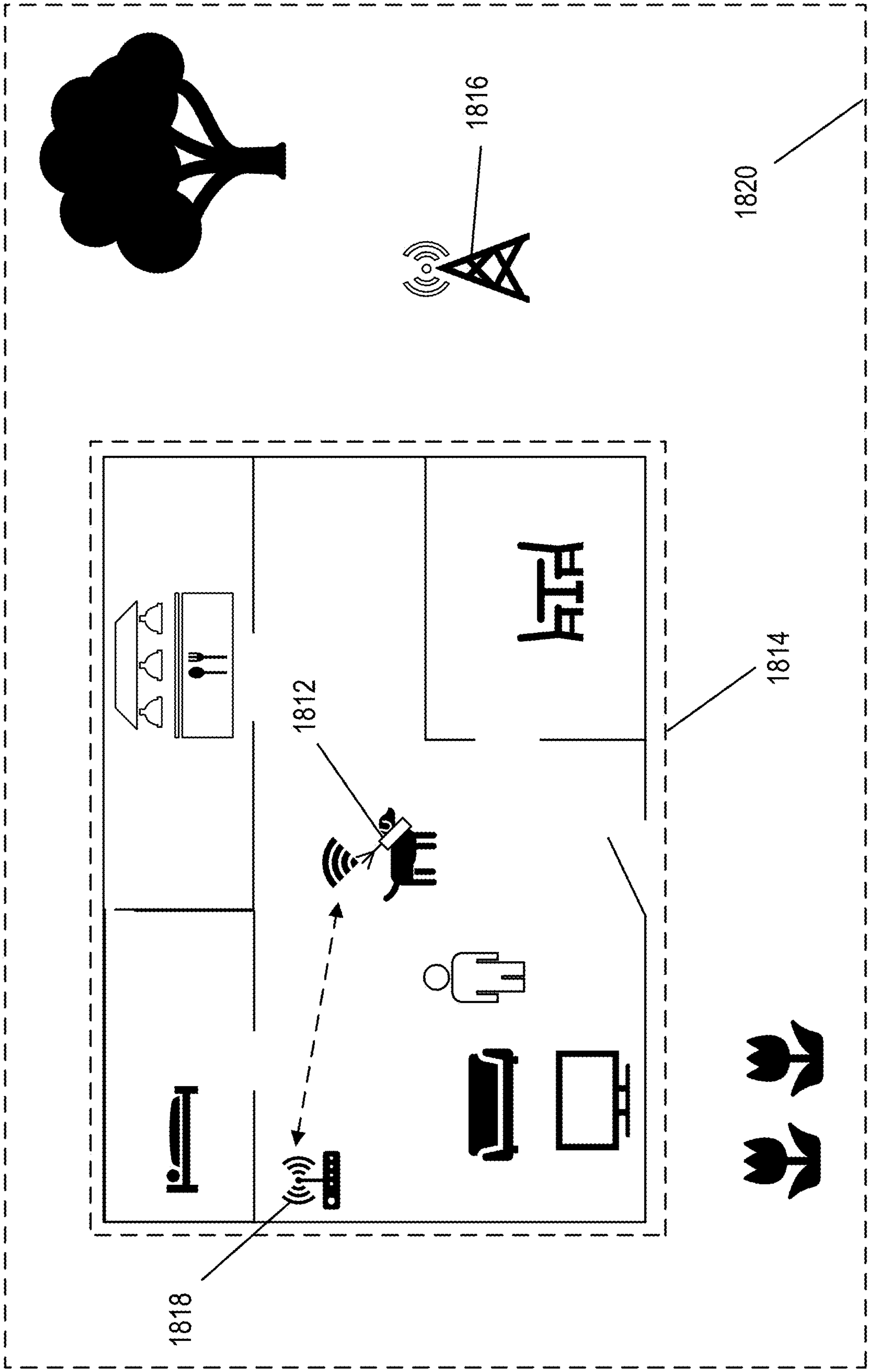
FIG. 20 illustrates an example schematic setup of an overall animal tracking system using radio-frequency based locating technologies, according to an example embodiment.

FIG. 20 is a schematic illustration of use of concurrent use of RTK and UWB locating technologies in an animal locating system according to the embodiments discussed herein. In this example, a tracked animal 1812 may be tracked and controlled within virtual boundary 1820 using either satellite and RTK technologies using an RTK base station 1816, or when inside a boundary 1814 (e.g., defined at a boundary of a residence), tracking may be performed using relative positioning between an animal tracking device and a UWB base station 1818.

To avoid having to keep active both RTK and UWB communication interfaces, the animal tracking device may perform a switchover between the two technologies, for example at the boundary 1814. One example of such a process is described in conjunction with FIG. 21, below.

Figure 21:
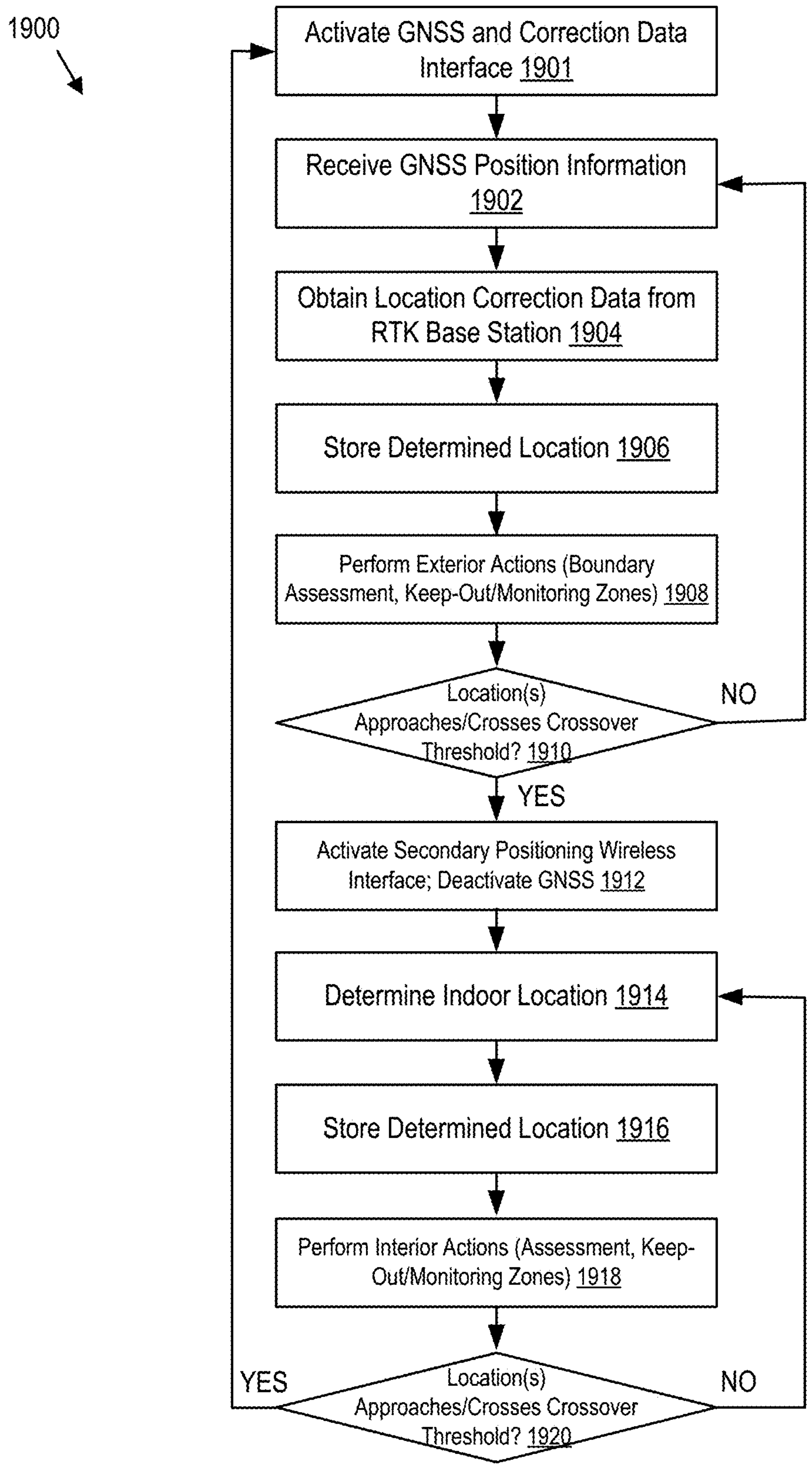
FIG. 21 illustrates a flowchart of a method of tracking an animal across tracking technologies, according to an example embodiment.

FIG. 21 illustrates a method 1900 of monitoring an animal location using an animal tracking device in accordance with aspects of the present disclosure. The animal tracking device may be implemented using both RTK-based and UWB-based tracking capabilities as described herein.

In the example shown, the method includes activating a satellite communication interface and a further interface for receiving observation data (e.g., a GPS and RTK interface) (step 1901). The method includes receiving satellite based position information (step 1902), and obtaining observation data from an RTK base station (step 1904). The animal tracking device may then determine and store its location in memory, optionally sending this location data to a remote system, such as a server (step 1906). At the animal tracking device, depending on the relative position between the determined location and any virtual boundary that has been defined, the animal tracking device may perform one or more actions such as corrective actions or monitoring actions as described herein (step 1908).

In the example shown, a determination is performed as to whether the animal tracking device crosses or approaches a particular threshold that may or may not be within a virtual boundary (operation 1910). The threshold may correspond to an entryway of a residence or other location at which crossover between outdoor positioning and indoor positioning may be desired. If the animal tracking device is not approaching that threshold, it may continue to receive position data via satellite and RTK base station, e.g., performing outdoor locating operations. However, if the animal tracking device has approached or crossed a particular threshold location, a secondary wireless positioning interface may be activated, and the satellite-based interface may be deactivated (step 1912). For example, a UWB interface may be activated, and a GPS interface may be deactivated, thereby enabling only the interface likely to be used. Using the UWB interface, and indoor location of the animal tracking device may be determined relative to a UWB base station (step 1914) and the location may be stored (step 1916). The location storage may be on the animal tracking device, or remotely therefrom. Based on the interior location, one or more interior actions may be performed (step 1918). The one or more interior actions may include assessment of animal location and logging of the same; initiating a stimulus action based on the animal being positioned in one or more keep out zones (e.g., on a couch or table or countertop, etc.).

As previously described, the animal tracking device may be similarly monitored to determine if the animal is approaching the threshold (operation 1920), in this instance, from an indoor location. As the animal approaches the threshold, in some instances, the satellite and RTK interfaces may be activated, and once the animal passes through the threshold (e.g., returning outdoors), the UWB interface may be deactivated, enabling location tracking via GPS/RTK.

Figure 22:
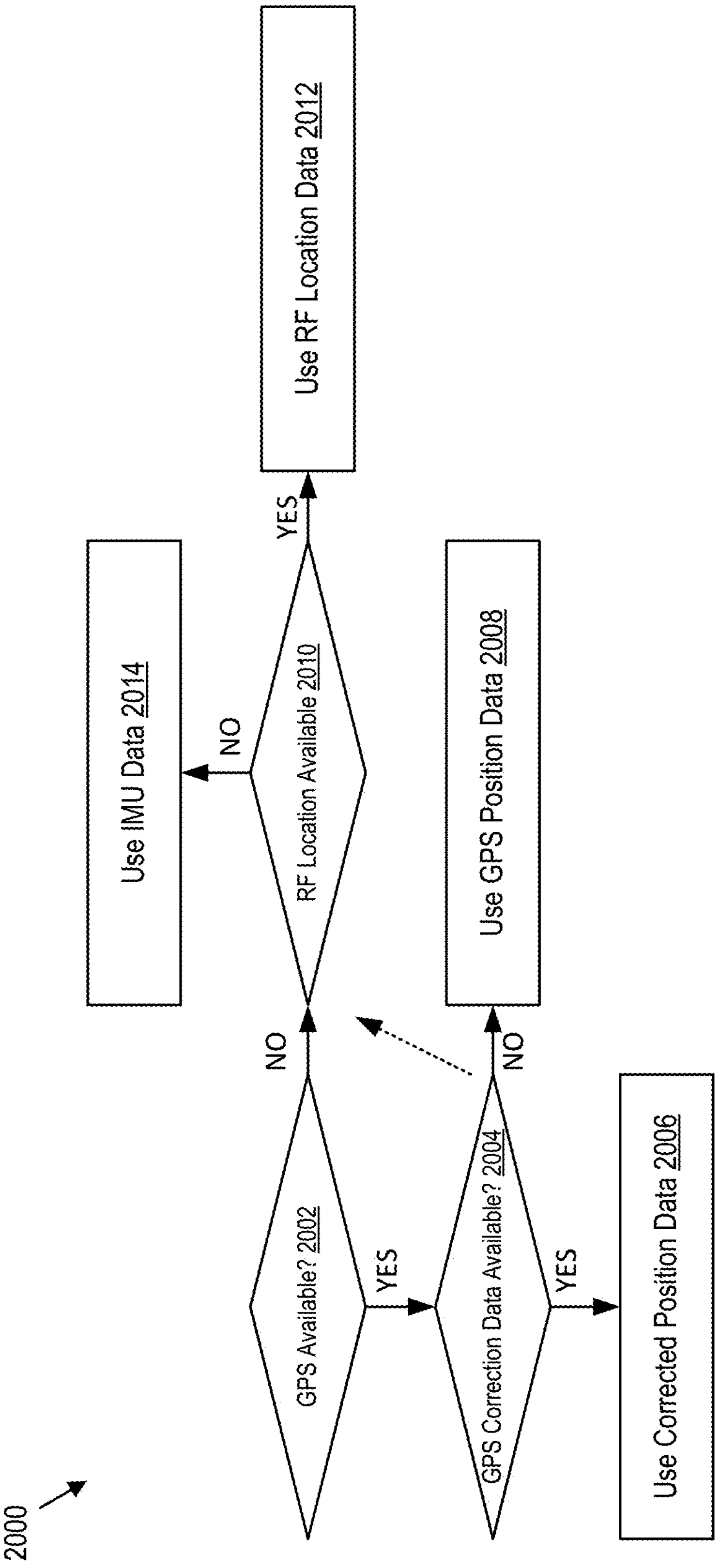
FIG. 22 illustrates a flowchart of a method of selecting location features for animal tracking, according to an example embodiment.

FIG. 22 illustrates a method 2000 of negotiating among various locating technologies, including use of RTK-based satellite locating outdoors, UWB-based locating indoors, and use of an inertial measurement unit (e.g., IMU 528 of FIG. 6) to provide short-range motion tracking between other types of measurements and/or where the RTK and UWB based locating technologies may be unavailable. In the example shown, a first operation determines whether satellite communication, such as GPS, is available (operation 2002). If satellite communication is available, a determination is made as to whether observation data is available (operation 2004). If observation data is available, a GPS/RTK may be used to obtain high-accuracy positioning (step 2006). If observation data is not available, GPS data alone may be used for outdoor animal tracking (step 2008). This has the disadvantage of reduced accuracy of positioning in the outdoor environment. As such, when available, observation data will be searched for and applied.

If satellite communication is not available, an assessment is performed as to whether RF-based location data is available (operation 2010). RF-based location data may be, for example, UWB location data, using an indoor UWB base station. If such RF-based location data is available, RF-locating is performed (step 2012). If no RF-locating capability is available, then the animal tracking device may revert to obtaining direction and speed data from an inertial measurement unit (step 2014), and applying that direction and speed to last-known location data to predict the current location(s) of the animal tracking device until GPS/RTK and/or UWB locating features become available. In this way, the animal tracking device may seamlessly determine its position while navigating among environments that may have varied connectivity or location data capabilities.

It is noted that in the method 2000, the GPS/RTK-based location determinations and UWB-based location determinations may be performed generally as described above. When an inertial measurement unit (IMU) is used, acceleration and/or rotational rates of various sensors may be used, in conjunction with magnetometer readings, to determine heading information relative to a magnetic north direction. Such IMU-based location determination may be used, in some examples, for a predetermined period of time (e.g., 5-10 seconds) until a location determination may no longer be considered reliably accurate, at which time the animal tracking device may transmit a notification indicating that position information is not available, or may re-attempt to determine location using one or both of the GPS/RTK and UWB-based locating technologies.

IV. Power Saving Features

Figure 23:
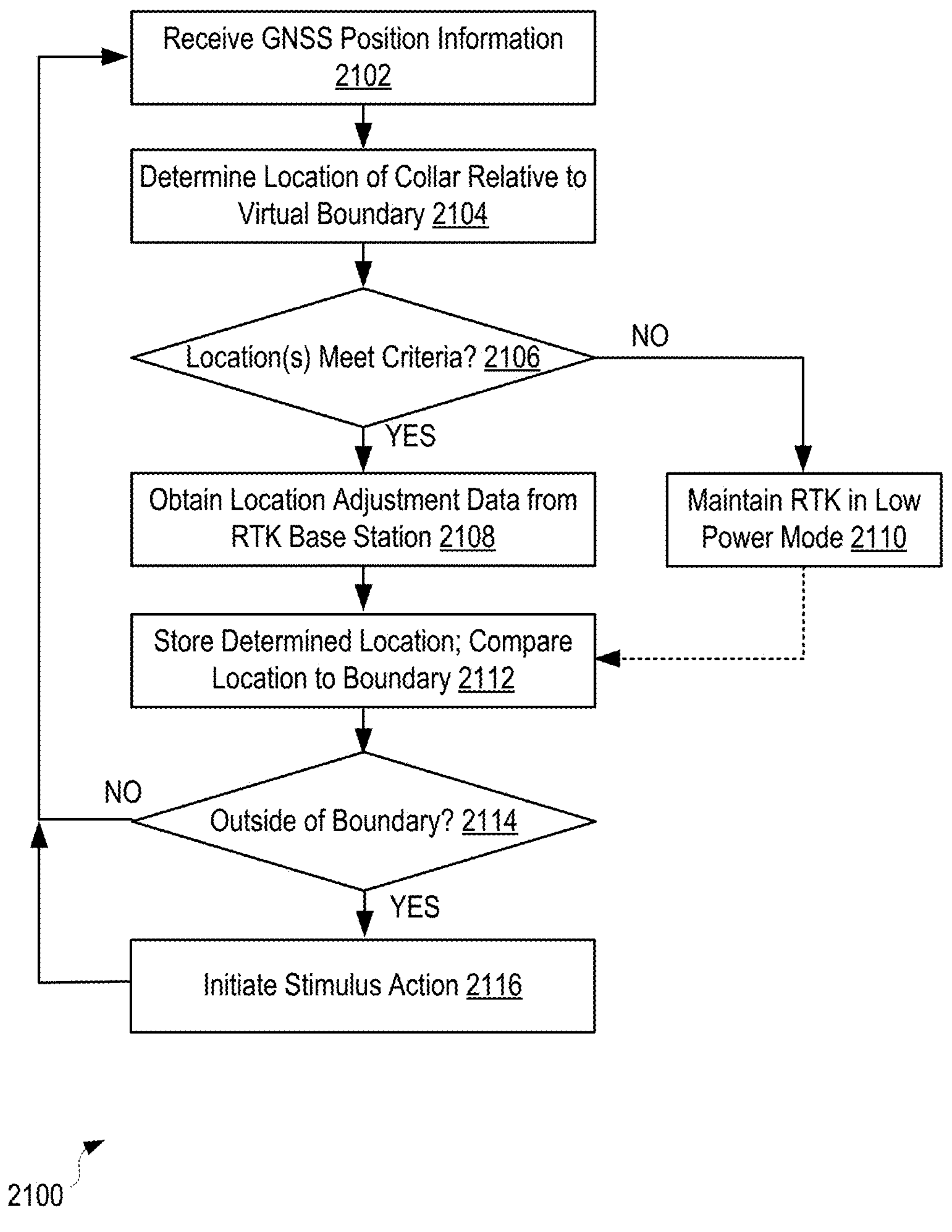
FIG. 23 is a flowchart of an example method of conserving power using an animal tracking system as described herein.
Figure 24:
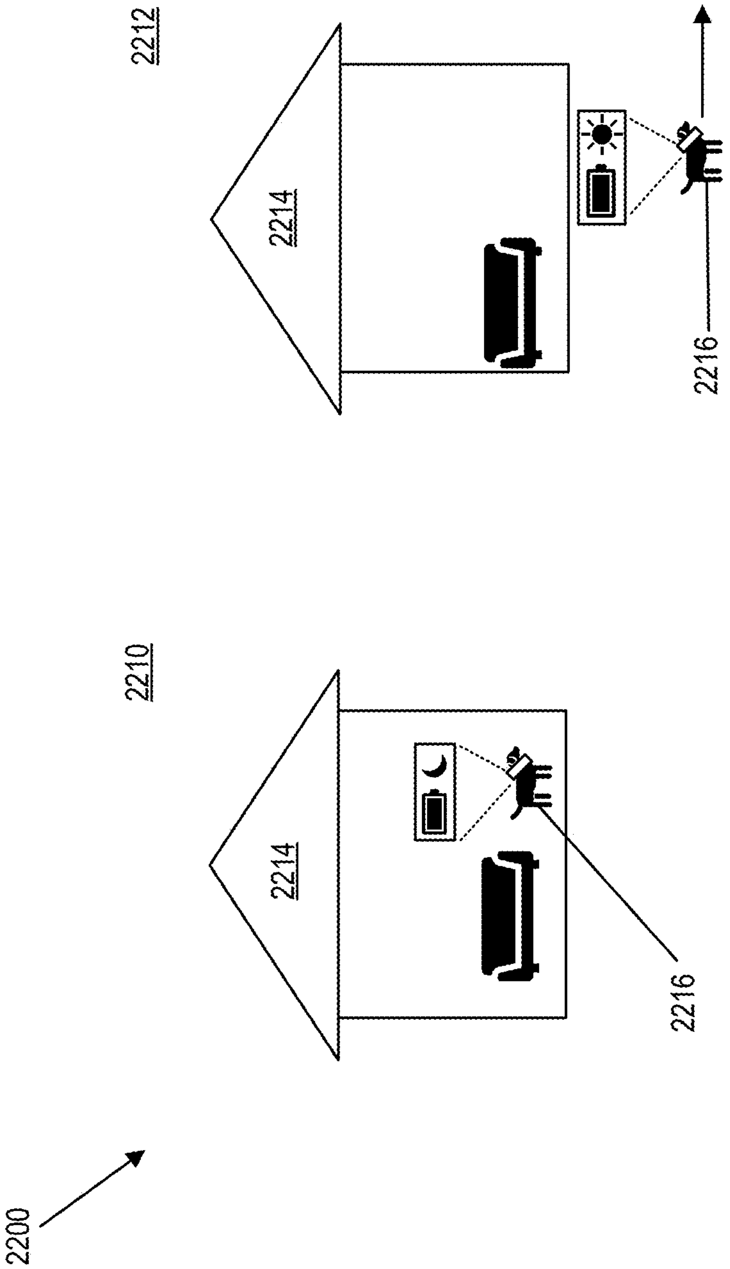
FIG. 24 illustrates an example power saving mode of an animal tracking system as described herein.
Figure 25:
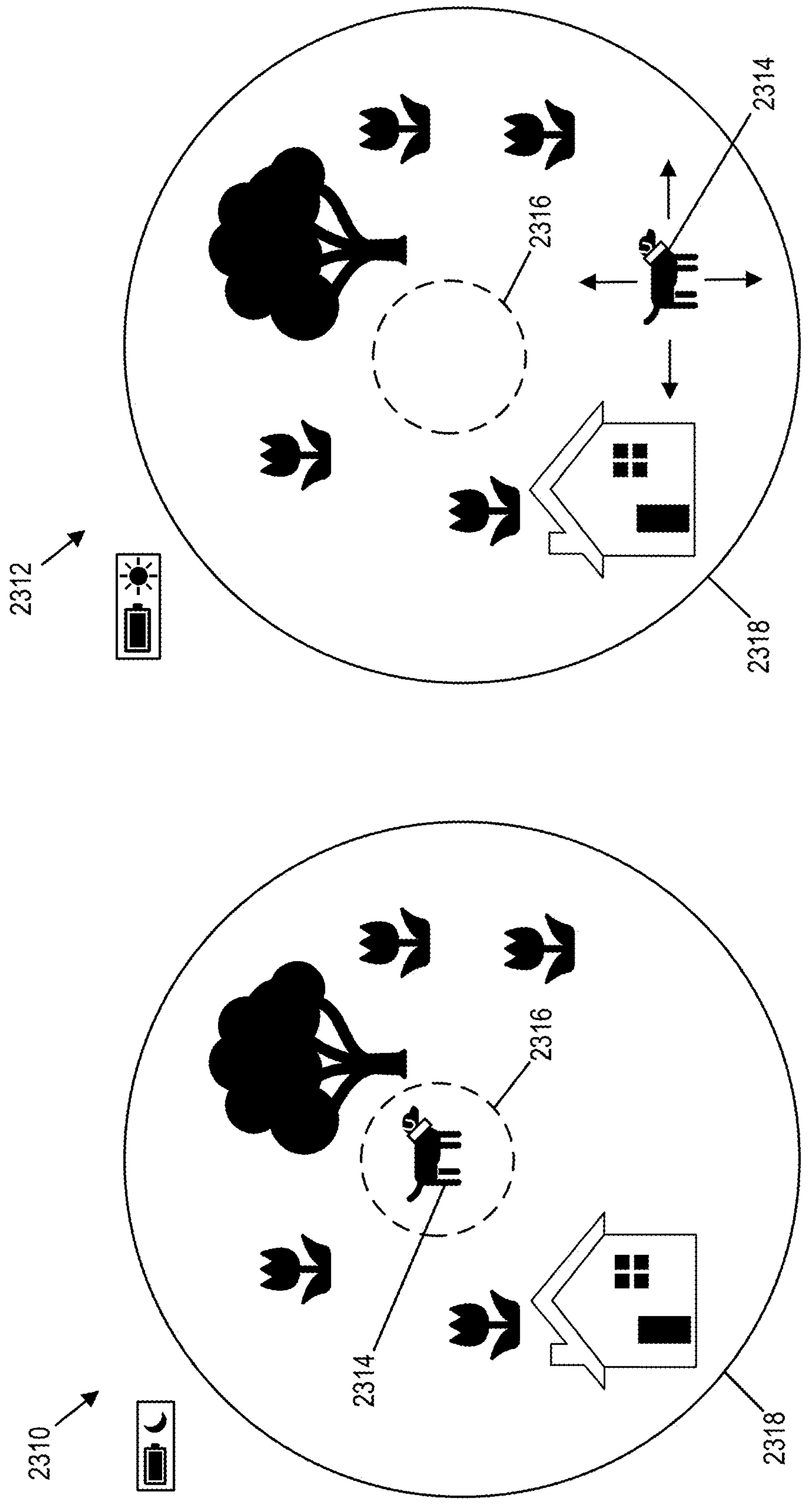
FIG. 25 illustrates a second example power saving mode of an animal tracking system as described herein.

Referring now to FIGS. 23-25, additional details regarding potential power saving techniques utilized within an animal tracking device, such as an animal collar, are disclosed. In particular, power saving techniques described herein are specific to an animal tracking device that utilizes position adjustments, for example from an RTK base station. Such systems typically require greater power consumption, and as such may have an adverse effect on battery life of a portable device such as an animal tracking device.

A particular example of a power savings technique is described in conjunction with FIG. 23, which describes a method 2100 of selective use of adjustment data from a base station. The example method 2100 may be used once a virtual boundary has been defined to describe a containment area, and an animal is subsequently tracked within that containment area.

In the example shown, the method 2100 includes receipt of position information from a GNSS satellite system (step 2102). The position information may be received at a GNSS receiver as described above, and used to calculate a specific position of the animal tracking device. As noted above, this position information may be accurate to approximately 1 m accuracy.

In the example shown, the method 2100 further includes determining a location of the animal tracking device (e.g. animal collar) relative to the defined virtual boundary (step 2104). The determination of location of the animal tracking device relative to the boundary is performed, in this step, using an unadjusted location of the animal tracking device (e.g., prior to application of any RTK based position adjustment). A determination is made, at operation 2106, as to whether the animal tracking device location meets some predetermined criteria. Such predetermined criteria may take a number of forms.

In one example, the predetermined criteria may include whether the animal tracking device location is within a threshold distance from the boundary. This threshold distance may be adjustable by a user during setup of the virtual boundary, but will typically be greater than 1-2 meters, given the potential inaccuracy of GNSS-based positioning. It is noted that in some embodiments, the threshold distance may only be readily calculable in circumstances where the animal tracking device has the ability to obtain a GNSS signal. For example, in circumstances where an animal is not outside or in a location without clear satellite line of sight, it may be difficult to determine an unadjusted position using GNSS data. Accordingly, in such circumstances, there may be no determination that the animal tracking device is within a threshold distance of the virtual boundary, and that there is no available unadjusted position. In such instances, one or more communication interfaces, including a GNSS receiver and an RTK interface 524 (e.g., as seen in FIG. 6), may be maintained in a low-power mode or otherwise deactivated.

In another example, the predetermined criteria may include whether the animal tracking device is either within the threshold distance or whether the animal tracking device exhibits behavior indicating that it may be within the threshold distance from a virtual boundary, or region in which use of GNSS data and/or observation data are not useable or useful. For example, in some instances, a speed and a position of the animal tracking device may be determined, and vector movements may indicate a likelihood of reaching the virtual boundary or reaching a threshold distance from that virtual boundary. Examples of calculating speed and position of such an animal tracking device, using GPS/GNSS signals, are described in U.S. Pat. No. 10,151,843, the disclosure of which is hereby incorporated by reference in its entirety.

In a still further example, the predetermined criteria may include a prediction that the animal tracking device will move to a location either within a predetermined distance from the virtual boundary or will move to a location outside the virtual boundary, based on one or more predictions. The one or more predictions may be generated by a predictive model that uses historical location data from the animal tracking device, and optionally from historical location data and behavior data from other animal tracking devices. In instances where the predictive model determines that the animal tracking device is likely to approach or pass a virtual boundary the criteria may be considered met. Details regarding an example predictive model are provided below. Such a predictive model may be created centrally, e.g., at a cloud service 22, and provided to the animal tracking device for use in determining whether to initiate high-accuracy location determinations via corrective data from a base station at the animal tracking device.

If it is determined at operation 2106, that the animal tracking device meets designated criteria, the animal tracking device may further obtain additional location adjustment data (step 2108). The additional adjustment data may be obtained from, for example, a base station implementing RTK technologies, and an adjustment may be made to the GNSS position determination, thereby allowing for increased accuracy of location of the animal tracking device. However, if it is determined that the animal tracking device does not meet the designated criteria, at step 2110, the animal tracking device may not obtain observation data via an RTK interface (e.g., RTK interface 524 of FIG. 5). This may include reducing frequency of, or suspending, calculations of corrected location, or may include not receiving observation data from a base station. For example, an RTK interface may be maintained in a low-power mode until certain criteria are met, thereby reducing overall power consumption.

In the example shown, the method 2100 may include storing the determined location (e.g., either an unadjusted location or an adjusted location), and comparing the location to the boundary to determine if the animal has crossed the boundary or is approaching the boundary at a predetermined threshold (step 2112). The determined location may be stored at the animal tracking device itself for some period of time, and/or transmitted to a remote system (e.g., the cloud service 22 and/or mobile device 18) in realtime or near-realtime for remote analysis of position data. Additionally, the predetermined threshold may be closer than the threshold described above in conjunction with operation 2106, and defines a threshold at which the animal is determined to have reached the virtual boundary or bypassed the virtual boundary. If it is determined, at operation 2114, that the animal is outside of the virtual boundary or is approaching a location relative to the boundary that might suggest intent to leave the virtual boundary (e.g., using similar speed and positioning or predictive techniques as described herein, after correction of the location of the animal), a stimulus action may be initiated (step 2116). If it is determined that the animal is not outside of the virtual boundary or within a predetermined threshold of that boundary, operation may continue, such that the animal tracking device continues to monitor the position of the animal and selectively uses high-accuracy position adjustment as the animal approaches the predefined virtual boundary.

FIG. 24 illustrates an example schematic illustrating operation of a power saving mode of an animal tracking system, as reflected schematically in a user interface of a mobile application. In the illustrated embodiment, in a low power mode 2210 the tracking device attached to tracked animal 2216 is shown in a low power mode while tracked animal 2216 is within house 2214 (e.g., not in proximity to a virtual boundary, and in a location where GNSS signals may not be available). Once tracked animal 2216 is detected outside house 2214 (e.g., via GNSS signals), the tracking device attached to tracked animal 2216 may assess that the animal is approaching a boundary, and either initiate use of, or transition from a low power mode to an active mode of, a communication interface of an animal tracking device (such as RTK interface 524) to ensure high-accuracy position determination.

In some examples, the animal tracking device may have additionally limited functions while in low power mode 2210. For example, the tracking device attached to tracked animal 2216 may reduce a frequency at which it calculates its position (e.g., from calculations 1-5 times per second to every 5-10 seconds, for example), and may reduce the frequency with which it processes data or communicates with external systems (including not only a base station, but also network cloud 22 and mobile device 18). Reducing frequency of these functions helps preserve battery while the animal is indoors or otherwise in circumstances where precise location is unneeded. In the specific example where a tracked animal 2216 is not able to exit a virtual boundary due to being confined within the residence 2214, there is no need for the tracking device attached to tracked animal 2216 to be fully operational. Conserving the power supply of the tracking device attached to tracked animal 2216 while within house 2214 results in longer battery life and/or reduced need for high-capacity batteries. Of course, in circumstances where other indoor locating technologies are used, those systems (e.g., the UWB based locating features described herein) may be optionally activated while the animal tracking device is indoors.

Once the tracking device attached to tracked animal 2216 detects that the tracked animal is outside the house 2214, the tracking device may determine that GNSS signals are available, and may increase frequency of polling such GNSS data, selectively connecting to a base station (depending on proximity to a virtual boundary), and increase frequency of communication with external systems such as the network cloud 22 and mobile device 18. In other embodiments, the tracking device attached to tracked animal 2216 may suspend all operations. Moreover, other embodiments may use position estimate methods such as dead reckoning to estimate the location of tracked animal 2216 while inside house 2214. Further, house 1414 may be a different kind of structure or building that contains tracked animal 2216.

In addition to the examples described above, when in a low power mode and where immediate determination of a position of the animal tracking device is not required, other operations may be performed that nevertheless assist with position, but which are less computationally intensive at the animal tracking device. In some instances, all communication interfaces may be disabled, and GPS/GNSS location may be simply stored at the animal tracking device for later analysis. In other instances, frequency of communication via any of the described communication interfaces may be reduced, and/or location determinations may occur with lower frequency. In still further examples, only an RF interface that receives observation data may be turned off or monitored at a reduced frequency, and other communication interfaces, including a cellular or Wi-Fi interface may remain active. In such instances, unadjusted location data may be transmitted to a remote system. The remote system, for example the network cloud 22, may receive unadjusted location data, and may also continue to receive observation data from one or more base stations. In this instance, the network cloud may apply PPK techniques to determine a corrected (high-accuracy) position of the animal tracking device, with limited delay. This PPK-determined position may be presented to a user, for example via a mobile device, without requiring significant computation occurring on the animal tracking device. Additionally, the PPK-determined position may be returned to the animal tracking device to provide a slightly-delayed version (relative to local RTK calculation) of high-accuracy location information. Other implementations exist as well in which a tradeoff is made between realtime high-accuracy location data and conservation of computational and power resources.

FIG. 25 illustrates a second example power saving mode of an animal tracking system. In this illustrated embodiment, tracked animal 2314 is resting in low power zone 2316, thus, causing the tracking device attached to tracked animal 2314 to enter low power mode 2310. Once tracked animal 2314 begins moving outside of low power zone 2316, the tracking device attached to tracked animal 2314 enters active mode 2312 where it locates tracked animal 2314 within boundary 2318.

In some circumstances, tracked animal 2314 may have an area where it becomes inactive, for example laying within low power zone 2316 under a tree. These areas may be frequent spots where tracked animal 2314 prefers to rest. Thus, the location of tracked animal 2314 is unlikely to change for a period of time. Due to this stationary nature of tracked animal 2314, full functionality of the attached tracking device is not needed since a less frequent update of position calculation will suffice to locate tracked animal 2314. The stationary nature may be determined, at the animal tracking device, by small changes in position between location determinations based on GPS/GNSS data (with or without RTK-based position corrections), or based on a movement sensor (e.g., motion detector 522). Still further, a low power zone may be determined by a predictive model, for example based on historical positions of the animal and animal behavior.

In such instances, the animal tracking device attached to tracked animal 2314 may enter a low power mode 2310, suspending all or some of its tracking capabilities similar to low power mode 1410. While not shown, the attached tracking device may cease to receive signals from a wirelessly connected base station for a predetermined amount of time. In some embodiments, the attached tracking device to tracked animal 2314 is required to be within low power zone 2316 for a predetermined amount of time.

Once tracked animal 2314 moves out of low power zone 2316 (e.g., as determined by changes in location or based on sensed movement), the attached tracking device to tracked animal 2314 may transition into active mode 2312. In active mode 2312, the tracking device operates at full functionality communicating with all wireless services including GNSS satellites, base stations, and/or cellular communications. After resuming full tracking functionality, the overall animal tracking and containment system is configured to determine an accurate location of tracked animal 2314. Determining location of the tracked animal 2314 may include calculating a position based on location data received from a GNSS satellite and base station in accordance with an RTK system.

In some embodiments, multiple low power zones similar to low power zone 2316 are designated throughout a user's property. Once tracked animal 2314 enters any of these zones and begins resting, the system will switch to lower power mode 2310. In other embodiments, the tracking device attached to tracked animal 2314 triggers low power mode based on movement data received from a motion detector included within the tracking device. As tracked animal 2314 accelerates and moves around, the motion detector (e.g., accelerometer) may detect motion and provide motion data to a processor of the tracking device so to cause the tracking device to switch to an active mode 2312.

Figure 26:
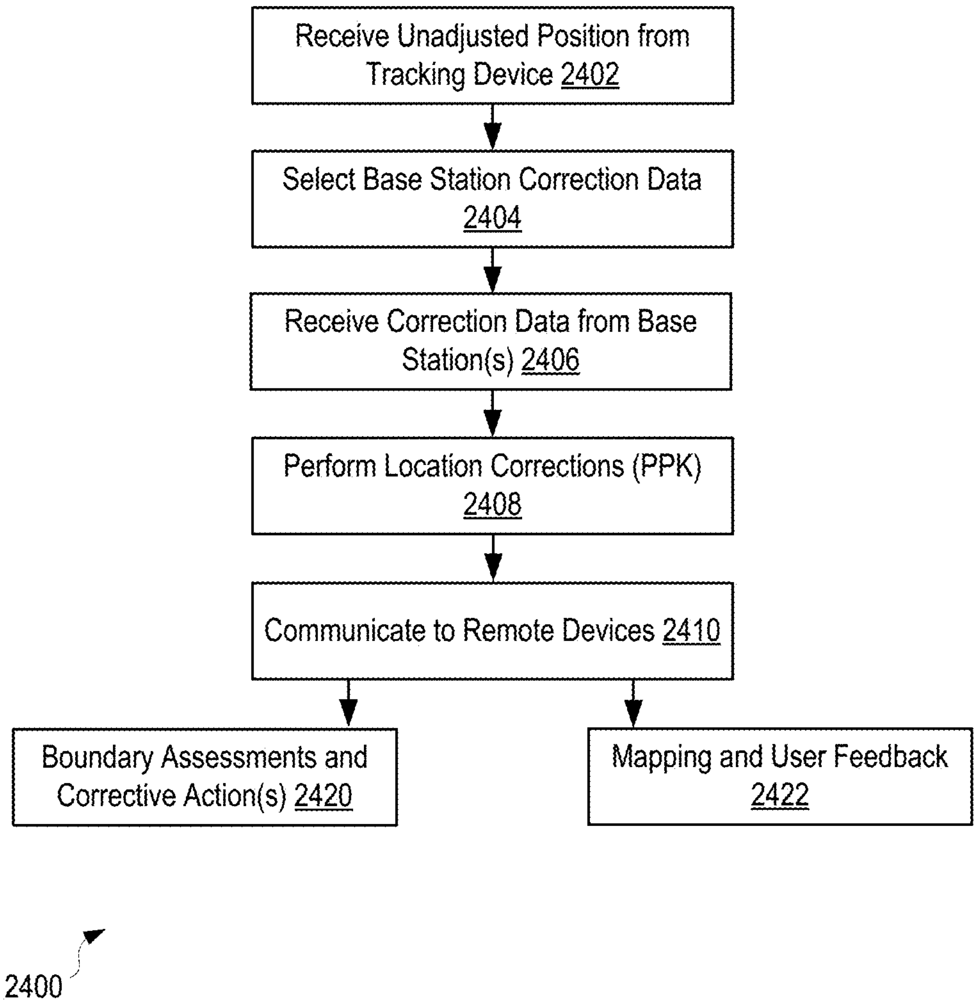
FIG. 26 illustrates a flowchart of an example method of performing high-accuracy location assessment in a power conservation mode of an animal tracking system according to an example embodiment.

Referring now to FIG. 26, an example method 2400 of performing high-accuracy location assessment in a power conservation mode of an animal tracking system according to an example embodiment. The method 2400 may be performed using a device remote from an animal tracking device, such as a network cloud 22 or other server computing device configured to receive location data from an animal tracking device that utilizes GPS/GNSS location technologies.

In the example as illustrated, the method 2400 may be performed in instances where use of RTK-based location corrections is not preferred. For example, in instances where an animal tracking device cannot establish a reliable connection with a base station, or where it is determined that an animal tracking device should not utilize a higher power mode to obtain real-time high accuracy position information, the method 2400 may be used to obtain high accuracy position information in a slightly delayed manner. Specifically, in the example shown, the method 2400 includes receiving an unadjusted position information from a tracking device (step 2402). The unadjusted position information may include an unadjusted location based on GPS or GNSS signals. The method 2400 further includes selecting one or more base stations from which to obtain observation data (step 2404). The selection of base stations may be dependent, at least in part, on a location of the animal tracking device from which the unadjusted position data is received. For example, one or more base stations may be selected that are proximate to the animal tracking device and which are providing data to the remote system.

The method 2400 further includes receiving observation data from one or more base stations, such as RTK base stations (step 2406). The observation data may be received directly at the device remote from the animal tracking device, thereby avoiding a requirement of the animal tracking device receiving and relaying such observation data.

In the example shown, the method includes performing one or more location corrections using the observation data that is obtained from the selected base stations (step 2408). The location corrections may be performed based on a postprocessing kinematic position algorithm, as described herein. Through use of observation data in a postprocessing context, high accuracy location of the animal tracking device may be determined at a device other than the animal tracking device, thereby allowing the animal tracking device to remain in a comparatively lower power mode.

In the example shown, the method 2400 further includes communicating the location data to one or more remote devices (step 2410). The one or more remote devices may include, for example, the animal tracking device itself. The one or more remote devices may also include a user device. In the case of an animal tracking device, the animal tracking device may perform one or more actions based on receipt of the high accuracy position or location information. For example, as illustrated, the animal tracking device may perform one or more boundary assessments to determine whether the high accuracy location indicates that the animal tracking device has or will cross a virtual boundary that has been defined and is associated with that device, and may initiate one or more corrective actions such as a sound, vibration, or stimulus action (step 2420).

In the case of a user device, the remote system and or user device may use the high accuracy location information to generate visualizations or otherwise provide messages or other user feedback to a user (step 2422). For example, a mapping illustration of historical positions of an animal associated with the animal tracking device may be presented on a map, including locations of high frequency visit, and the like. Additional alerts or messages may be provided to a user device as well, indicating detected activity of the animal.

In general, the specific use cases associated with postprocessing of location data to obtain high accuracy location information may vary depending on the delay in calculating the high accuracy position information. If there is some amount of delay between when GPS or GNSS data is captured at an animal tracking device and when high accuracy position information becomes available, mapping, and historical information may remain valuable, but boundary assessments or corrective actions at an animal tracking device may be stale if useful at all. As the delay in generating high accuracy position information decreases, the usability of PPK based location determinations may become more desirable to reduce power consumption and communication required at the animal tracking device itself.

V. High-Precision Usage Modes (Outdoor)

In the context of an animal tracking device, such as an animal collar 14 or another animal tracking device 500 as described herein, the present disclosure contemplates a number of modes of usage in the context of tracking and animal containment that improve the reliability, performance, and flexibility of use of such a system for both animal behavior control and convenience of use to an end user. As described below in conjunction with FIGS. 27-33, such usage modes are dependent on whether high-precision location information is available. The usage modes described in conjunction with FIGS. 27-33 are generally described in conjunction with use of RTK/PPK technologies and therefore are primarily applicable in an outdoor environment; however, in alternative implementations, aspects of these features may be integrated using UWB or other radio frequency locating technologies in an indoor environment as well.

Figure 27:
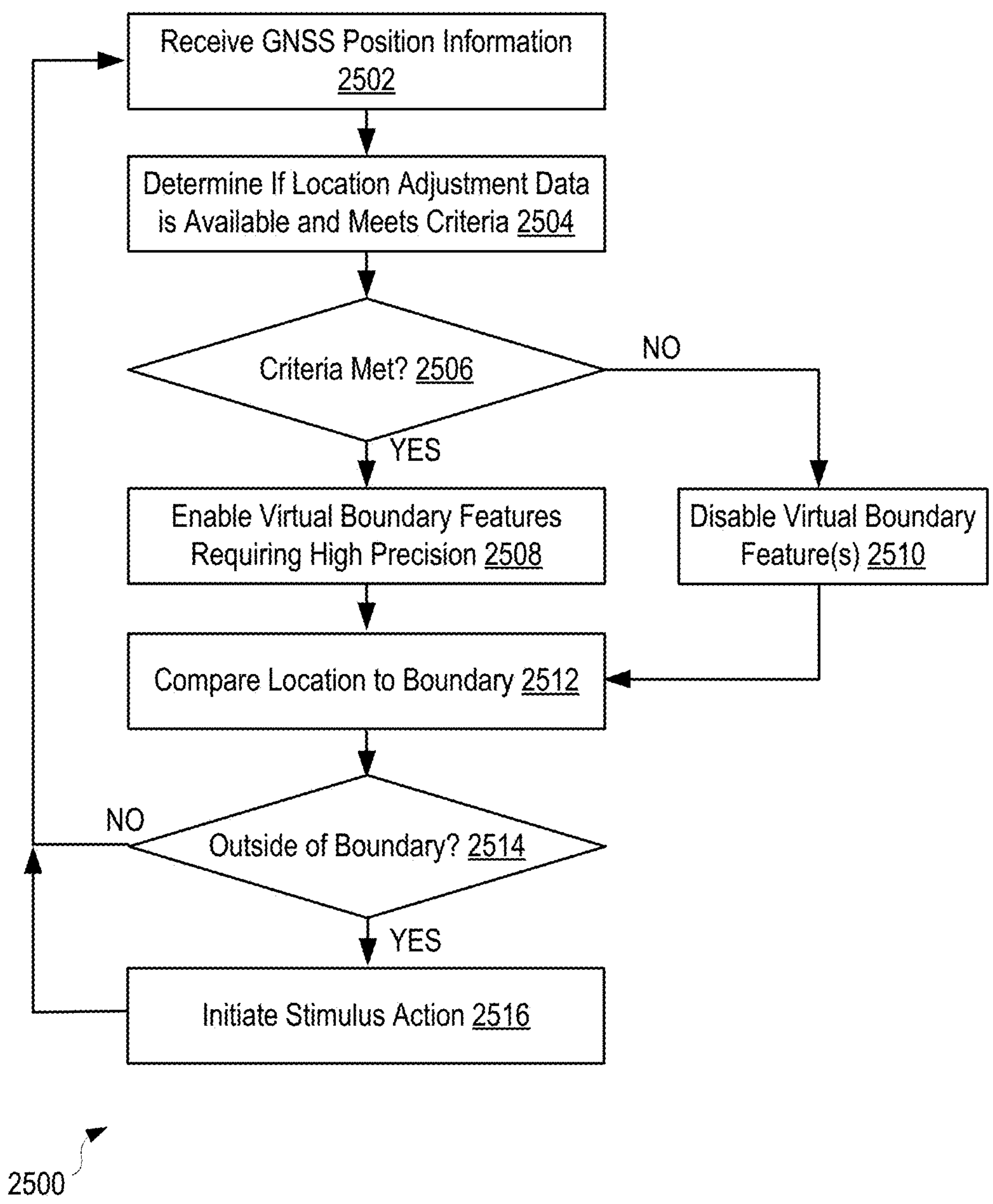
FIG. 27 is a flowchart of an example method of selectively enabling virtual boundary features in response to a determined positional precision of an animal tracking system, according to example aspects.

FIG. 27 illustrates an example method 2500 for selectively enabling particular virtual boundary features that are achievable using a high precision animal tracking system as described herein. The method 2500 may be performed, for example, via an animal tracking device, such as the animal collar described above.

In the example shown, the method 2500 includes receiving position information, such as from a GNSS receiver (step 2502). As previously noted, such position data may allow the animal tracking device to determine its position with approximately 1 meter accuracy. In this example, a determination is made as to whether location adjustment the (e.g. from an RTK base station) is available, and whether such adjustment information meets predetermined criteria (step 2504). This includes, for example, obtaining such adjustment data via a base station, or via a gateway that relays base station data.

At operation 2506, it is determined whether the location adjustment data is available and meets predetermined criteria. For example, base station data providing adjustment of the location information may be available, but may not meet a particular accuracy threshold due to the base station having recently been initialized or for other reasons (e.g. bad GNSS connection visibility and the like). In some examples, a user may set a confidence or precision threshold at which the animal tracking system enables high precision usage features. In other examples, a precision threshold is automatically set at which high precision usage features may be utilized. For example, a precision threshold of 5-10 centimeters or less may be defined as acceptable for purposes of some features, while a precision threshold greater or smaller than that may be used for other features as described below.

In some example implementations, other types of predetermined criteria may be used as well. For example, in some cases, criteria may be defined to enable high precision boundary features based on not only the availability of position adjustments, but also based on a particular time of day, or a sensed condition (e.g., dependent on weather, position or presence of other animals, and the like).

If any applicable criteria are met, including the availability of location adjustment data to provide high precision location of an animal tracking device, particular virtual boundary features may be enabled (step 2508). However, if any such applicable criteria is not met, one or more virtual boundary features may be disabled (step 2510). Particular virtual boundary features may include, for example, presence of a narrow corridor or that may allow an animal to traverse between larger containment areas. Such a corridor may allow an animal to pass to a neighbor or relative's yard without the animal crossing a virtual boundary and receiving a stimulus event. As such, an animal may be able to traverse, unimpeded by stimulus, to a nearby dog park, or the like, via a safe walkway (e.g., a path or sidewalk).

Another example of a virtual boundary feature would be a virtual gate. Such a virtual gate may be defined by a user has a narrow discontinuity in a virtual boundary that may be selectively activated or deactivated. When activated, the virtual gate may appear "closed" such that the entire virtual boundary is enclosed. When deactivated, the virtual gate may appear "open" to allow an animal to pass therethrough without receiving a stimulus event from the animal tracking device. This is accomplished by tracking the location, as adjusted, of the animal tracking device as it approaches and passes through the portion of the virtual boundary defined as the virtual gate, and comparing the adjusted, accurate location of the animal tracking device relative to the boundary and or gate. Because the gate will typically be a comparatively narrower opening in the virtual boundary (e.g., a discontinuity of 0.5 to 2 meters in width), it may be preferable to only enable such a virtual gate when high precision location information is available. In still further implementations, other types of features may be provided as well, such as current speed and position determinations at high accuracy, as described further below.

Based on position of the animal tracking device and any enabled virtual boundaries, the virtual boundaries may be compared to the current high-accuracy position of the animal tracking device (step 2512) and a determination may be made as to whether the animal tracking device is within or outside of a boundary (operation 2514). If outside of the boundary, various stimulus actions may be performed as described throughout the present specification. Operation may return to obtain further satellite-based location data to continue animal monitoring.

Figure 28:
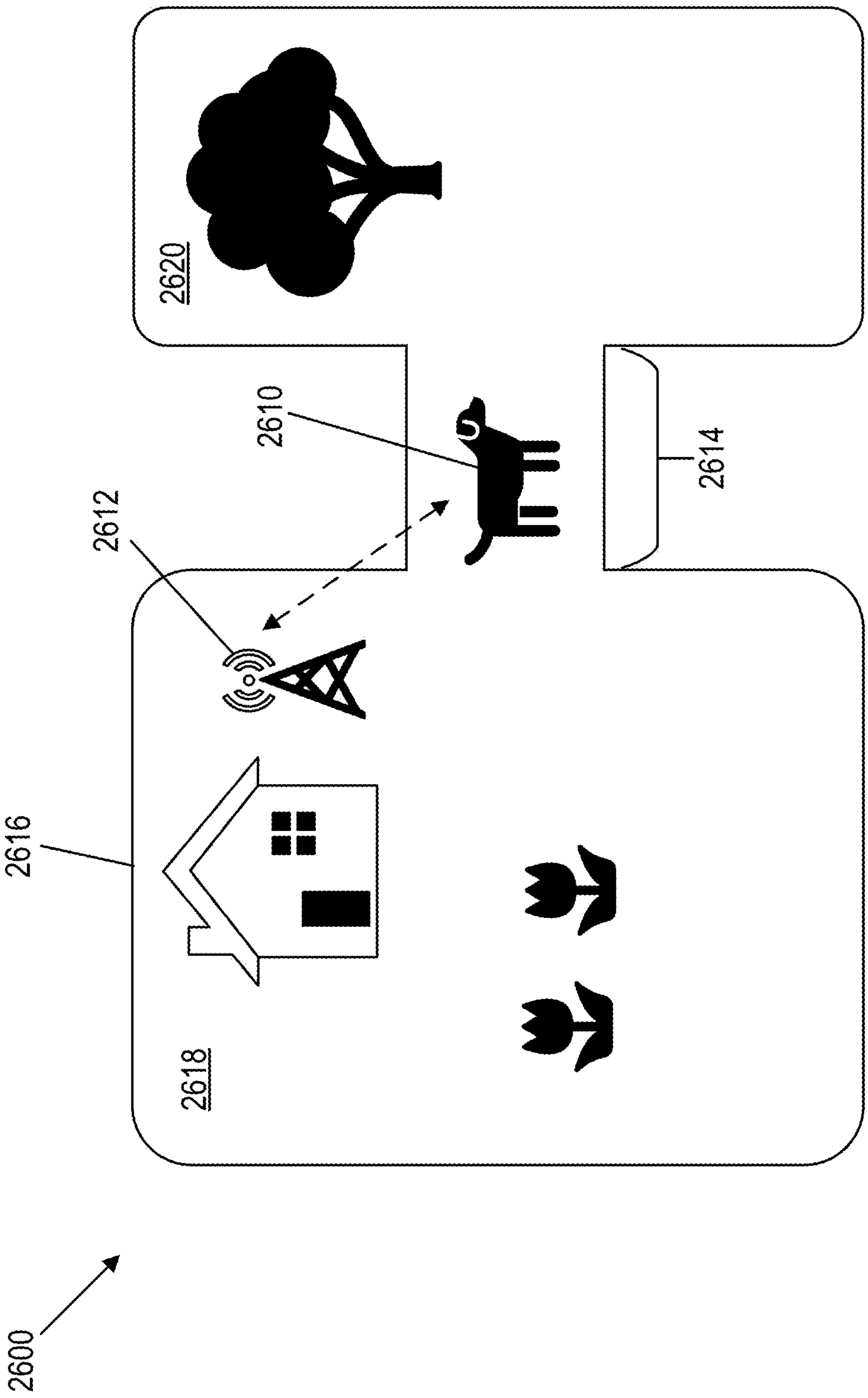
FIG. 28 illustrates an example animal tracking system with corridor creation between virtual boundary zones.

FIG. 28 illustrates operation of an example animal tracking system 2600 that utilizes corridor creation as a possible high-precision feature to allow flexible containment of an animal in view of high precision location information associated with the animal. In the shown embodiment, animal tracking system 2600 includes an animal tracking device useable to monitor tracked animal 2610. The tracking device communicates with base station 2612. The tracking device can be a tracking device as described above in conjunction with FIGS. 1 and 5-6, for example. The system 2600 uses the high-precision location information, such as is made available via location adjustments via RTK, to form a corridor between containment area 2618 and containment area 2620, such that boundary 2616 forms the perimeter around both containment area 2618 and containment area 2620. Formation of corridor 2614 enables tracked animal 2610 to freely move between containment area 2618 and containment area 2620.

As shown in this embodiment, a user may wish for tracked animal 2610 to have access to different areas of a property. Many GNSS tracking and containment systems require a specific distance between opposite edges of a boundary of several meters due to GPS drift and other inaccuracies. Using the present animal tracking system with high precision location features, the attached tracking device of tracked animal 2610 is configured to calculate boundary 2616 to a more precise level at cm level accuracy. Therefore, an animal may be maintained and tracked within a comparatively narrower passage area such as corridor 2614 with high accuracy and limit false boundary violation detections. Corridor 2614 will have a width between boundary edges of a meter or less in some embodiments. In others the width between boundary edges will be much wider depending on the available area for the corridor.

Figure 29:
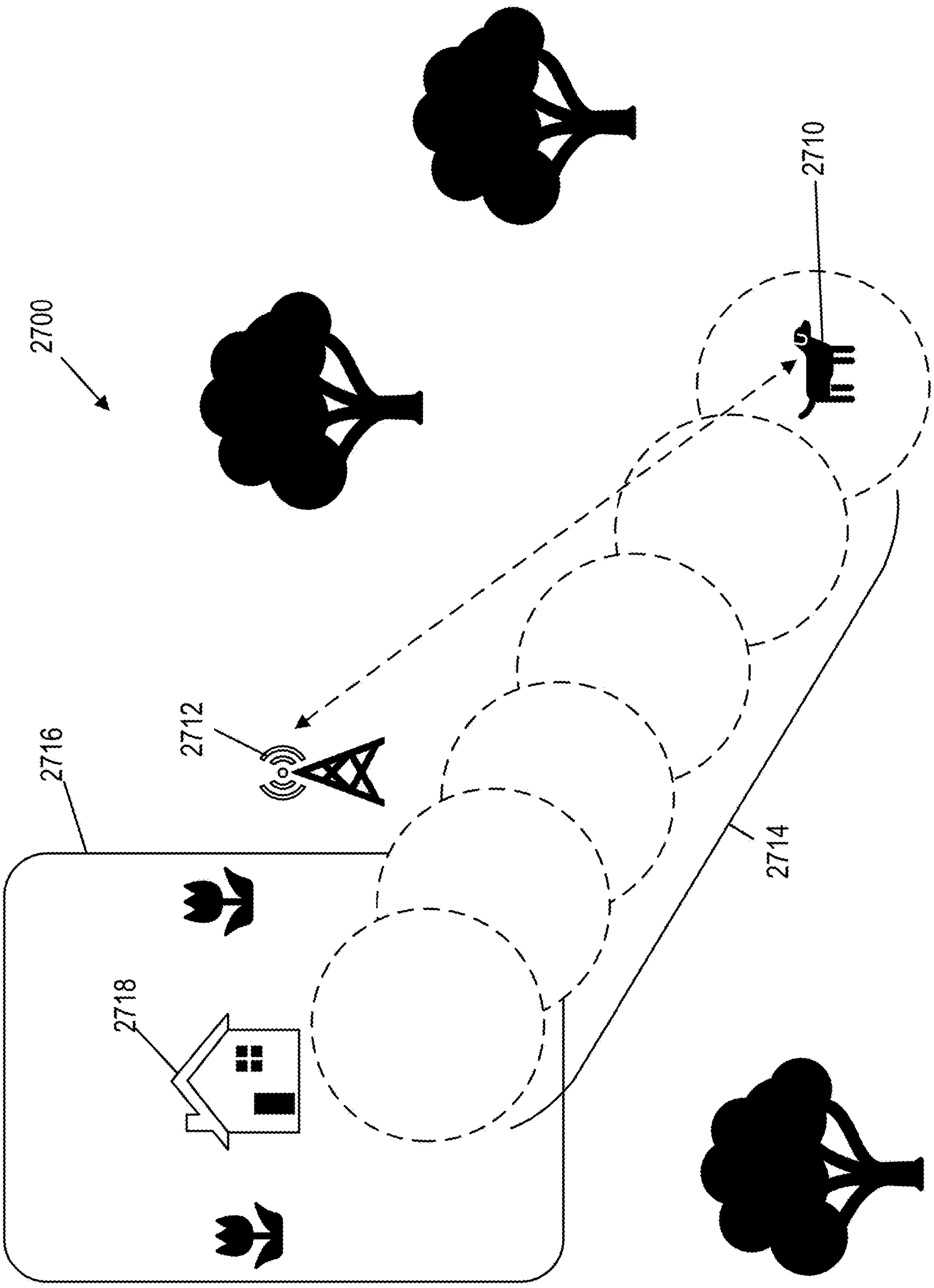
FIG. 29 illustrates a second example animal tracking system with corridor production.

FIG. 29 illustrates a second example animal tracking system with corridor production. In the illustrated embodiment, animal tracking system 2700 includes tracked animal 2710 that is associated with a tracking device that receives GNSS data from satellites as well as observation data from base station 2712 for that GNSS data. The tracking device can be a tracking device as described above in conjunction with FIGS. 1-7, for example. Further, dynamic corridor 2714 guides tracked animal 2710 to within boundary 2716 and near house 2718.

In the shown embodiment, the tracked animal 2710 is outside boundary 2716. A user may allow tracked animal 2710 to explore their property since they own or have passage rights regarding a large amount of land. Alternatively, tracked animal 2710 may also have wandered off and is outside of boundary 2716. In either case, the user may want to guide tracked animal back to house 2718. In the context of the present disclosure, the animal tracking system 2700 is configured to generate dynamic boundaries 2714 around tracked animal 2710. Dynamic boundary 2714 will form a boundary around tracked animal 2710 that prevents tracked animal 2710 from going in any direction other than towards a desired direction (e.g., back towards the house 2718 or at least within the boundary 2716). As tracked animal 2710 moves closer to a desired location, the dynamic boundary 2714 will update its boundaries to keep tracked animal 2710 from moving in a direction other than that desired. For example, dynamic boundary 2714 shrink the edge of the boundary that is farthest away from the desired destination as tracked animal 2710 moves closer.

Therefore, animal tracking system 2700 creates a dynamic corridor that shrinks to guide tracked animal 2710 back to house 2718. Utilizing RTK capabilities allows for the precise boundary to guide tracked animal 2710 without a separate device that emits a local boundary for the tracking device attached to tracked animal 2710.

While residence 2718 within boundary 2716 is shown as the destination for tracked animal 2710, the animal tracking system 2712 can be configured to guide tracked animal 2710 to other locations as well. Moreover, the formed corridor of dynamic boundary 2714 may not be straight in some embodiments. For example, dynamic boundary 2714 may guide tracked animal 2710 around an obstacle such a pond. In still other examples, animal tracking system 2700 guides tracked animal 2710 to a nearby park.

Figure 30:
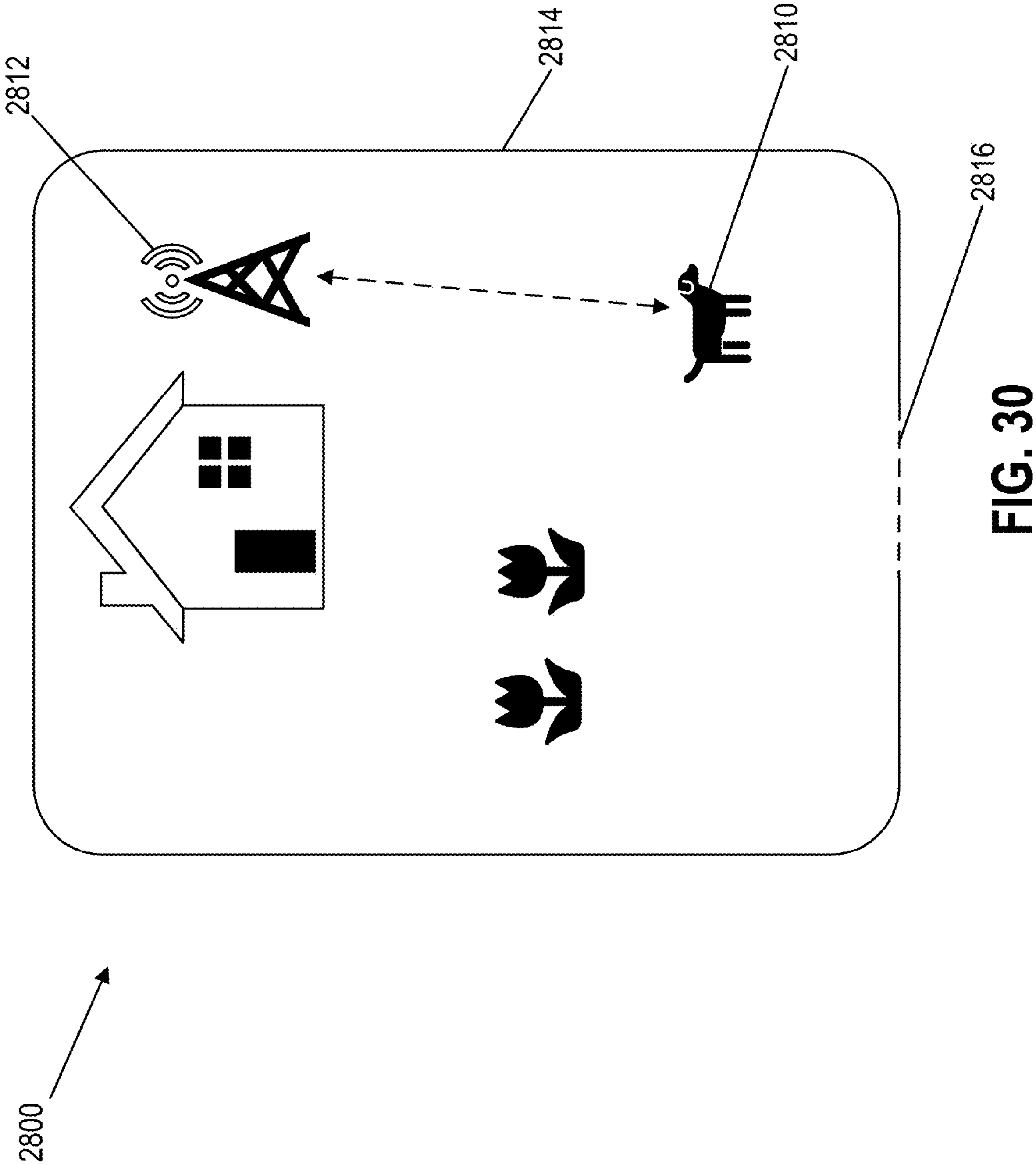
FIG. 30 illustrates an example animal containment system with a virtual gate.

FIG. 30 illustrates an example animal tracking system 2800 providing containment features, while further including a virtual gate. In this embodiment, animal tracking system 2800 includes a tracking device attached to tracked animal 2810 which receives location data from base station 2812. The tracking device can be a tracking device as described above in conjunction with FIGS. 1-7, for example. Further, boundary 2814 encloses tracked animal 2810 and discourages the animal from leaving through satellite GNSS virtual containment. Animal tracking system 2800 also includes virtual gate 2816 that is configured to allow tracked animal 2810 to pass through.

In this embodiment, virtual gate 2816 defines an opening, or discontinuity in the boundary 2814, such that the tracked animal 2810 can exit boundary 2814 without stimulus or other adverse effect. This may be particularly useful in situations where a user may wish to take tracked animal 2810 on a drive or walk. The user may configure the animal tracking system 2800 to not provide feedback if tracked animal 2810 passes through a particular point such as virtual gate 2816, or passes through the virtual gate at a particular time of day, or when the animal tracking device is also communicatively connected to a mobile device (e.g., mobile device 18) by way of a short-range wireless communication protocol, such as Bluetooth. In addition, virtual gate 2816 can be configured to allow passage during certain time frames or for a predetermined time. Outside of specified time frames, virtual gate 2816 will prevent tracked animal 2810 from leaving boundary 2814. For example, a user may define, via a mobile application, a schedule of times of the day, days of the week, and the like, in which the virtual gate 2816 is active; in additional examples, the virtual gate may be activated or deactivated based on other external conditions (e.g., weather).

In examples, the virtual gate 2816 may be defined by a user graphically selecting a portion of a virtual boundary 2814 in a user interface and defining the criteria under which the virtual gate is activated and/or deactivated. The virtual gate 2816 may be either a predefined length along the virtual boundary, or may be user-selectable. The virtual gate 2816 may be activated or deactivated in accordance with any of a number of user-definable features, for example in accordance with a predetermined schedule, or in response to a user toggle input received at the animal tracking device from a remote device such as another electronic device. Activation or deactivation may be in response to a determination that, e.g., a door has been opened or closed proximate to the virtual gate segment, that a pet door has been locked or unlocked (e.g., which may be proximate to the virtual gate segment), or detection of a predetermined number of unrecognized user devices within proximity to the animal tracking device (e.g., indicating that the pet should/should not be let outside due to a large number of individuals present).

Figure 31:
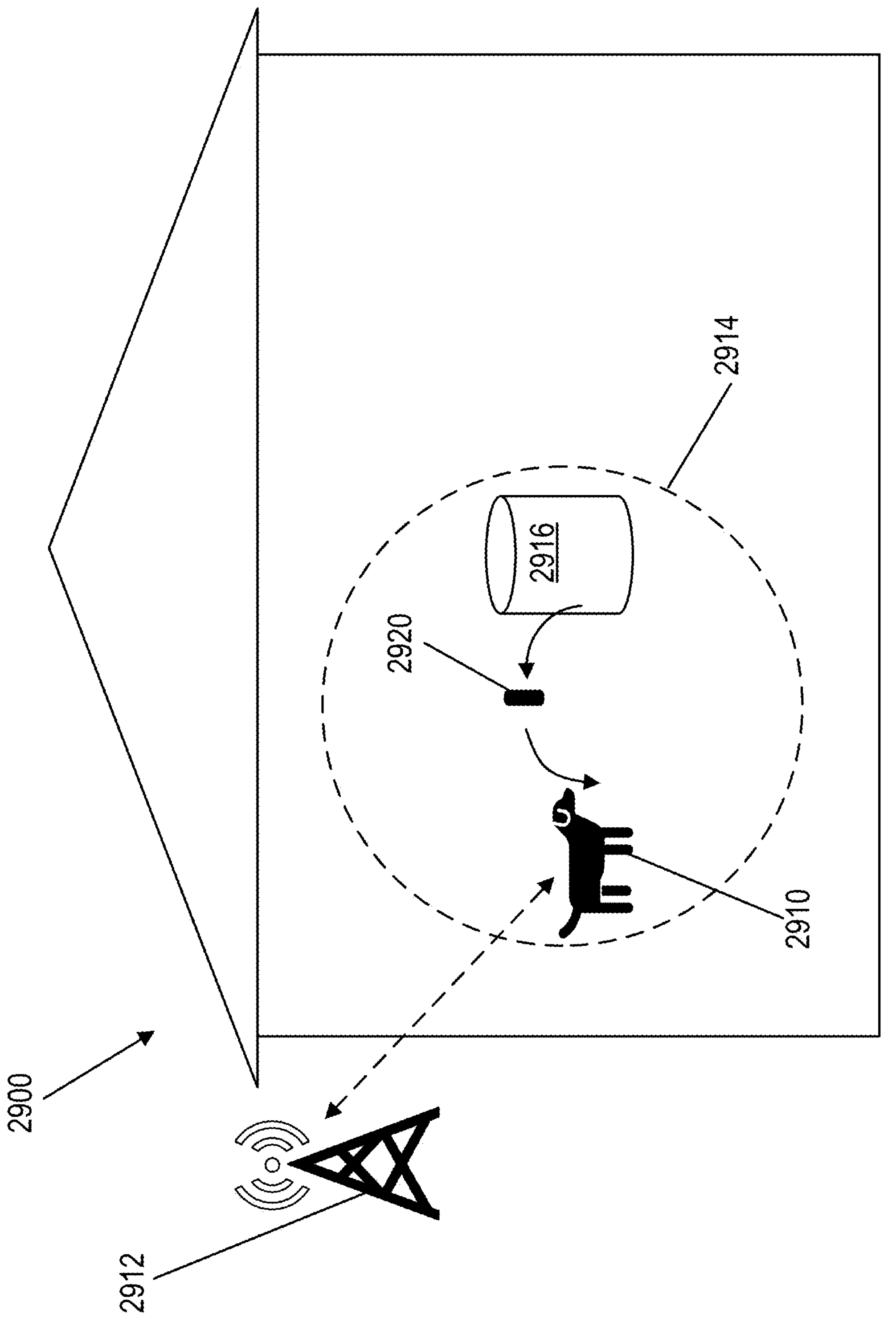
FIG. 31 illustrates an example animal tracking system with presence detection.

FIG. 31 illustrates an example animal tracking system with presence detection. In this embodiment, animal tracking system 2900 includes an animal tracking device useable to monitor tracked animal 2910. In this instance, an RTK base station 2912 is useable to assist in improving accuracy of tracking the animal tracking device; in other implementations, UWB-based locating technology may be used. The tracking device can be a tracking device as described above in conjunction with FIGS. 1-7, for example. When a position of the animal and associated tracking device is located within zone 2914, an animal device 2916 that is separate from the animal tracking device will actuate. Actuating animal device 2916 may take an action, such as ejecting treat 2920.

With the higher accuracy obtained from the communication between base station 2912 and the tracking device of tracked animal 2910, animal tracking system 2900 can define small zones around the vicinity of an animal device, such as animal device 2916. For example, a animal may approach a device expecting some type of action to occur, such as producing a treat. In some embodiments, the tracking device of tracked animal 2910 communicates to animal device 2916 to inform it of the presence of tracked animal 2910 through Wi-Fi, Bluetooth, through base station 2912, or other wireless communication method. In other embodiments, animal tracking system 2900 detects presence of the animal within zone 2914, and sends the communication through the Internet to animal device 2916. In still other embodiments, base station 2912 communicatively connects to animal device 2916 to inform animal device 2916 of the presence of the tracked animal. Further, animal device 2916 may be a water dispenser, food dispenser, animal camera, fan, or other type of animal interaction device. In some embodiments, animal device 2916 may only interact with tracked animal 2910 during certain time frames (configurable by a user via a user interface of an application, such as animal boundary management application 850).

Figure 32:
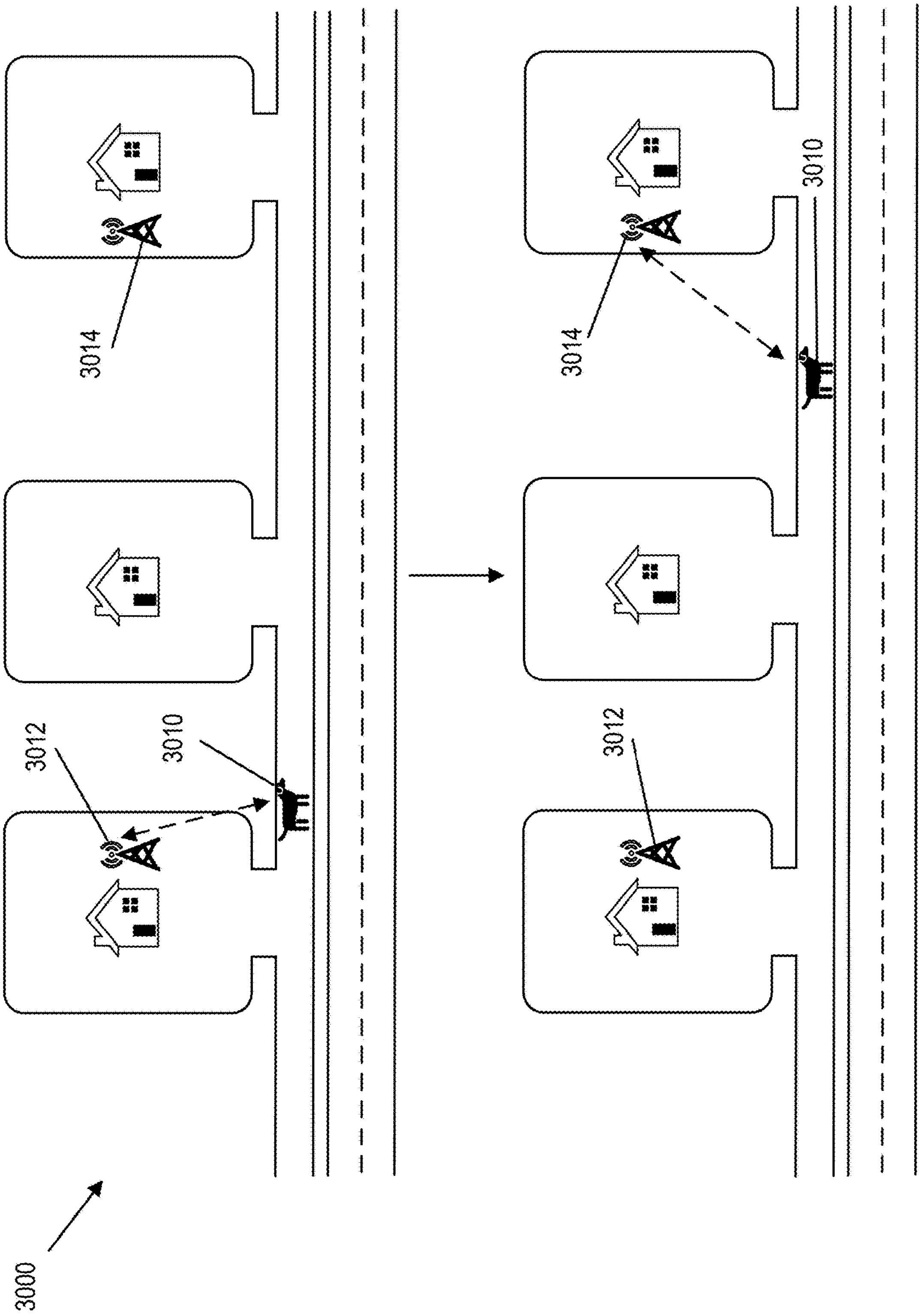
FIG. 32 illustrates an example animal tracking system with base station switching capabilities.

FIG. 32 illustrates an example animal tracking system with base station switching capabilities. In this embodiment, animal tracking system 3000 included tracked animal 3010 associated with an animal tracking device (e.g., a collar or other device as previously described) that connects to base station 3012 first, then transitions the connection to base station 3014 once the distance between tracked animal 3010 and base station 3014 is less than the distance between tracked animal 3010 and base station 3012.

In this example, tracked animal 3010 may be traveling down a street or path in a neighborhood with a plurality of residences. Tracked animal 3010 may be with a user or walking itself in accordance with previously discussed embodiments. As tracked animal 3010 leaves the communication range of base station 3012, the tracking device attached to tracked animal 3010 may scan for other base stations in proximity to that tracking device, and detects that tracked animal is closer to base station 3014. Thus, the tracking device will begin to process signals from base station 3014 as opposed processing the signals from base station 3012, to adjust location information. In this way, the tracking device ensures that it does not persist in use of signals from a base station which may be weak or low quality due to the increased distance. Stated differently, switching base stations enables the attached tracking device to process signals that may be more accurate due to a closer proximity to the corresponding base station. In another embodiment, the animal tracking device may calculate a location of the tracked animal based on processing signals from both base station 3012 and base station 3014.

In other embodiments, tracked animal 3010 may stay in the relatively same area and two base stations, such as base station 3012 and base station 3014, are both within an acceptable communication range to the tracking device of tracked animal 3010. Accordingly, both are suitable to provide observation data for animal tracking system 3000 and provide redundancy. If one base station fails, then animal tracking system 3000 can determine the failure, and switch the tracking device attached to tracked animal 3010 to begin receiving signals from the other base station as a failover method. Providing failover systems ensures tracked animal 3010 maintains its accuracy for positioning and a user will always know location of tracked animal 3010. Additional base stations may be included for additional support as well.

In addition to instances where the tracked animal 3010 is moving between base stations or where one base station loses communication, there may be other instances where base station switching is desirable. Accordingly, programming at the animal tracking device and or within a network cloud may be provided that assists with selection of base station data for purposes of RTK and/or PPK based location corrections. For example, comparative atmospheric or weather conditions at locations of the animal tracking device and respective base stations may suggest that one base station is more likely able to determine an accurate location relative to the animal tracking device. In such instances, observation data from that base station may be used. Such atmospheric or weather condition information may be obtained from a third party weather service and accessible at the network cloud for retrieval by the animal tracking device or use at the network cloud itself.

Figure 33:
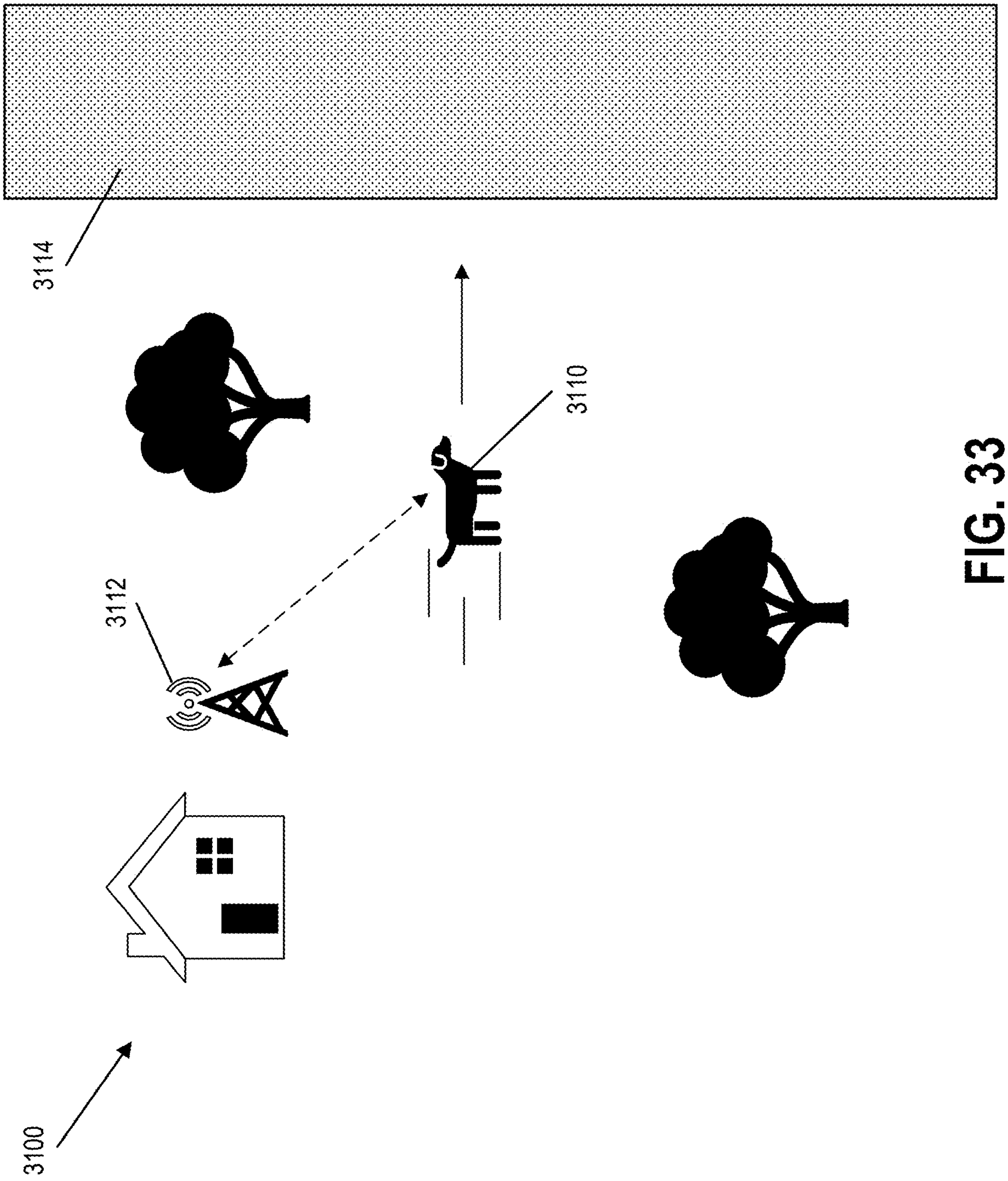
FIG. 33 illustrates an example animal tracking system with speed determination.

FIG. 33 illustrates an example animal tracking system with speed determination. In this embodiment, tracked animal 3110 includes a tracking device that connects to base station 3112 and are components of animal tracking system 3100. Through the increased accuracy resulting from the connection, animal tracking system 3100 can observe tracked animal 3110 running towards boundary zone 3114. Once animal tracking system 3100 determines tracked animal 3110 is likely to cross boundary zone 3114, the tracking device attached to tracked animal 3110 will issue a warning tone to draw the attention of tracked animal 3110 and prevent it from running into boundary zone 3114.

In some embodiments, the tracking device attached to tracked animal 3110 may emit a certain pitch or frequency to increase the likelihood of obtaining attention of the animal. In other embodiments, the tracking device may emit a slight shock to the animal to alert tracked animal 3110 that it is about to cross into boundary zone 3114. In some embodiments, animal tracking system 3100 includes an algorithm to determine the likelihood of tracked animal 3110 entering boundary zone 3114. The algorithm may include calculating speed, position, direction, and acceleration based on GNSS data received from a satellite, observation data received from base station 3112, or data received from an embedded motion detector (i.e., accelerometer). For example, if the calculated current speed is above a threshold based on the distance from boundary zone 3114, then animal tracking system 3100 determines a warning is to be emitted. In accordance with the determination, the attached tracking device will emit a warning sound, vibrate, etc.

VI. High-Precision Usage Modes (Indoor)

Referring to FIGS. 34-44, methods and systems for highly accurate animal tracking are described, in particular in conjunction with use of a radiofrequency-based position determination system. Such a radiofrequency position determination system may utilize ultra wideband (UWB) technology as described herein, and may be used alone or in conjunction with the satellite-based (GPS/RTK) highly accurate outdoor locating technologies.

Figure 34:
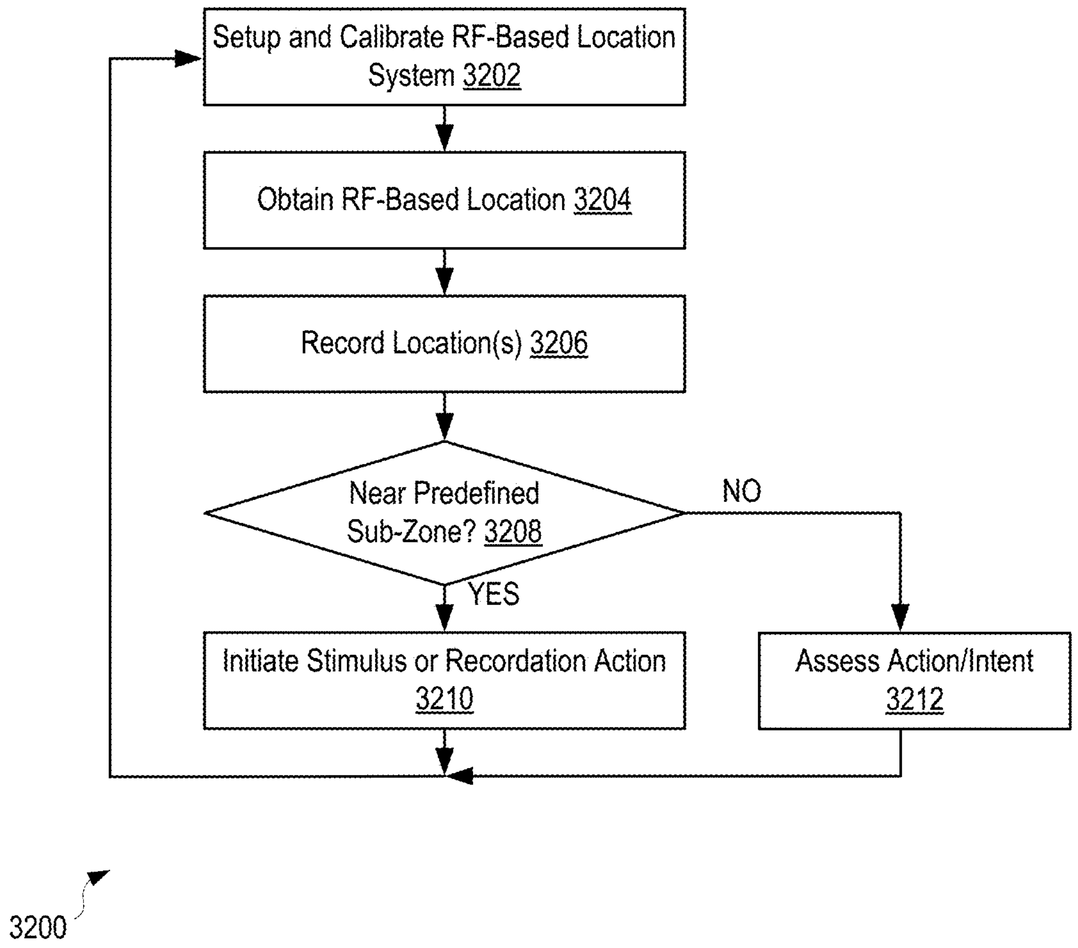
FIG. 34 illustrates a flowchart of an example method of performing high-accuracy location assessment using a radio-frequency location system included within an animal tracking system, according to an example embodiment.

FIG. 34 illustrates a method 3200 of operating a radio frequency-based animal tracking system in accordance with example embodiments. The method 3200 is initiated by setup and calibration of a radiofrequency-based animal tracking system (step 3202). Setup and calibration of such a system may include positioning a UWB base station within a residence of a user, and registering a known location of the base station, for example within a user interface of a mobile application executable on a mobile device. One example of mobile application is the animal boundary management application 850 described herein.

Figure 35:
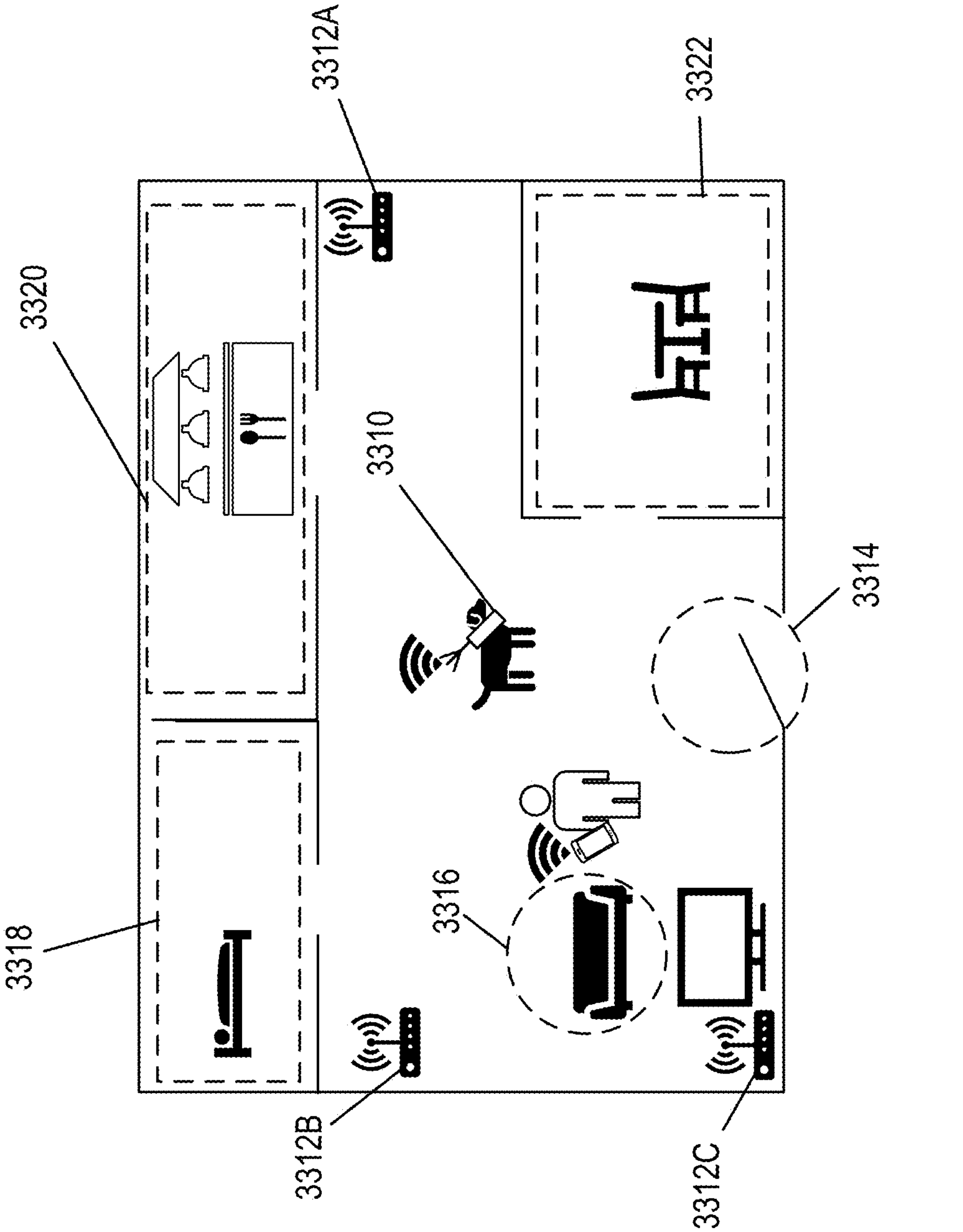
FIG. 35 is an example schematic of the animal tracking system of FIG. 5 utilizing ultra-wideband devices, according to an example embodiment.

An example implementation of the UWB containment and tracking features of an animal tracking system are shown in association with FIG. 35. In this embodiment, the tracking device 3310 communicates with UWB beacons 3312A, 3312B, and 3312C (collectively referred to as UWB beacons 3312). Using the previously discussed UWB locating techniques, the animal tracking device 3310 is configured to program one or more exclusion zones and knowledge zones in the house. For example, the tracking device 3310 records the frequency and duration of when the tracking device 3310 enters knowledge zone 3314 surrounding the front door or the knowledge zone 3316 surrounding the couch. In addition, UWB tracking enables the tracking device 3310 to discourage entry into one of the exclusion zones by issuing a stimulus to the animal wearing the tracking device. For example, detecting the animal tracking device 3310 within exclusion zone 3318 initiates a stimulus at the animal tracking device to discourage the animal from entering the bedroom. Detecting the animal tracking device 3310 within exclusion zone 3320 initiates a stimulus to discourage the animal from entering the kitchen, and detecting the animal tracking device within exclusion zone 3322 initiates a stimulus to discourage the animal from entering the dining room.

In some instances, rather than requiring the animal tracking device to be detected within the exclusion zone to initiate a stimulus, position and direction information associated with the animal tracking device may be used to determine intent of the animal to enter an exclusion zone, and may proactively implement stimulus to prevent the animal from entering an exclusion zone. Such a feature may be implemented in a similar manner to that described above in conjunction with GPS/RTK usage scenarios in which the animal tracking device moves toward/approaches a virtual boundary.

Figure 36:
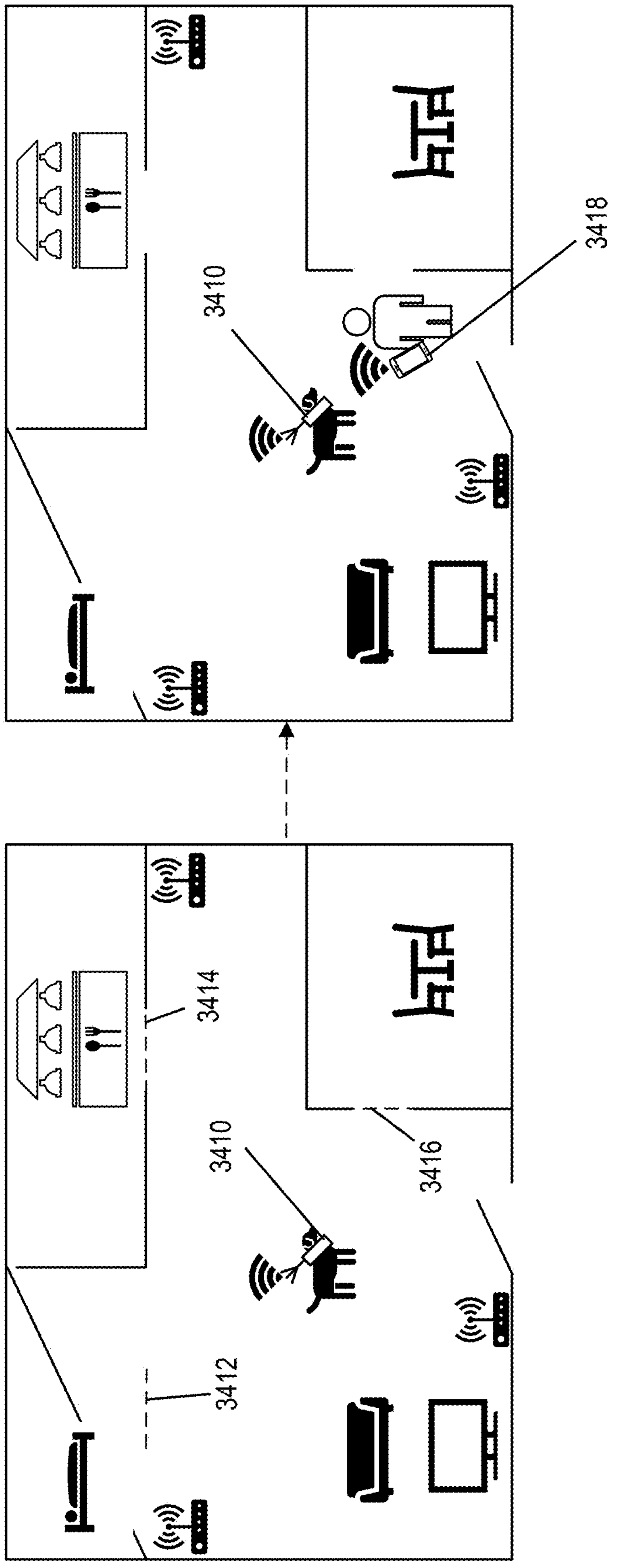
FIG. 36 is an example schematic for implementing virtual gates in an indoor environment.

FIG. 36 is an example schematic for implementing virtual gates in an indoor environment. Rather than using only zones, gates that cover the doors or certain portions of the perimeter of a zone are shown in this embodiment. Virtual gate 3412 may discourage the animal from entering the bedroom by causing the animal tracking device 3410 to initiate a stimulus when the animal approaches the virtual gate 3412. Similarly, animal tracking device 3410 may be configured to initiate a stimulus when its location is detected at or approaching virtual gate 3414, indicating the animal is attempting to enter the kitchen. Likewise, animal tracking device 3410 may similarly be configured to initiate a stimulus when its location is detected at or approaching virtual get 3416, thereby discouraging the animal from entering the dining room.

In some example implementations, the animal tracking device 3410 is configured to selectively respond to virtual gates based on the presence of a remote computing device 3418. If the presence of the remote computing device 3418 is detected within the home, then the virtual gates may be considered "disabled" such that the animal tracking device 3410 may pass through the virtual gates without stimulus operations being initiated, thereby allowing the animal to enter the various rooms.

Figure 37:
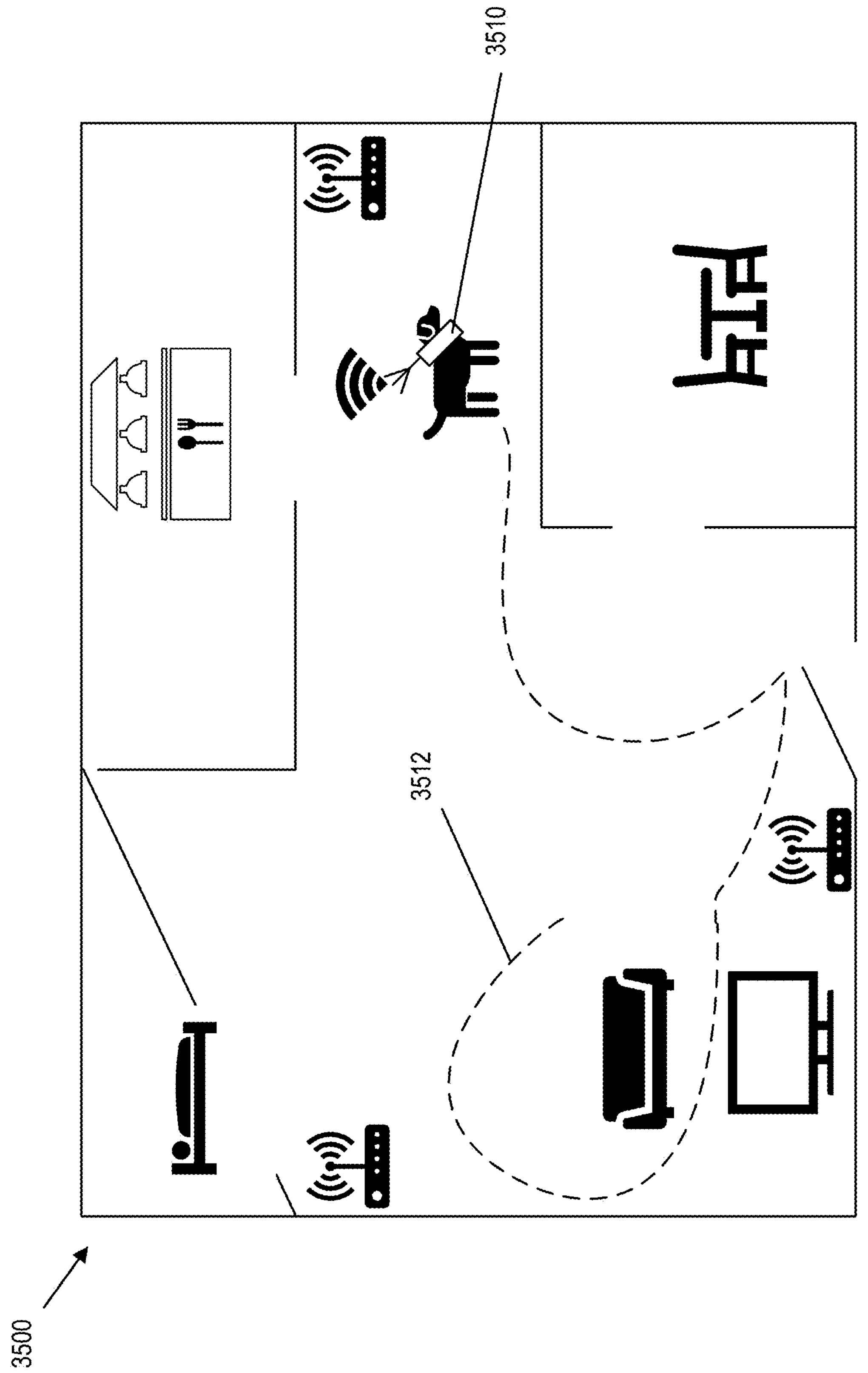
FIG. 37 illustrates an example recorded position of a tracked animal in an indoor environment using the methods and systems described herein.

FIG. 37 illustrates an example recorded position of a tracked animal using the UWB system described in Parts I-II, above. In the shown embodiment, tracking system 3500 records the positions of the tracking device 3510 in the form of recorded position data 3512.

Figure 38:
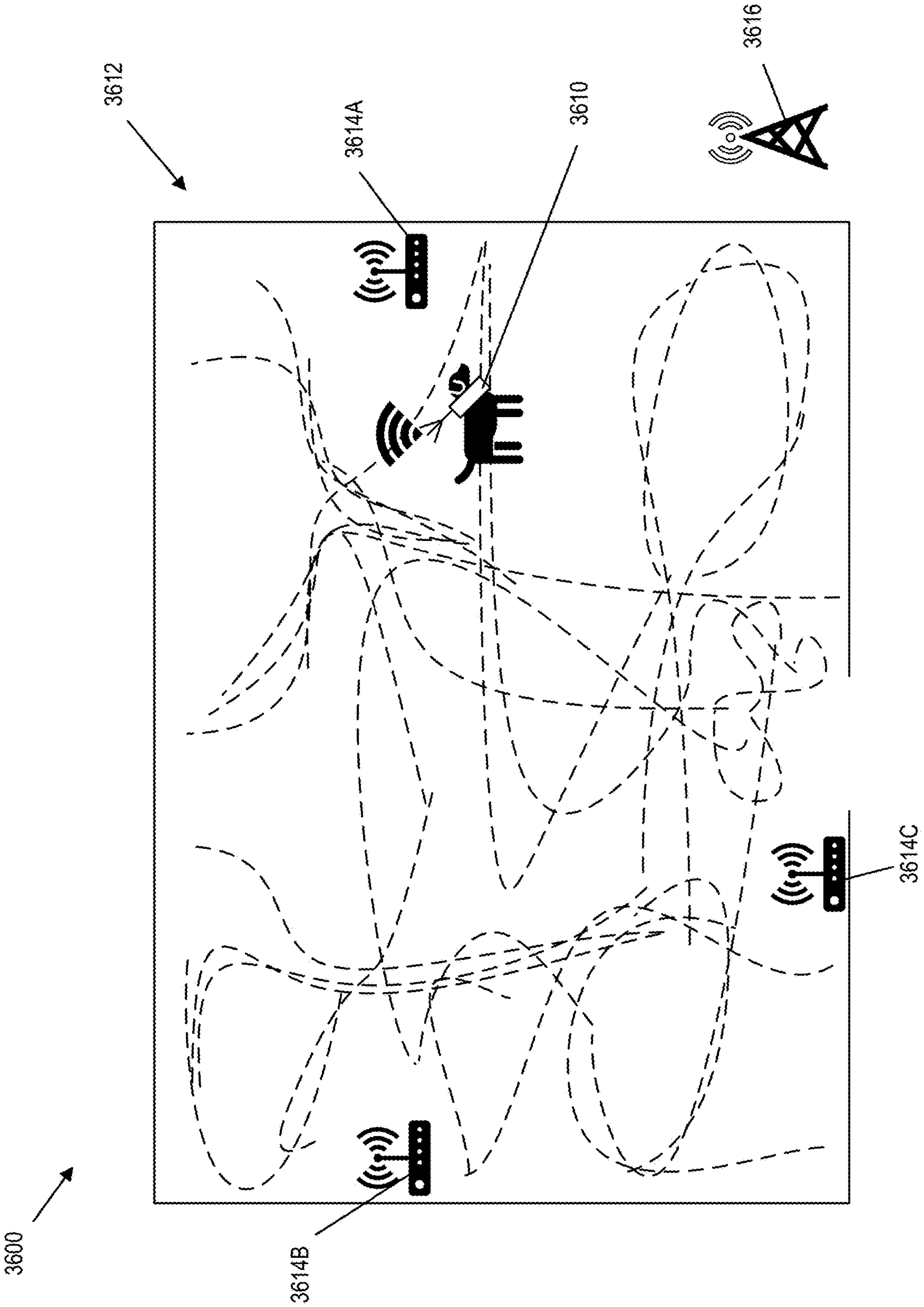
FIG. 38 illustrates an example mapping of recorded positions for a tracked animal, according to an example embodiment.
Figure 39:
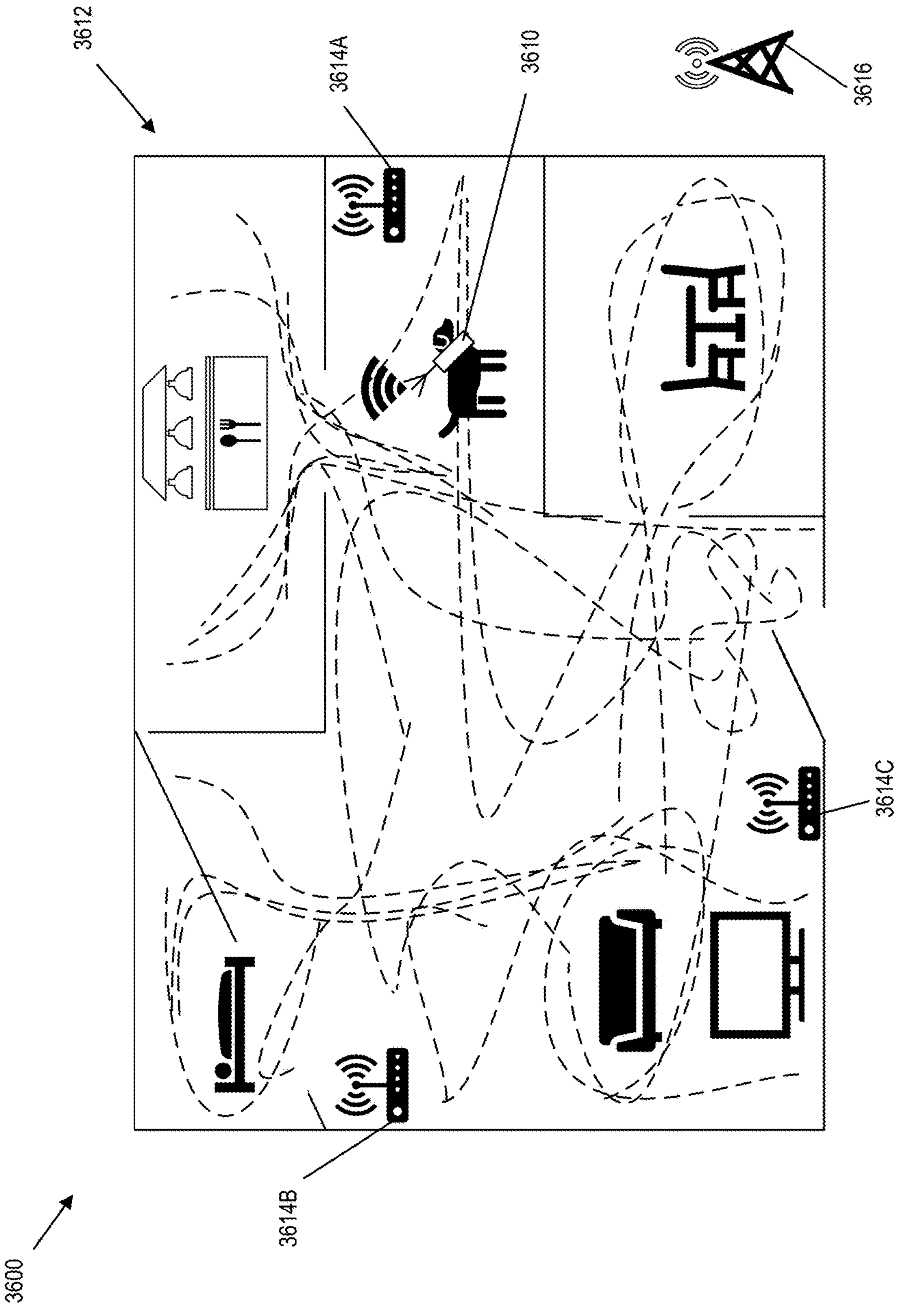
FIG. 39 illustrates an example of inferred obstacles based on the mapping of recorded positions seen in FIG. 37.

Other embodiments can utilize the recorded position feature of FIG. 37. In FIG. 38 and FIG. 39, the tracking system records a large amount of tracking data related to positions of an animal within a residence of a user. Based on that data, an interior layout of the residence may be inferred based on a lack of movement of the animal tracking device to particular positions or through particular paths, thereby indicating the presence of walls, furniture, and the like. Accordingly, by aggregating location data associated with an animal tracking device, it is possible to generate a map of the residence. As illustrated specifically in FIG. 38, a set of movement paths of animal tracking device 3610 are monitored at the animal tracking device. Here, tracking system 3600 has recorded the position of tracking device 3610 as the plurality of recorded positions 3612. The tracking system 3600 uses either the UWB beacons 3614A, 3614B, 3614C, or base station 3616. After a sufficient amount of data is collected, the tracking system 3600 can generate a map of the inside of a residence as shown in FIG. 39. Specifically, the location data may be processed by the animal tracking device, or uploaded to a server at which location data may be analyzed to determine the layout of the residence. In example implementations, the inferred features (e.g., walls, furniture, and the like) may be displayed within a user interface of a mobile device 18 or other user computing device, and the user may select and confirm the structural features defining the layout. Still further, the inferred layout of the residence may be used, for example at a server, to infer types of activities of an animal based on subsequent movements of the animal tracking device.

Figure 40:
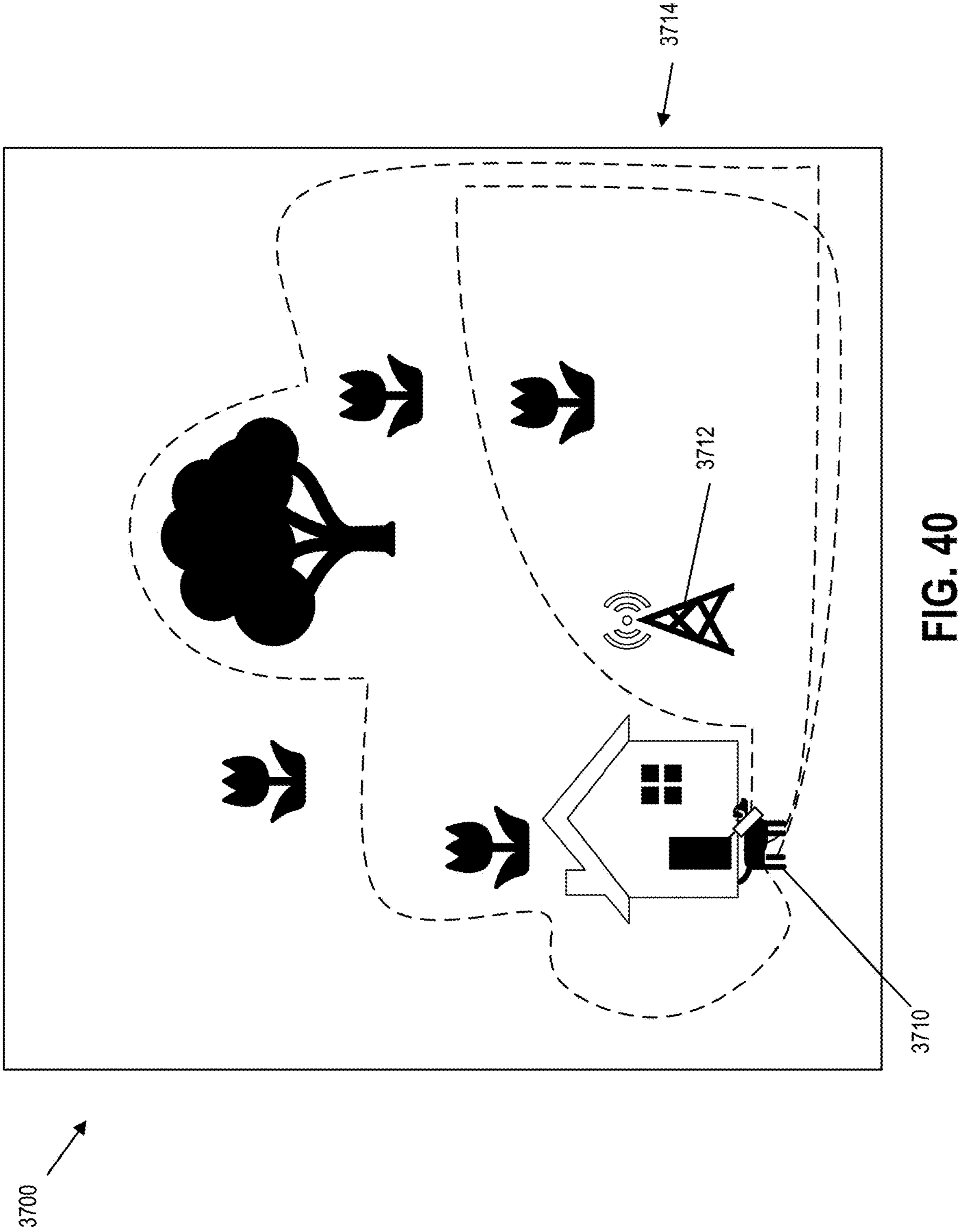
FIG. 40 illustrates an example of inferred obstacles in an outdoor environment, according to an example embodiment.

In addition, the mapping features shown in the indoor environment can be extended to an outdoor environment as shown in FIG. 40. Tracking system 3700 uses base station 3612 to track an animal with an animal tracking device 3710 as it moves through an area using recorded position data 3714 of the animal tracking device 3710. Although using GPS/RTK based positioning rather than UWB-based indoor positioning, location data points may be used to infer potential positions of obstacles (e.g., exterior walls of a residence, trees, water features, and the like) and/or points of interest of the animal. In some examples, the location data points may be correlated at a server with satellite imagery that is analyzed using one or more object recognition techniques to identify potential obstacles that may be validated against the location data points to determine likely obstacle locations.

Figure 41:
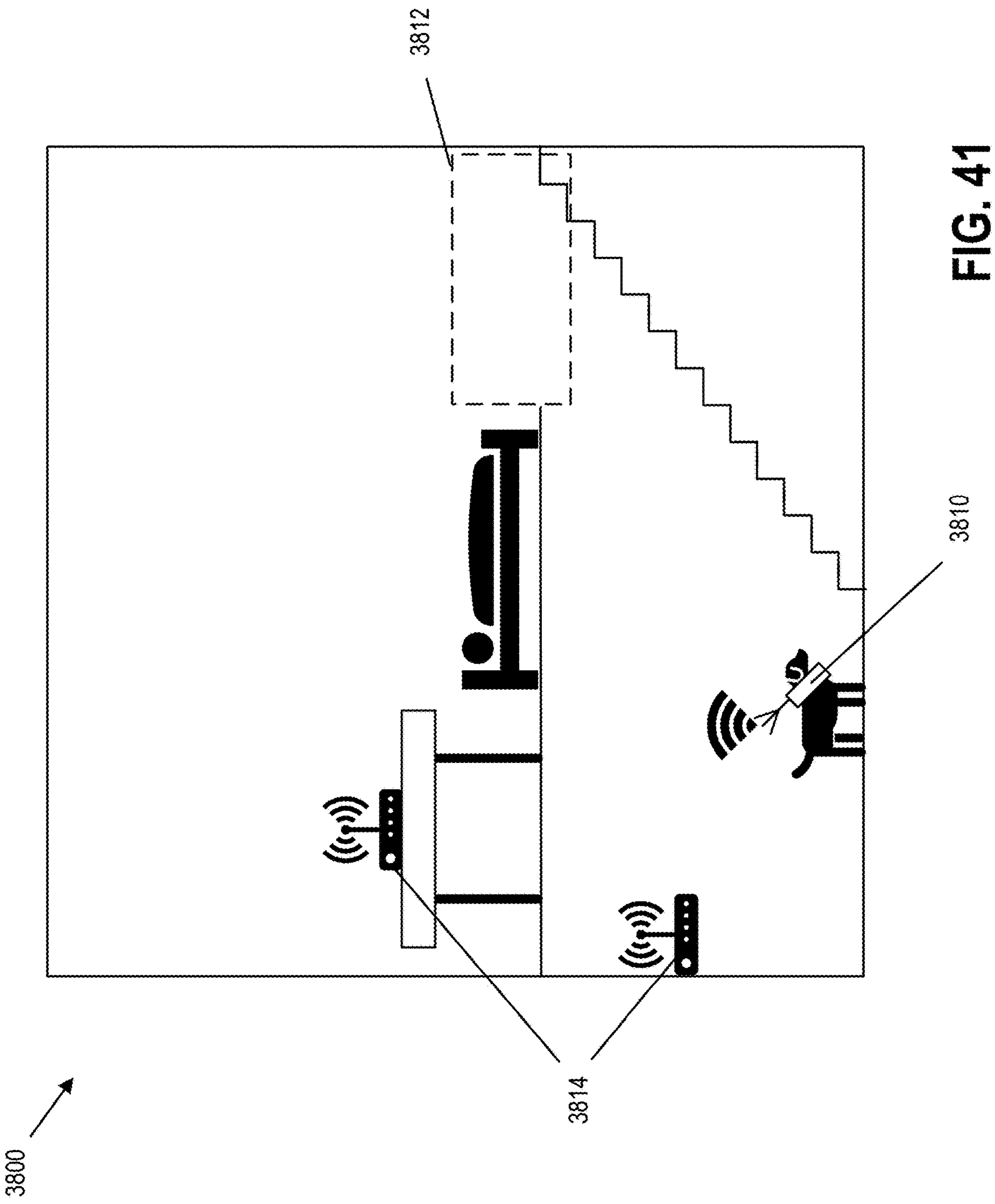
FIG. 41 illustrates a schematic of an example three-dimensional boundary definition, according to an example embodiment.

In addition to two-dimensional boundaries, tracking systems disclosed herein can also include a third dimensional component. FIG. 41 is a schematic diagram of a three-dimensional boundary. In the shown embodiment, tracking system 3800 enables the animal tracking device 3810 to generate a stimulus discouraging an animal from going upstairs. Tracking device 3810 communicates with UWB beacons 3814 to determine its location. Once the animal tracking device 3810 crosses into the three-dimensional volume of virtual zone 3812, the tracking device 3810 may be configured to issue a stimulus to the animal to encourage the animal out of virtual zone 3812.

Figure 42:
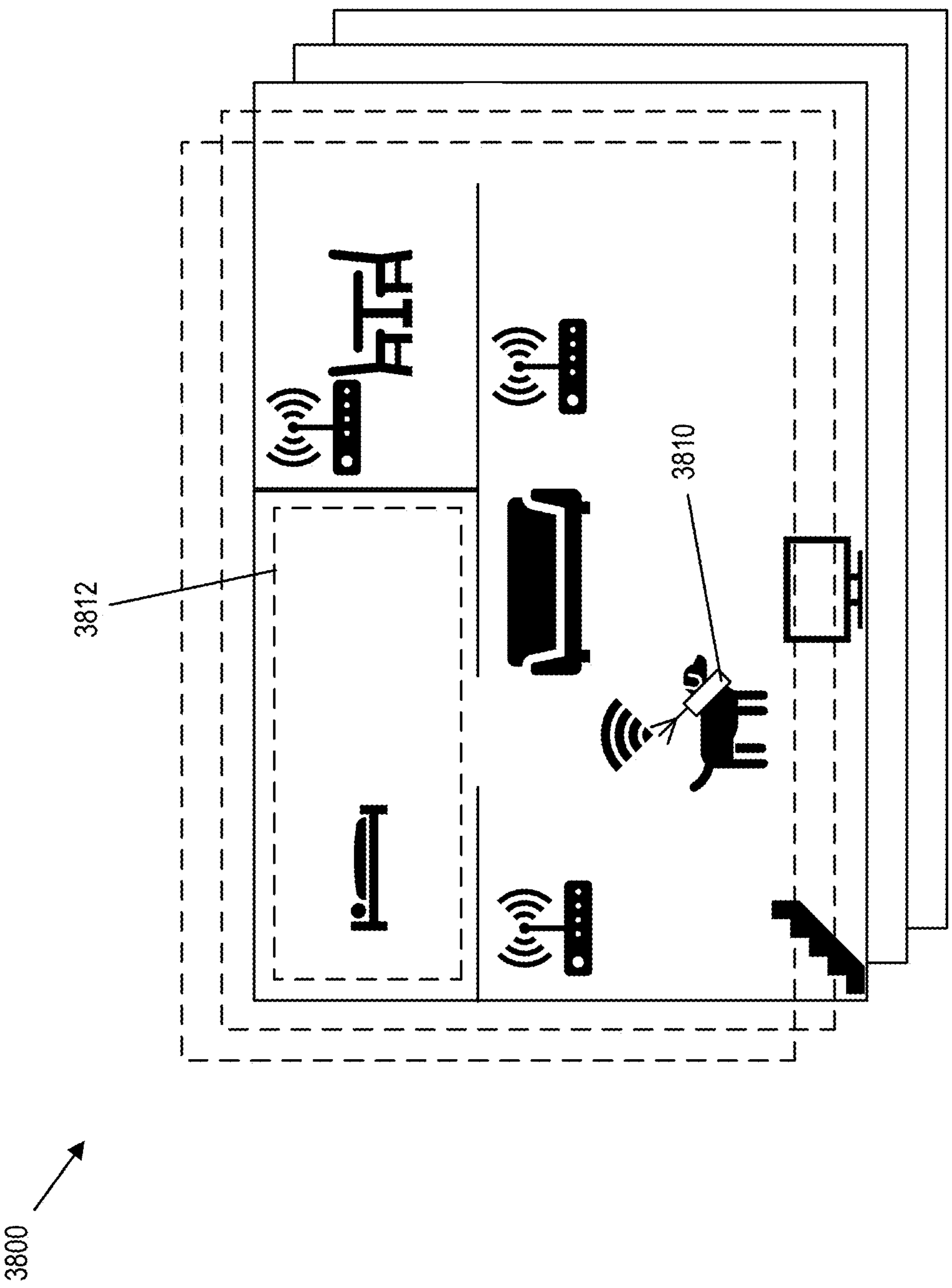
FIG. 42 is a schematic diagram of varying boundaries based on the current level of a building.

FIG. 42 is a schematic diagram of varying boundaries based on the current level of a building. Due to the three-dimensional tracking and containment capabilities, animal tracking system 3800 can program boundaries for different floors. For example, animal tracking device 3810 may be programmed with virtual zone 3812, such that the animal tracking device 3810 may issue a stimulus to dissuade the animal from entering the bedroom, but allow entry into a kitchen on a floor below the bedroom.

In addition to tracking animals on different floors, the animal tracking device 3810 may be programmed with three-dimensional zones that are smaller in size, such as on/over furniture, countertops, and the like. Accordingly, two different zones may be defined, for example above and below a table, to allow an animal to pass under a table, but to generate a stimulus and/or issue a notification if the animal tracking device is detected above the table. Other implementations are possible as well, as would be understood from the description provided herein.

Figure 43:
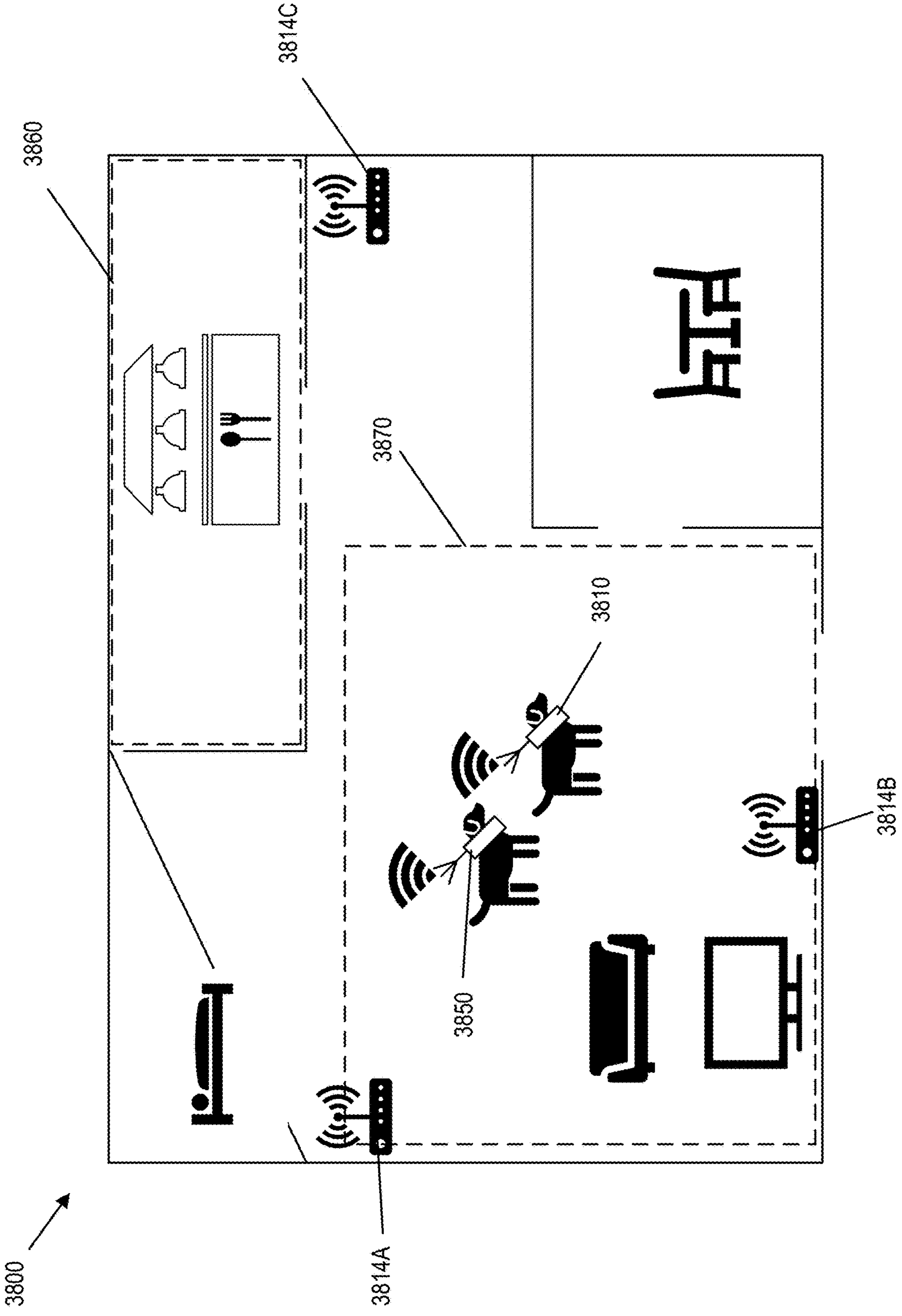
FIG. 43 illustrates an example environment for recording interactions between two tracked animals.

FIG. 43 illustrates an example environment for recording interactions between two tracked animals. In the shown embodiment, two animals wearing tracking devices 3810 and 3850 respectively spend time within a predetermined distance of each other. The animals may be playing, snuggling, or otherwise spending time together. Both tracking devices connect to the UWB beacons 3814A, 3814B, and 3814C for tracking and containment. In this example, because the animals are tracked with high accuracy, individual actions may be detected and tracked, as well as collective/cooperative actions. Accordingly, particular actions, such as fighting, snuggling, and the like, may be detected and classified based on location data, as well as optionally other sensor data available in an animal tracking device (e.g., movement data from an IMU, indicating quick movements, stillness, etc.).

In addition to the above, in a manner similar to that described in conjunction with FIG. 4, in this context a set of virtual boundaries or exclusion zones 3860, 3870 may be defined. These zones may be used individually for each of the tracking devices 3810, 3850, such that one animal associated with animal tracking device 3810 may be disallowed from entering zone 3860 (e.g., to stay out of the kitchen) while another zone 3870 may be defined as a containment zone to encourage the animal associated with tracking device 3850 to remain within that bounded area (e.g., within a living room). As seen in this example, the locations where the two animals are permitted may be overlapping, or may be defined to be separate and non-overlapping in the indoor context using UWB-based technologies, similar to the arrangement shown in FIG. 4. Additionally, each tracking device 3810, 3850 may be defined as optionally including both exclusion zones and boundaries, which may be defined uniquely for each device, or may be reused across two or more such devices. Furthermore, as described above, each of these zones and/or virtual boundaries may be time-sensitive, e.g., being activated and/or deactivated at user-definable times of day, thereby allowing an animal into an area of the house at particular times of day, or based on presence/absence of other animals or associated mobile devices either in particular zones or within range of one or more of the beacons 3814 (e.g., indicating presence of a pet owner).

Figure 44:
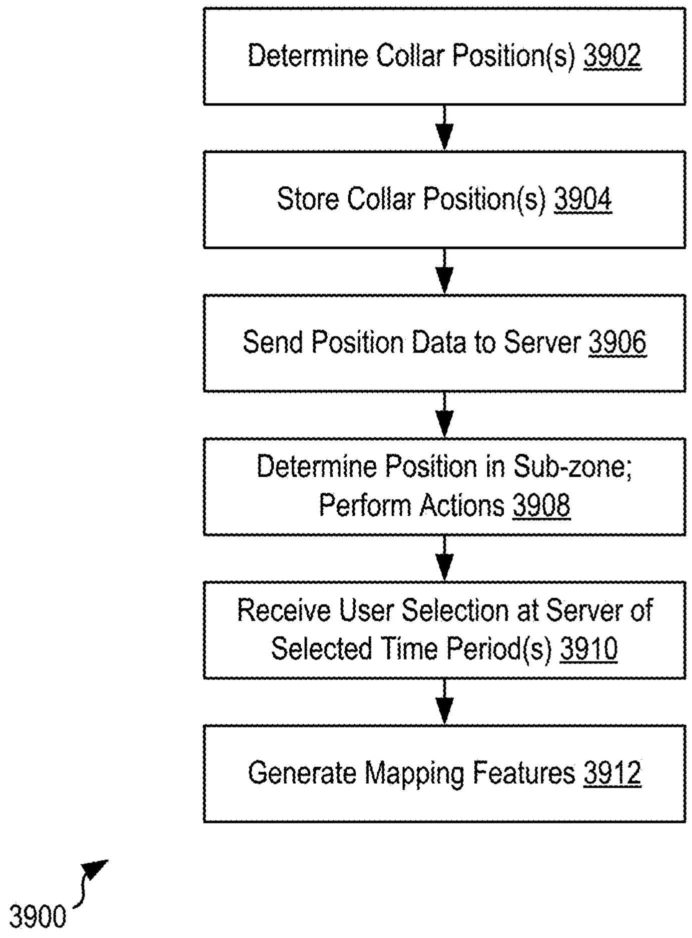
FIG. 44 is a flowchart of an example method of generating mapping features based on animal tracking device positions, in accordance with some embodiments.

FIG. 44 illustrates a method 3900 for monitoring and managing an animal tracking system including an animal tracking device. The method 3900 is useable to assist with tracking movement of an animal or object within specified zones, and inferring features associated with tracked movements of the animal.

In the example shown, the method includes determining positions of an animal tracking device using, for example, UWB and/or GPS/RTK technologies as described herein (step 3902). As the positions of the animal tracking device are captured, they may be stored (step 3904), and this captured and stored position data may be transmitted to a server remote from the animal tracking device (step 3906).

In the example shown, the method 3900 includes one or more additional operations that may be performed by the animal tracking device and/or by the server. For example, at the animal tracking device, it may be determined whether the animal tracking device is positioned within a particular sub zone that is defined within a animal tracking region (step 3908). For example, a sub zone may be an upstairs region, a particular room, an area on or above a piece of furniture or countertop, a feeding or resting area of the animal, and the like. In response to determining that the animal tracking device is in a particular location, one or more actions may be taken at the animal tracking device. Such actions may include registering the action of the animal in an activity log, sending a notification to a user at his or her mobile device, or initiating one or more stimulus actions as described herein.

The one or more additional operations may also include receiving user selection, for example at a server in response to input at a mobile device, a selection of one or more historical time periods (step 3910). In response to the selection, the server may generate mapping features that are based on the retrieved location data (step 3912). These features may include visual representations of the path traveled by the animal tracking device, heat maps of location density, or other data visualizations that assist in understanding movement patterns or locating specific incidents within the selected timeframe. Details regarding such a user interface and notifications are provided in Part VII, below.

VII. User Device: Activity Presentation and Device Feedback Features

Referring to FIGS. 45-49, additional features of an animal tracking and containment system using high-accuracy animal positioning (such as may be provided using RTK and PPK technologies) are described. The additional features are reflected in a user interface of a computing device of a user associated with an account that has set up one or more animal tracking devices and one or more virtual boundaries. In some examples, the user interface may be presented on a mobile device of a user, such as mobile device 18 of FIG. 1.

Figure 45:
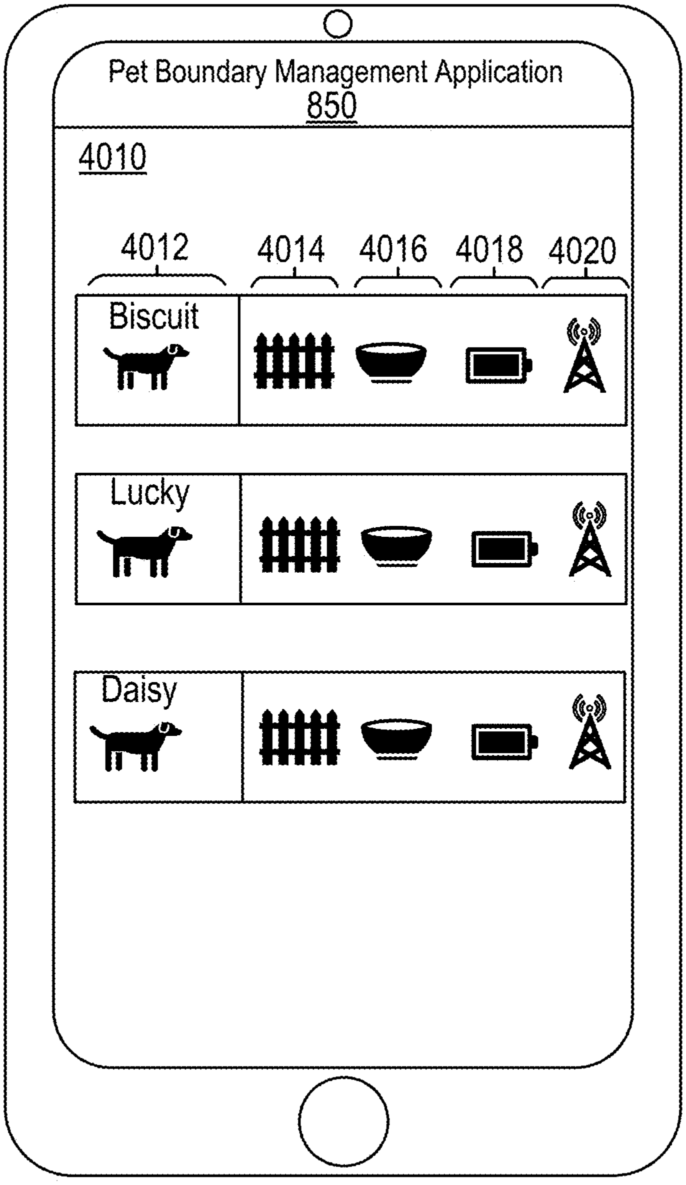
FIG. 45 illustrates an example menu of an animal boundary management application.

FIG. 45 illustrates an example menu screen of an animal boundary management application 850 operable on a mobile device. In the shown embodiment, the mobile device, when executing animal boundary management application 850, depicts a user interface 4010 options for controlling various features related to animals that are associated with icons

4012. Each icon 4012 includes fence settings 4014, device interaction settings 4016, power settings 4018, and base station settings 4020.

Each of the above-listed settings can be chosen by a user to update, change, or otherwise interact with the respective feature. For example, a user can interact with fence setting 4014 and individually place boundaries for each icon 4012 depending on where each animal is allowed to be. In some examples, the fence setting 4014 allows the user to able a virtual boundary definition mode, associated with either the mobile device or with an animal tracking device for defining a virtual boundary specific to that animal. Other embodiments may include defining gates, safe zones, and keep out zones, including selection of locations of such zones and features, timing of operation of such zones or features, and stimuli used to enforce such zones and features.

Animal interaction settings 4016 may allow a user to determine how a specific interaction device (e.g., treat dispenser, water dispenser, food dispenser, etc.) interacts when the animal comes within vicinity of the device. Further the user can set times that the device interacts with the animal. Power settings 4018 allow the user to select individual settings for tracking devices attached to each animal associated with animal icon 4012. For example, a user can select areas or timeframes that the tracking device will switch to a low power mode and disable RTK features to conserve battery as previously discussed. A user can use base station settings 4020 to initialize, program, or otherwise interact with base stations. For example, the user can program failover settings, range for the base station, or calibrate settings as well.

Figure 46:
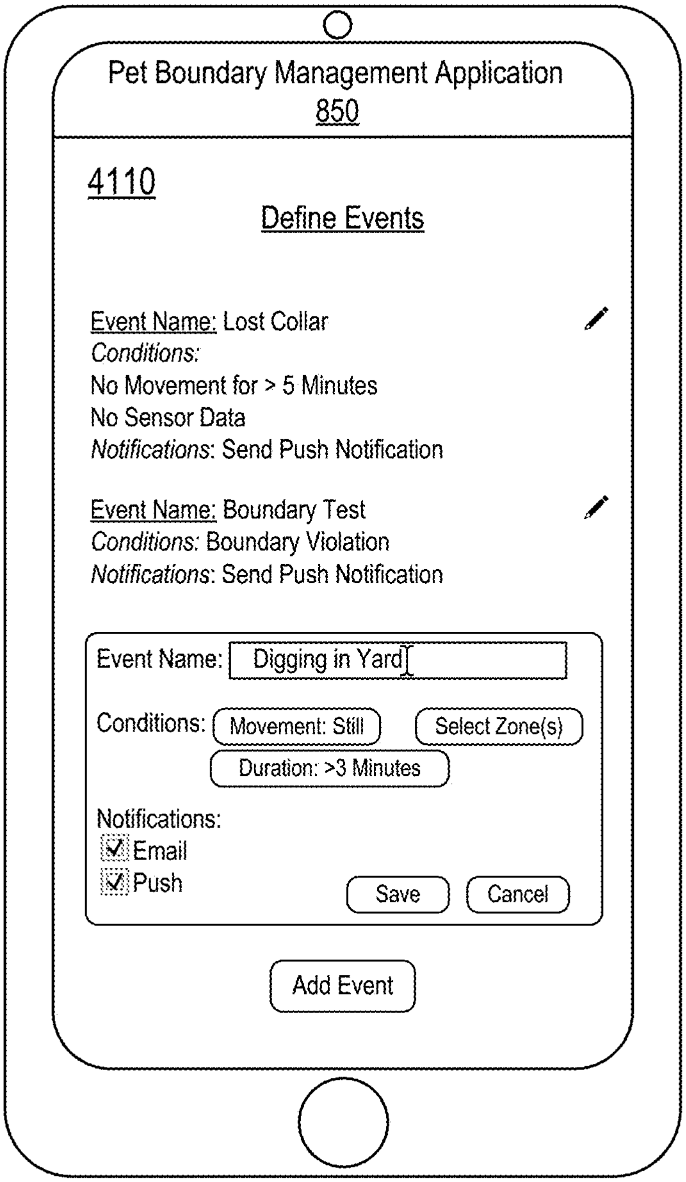
FIG. 46 illustrates an example event definition user interface useable within an animal boundary management application.
Figure 47:
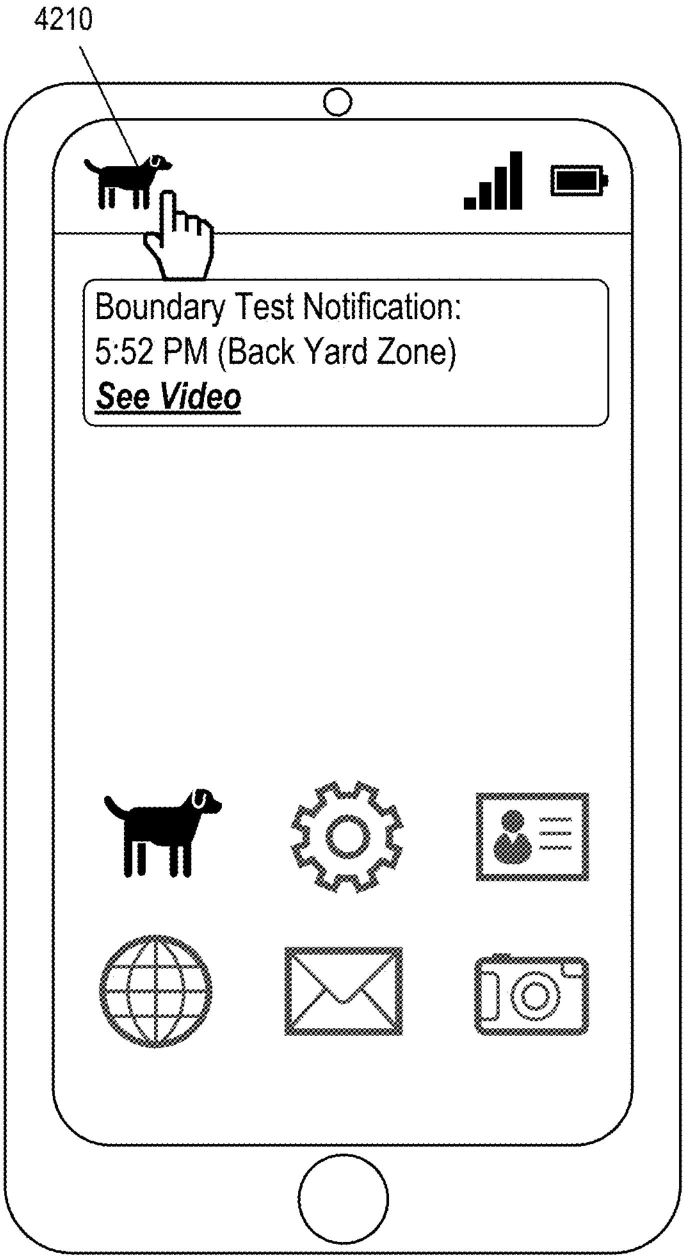
FIG. 47 illustrates an example event notification presentable on a user interface of a mobile device in accordance with example embodiments of the present disclosure.

FIGS. 46-47 illustrate user definition and receipt of various notifications that might be provided to the mobile device in response to actions detected at the animal tracking device, in example embodiments. FIG. 46 illustrates boundary management application 850 displaying an event definition user interface 4110 in which a user may define events, in response to which a notification is desired. In the example shown, a lost collar notification and a boundary test notification are previously defined, and a digging notification is being defined based on a set of parameters (e.g., based on movement, location in a zone, duration, and the like). Additionally, specific notification types, including an email notification and a push notification, are optionally presented.

FIG. 47 illustrates an example of a push notification within a general user interface 4210 of a mobile device. In the example shown, a push notification 4212 appears in the user interface, and is selectable by a user to see details regarding the specific notification event that has occurred. In the example shown, upon selection, the user may view a boundary test notification including a time at which the boundary test has occurred. Other notifications could be displayed as well. In addition, in some instances, the boundary management application 850 may be integrated with other home automation devices, and may enable a user to access video or still images from webcams, security cameras, or other smart devices at the same location where the notification occurred, thereby allowing a user who is away from home to view even more details of the event that was the subject of the notification. In the example shown, the notification 4212 includes details regarding the notification including a time of occurrence, as well as an embedded link to integrated video from a security camera or other IoT device configured such that it may include video coverage of the incident triggering the notification.

Figure 48:
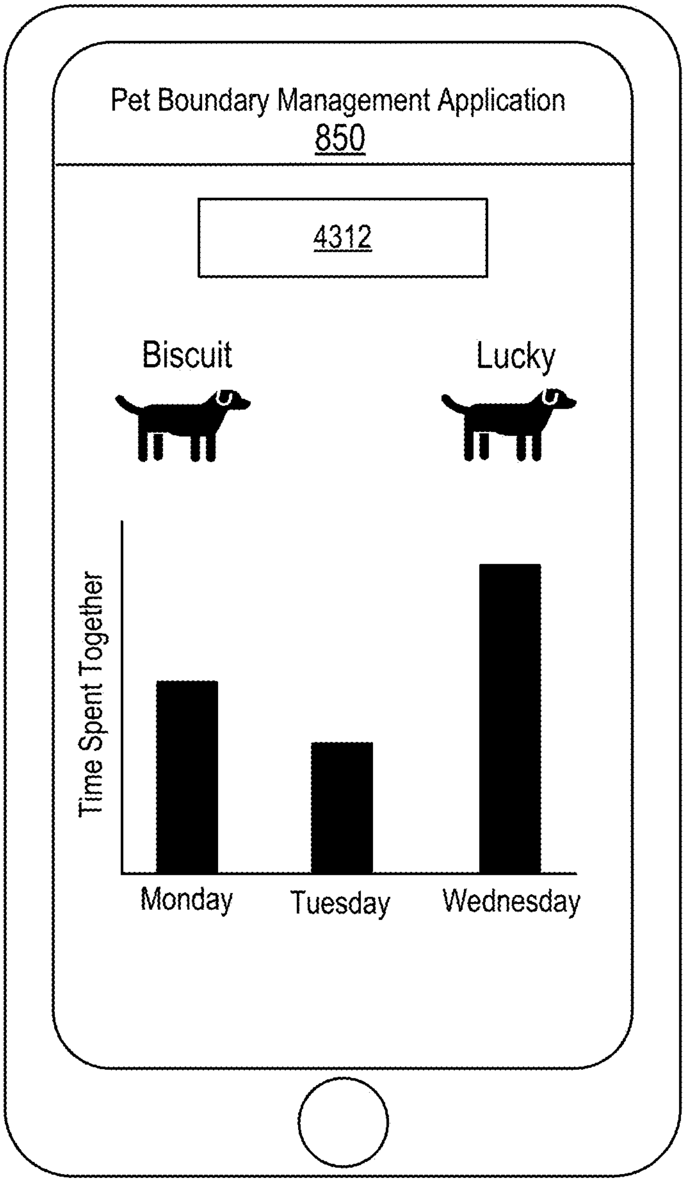
FIG. 48 illustrates an example graphical display of animal activity implemented within an animal boundary management application.
Figure 49:
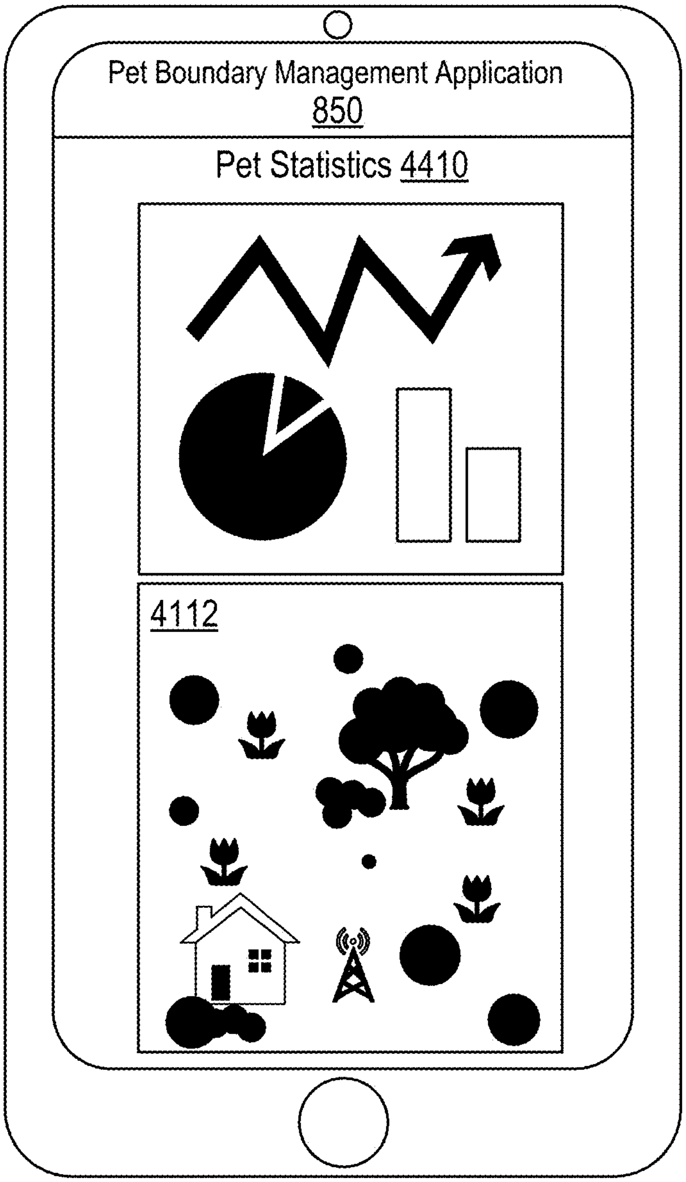
FIG. 49 illustrates an example animal statistics menu and heat map for an animal boundary management application.

FIG. 48 illustrates an example of an animal activity reporting user interface displayable by an animal boundary management application, such as animal boundary management application 850. The activity reporting user interface may generate visualizations based, at least in part, on the high accuracy historical positions logged by animal tracking device and synchronized to a network cloud 22 for display via a user interface of a user device, such as a mobile device 18, which may execute an application such as animal boundary management application 850.

As shown, animal boundary management application 850 includes a user interface 2310 that presents various statistics about a tracked animal. The various statistics may include, for example, time active, time resting, time outside, number of boundary incidents and stimulus events that have occurred, and the like. Such statistics can include activity data, feeding frequency, urination and defecation frequency, and other data showing data about the animal.

Further, the user interface 2410 includes a position frequency map 2412, or heat map, that illustrates historical positions of a tracked animal. The position frequency map may depict locations where the animal dwelled for a period of time, approached a boundary, and the like.

In the example shown, the position frequency map 2412 may depict, via different how often a tracked animal was logged at a specific location. In response to locations logged via an animal tracking device, the position frequency map 2412 may display an overlay of position information showing one or both of current position and historical positions, with historical positions being displayed differently depending on the frequency or duration of visit. For example, position frequency map 2412 may be a heat map, with positions visited for a longer period of time or more frequently shown using a different color or size of graphical element (shown as different sized circles in the schematic user interface as depicted).

Figure 50:
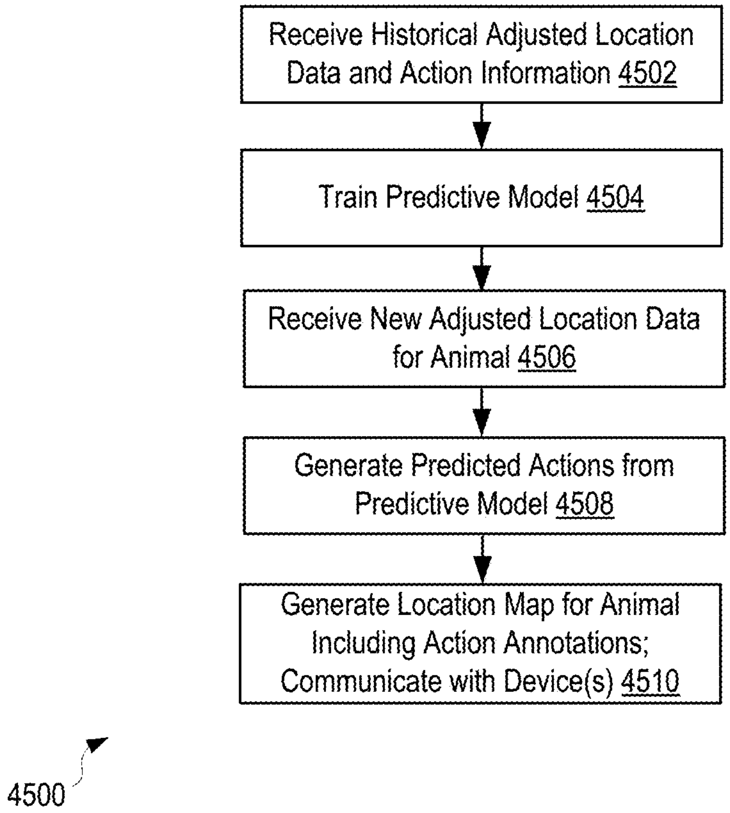
FIG. 50 is a flowchart of an example method of training a predictive model and predicting animal activity based on animal position.

In addition to historical reporting, in some examples, an animal tracking and containment system as described herein may be used to generate predictions regarding likely animal behavior. For example, based on position and movement information, as well as past observed behavior of an animal or other animals, predictions regarding whether the animal has visited a location to sleep, relieve itself, play, or the like may be generated and displayed to the user to provide additional context regarding animal activity. In some examples, a predictive activity model is used to analyze the highly accurate positional data provided from an animal tracking device that utilizes adjusted position information (e.g., via RTK or PPK technologies) to suggest that specific location, movement, and duration information may be associated with particular animal activities. As seen in FIG. 50, an example method 4500 is provided for training and utilization of such a predictive model.

In the example shown, the method 4500 includes receiving historical adjusted location data and action information (step 4502). Receiving historical adjusted location data and adding information may include receiving highly accurate location information from one or more animals, for example one or more similar animals (dogs of a particular size, activity level, and the like) as well as more specific activity information regarding animal activities that are correlative to the location data. Using such information, a predictive model may be trained (step 4504). The predictive model may be any type of model capable of determining correlations between position and activity, assuming that position and time data are provided as inputs and a model is trained to correlate to activities of that animal or similar animals (e.g., animals of a common breed, activity level, or which otherwise exhibit similar behavior characteristics as determined via either a supervised and/or unsupervised activity clustering method based on historical location and activity data). In such an example the method 4500 may further include receiving new adjusted location data for a particular animal (step 4506), which corresponds to non-annotated position information of an animal. The method 4500 includes generating one or more predicted actions from the predicted model, given the location information (step 4508). The actions of the animal may be used in a variety of ways. For example, predicted actions of the animal may be used to determine an anticipated boundary event at a virtual boundary, or may be used to present specific location information to a user on a mobile device. Accordingly, in some examples, a location map may be generated for the animal that includes likely or predicted action annotations (step 4510). Such likely or predicted action annotations may include areas where the animal is resting, testing a boundary, urinating, defecating, exercising, and the like. If such predictions are generated close in time to capture of the location information, such predicted actions may be returned to the animal tracking device itself, and may be used to generate stimulus actions in the event of undesirable activity (e.g., testing of virtual boundaries and the like).

Figure 51:
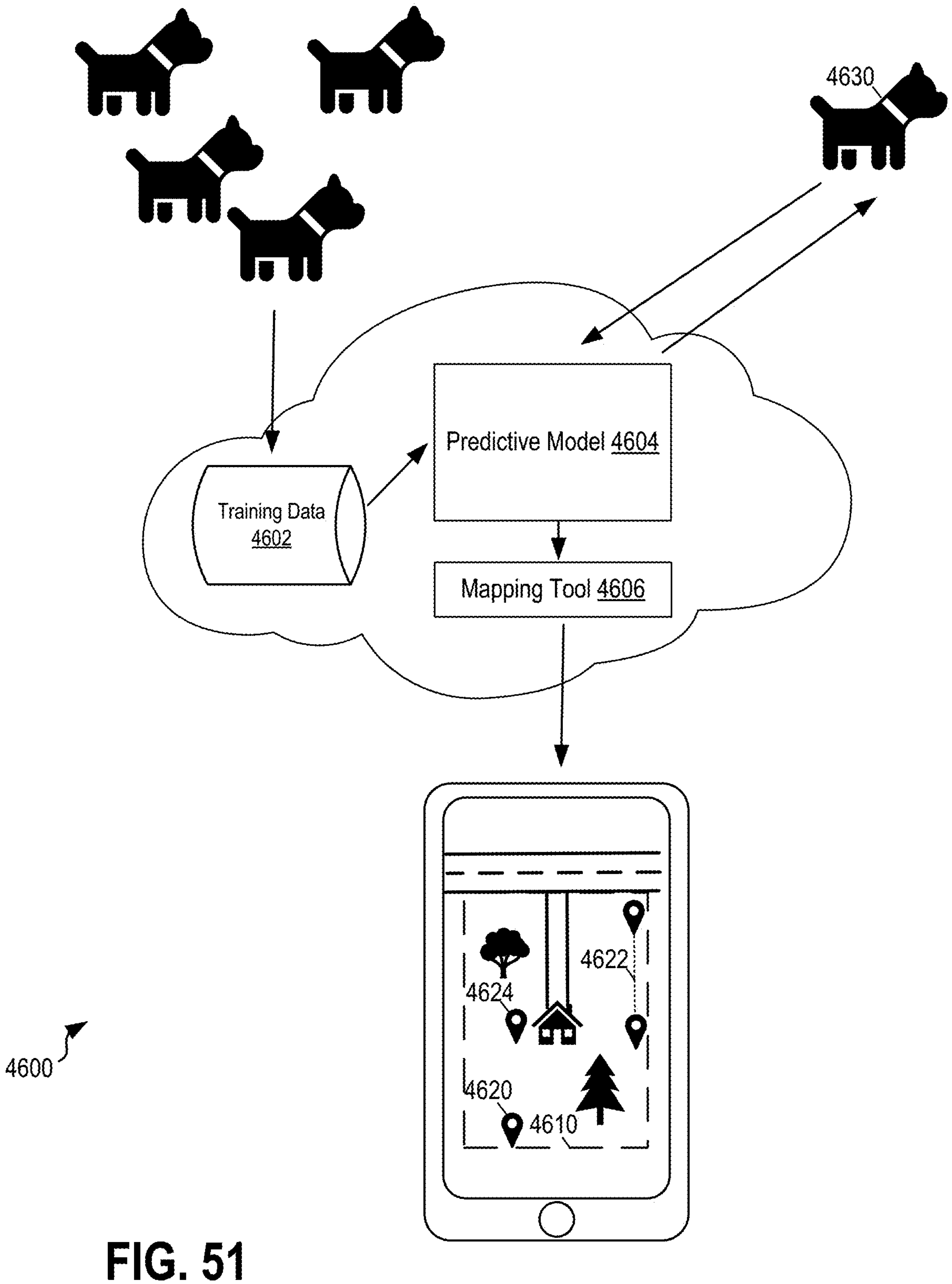
FIG. 51 is a schematic diagram of a process for training and use of a predictive model that may be used to determine animal tracking device activity and/or display predicted activity or behavior on a map interface.

An example implementation of the method 4500 is schematically depicted in FIG. 51, which depicts an animal tracking system 4600 in accordance with the present disclosure. For simplicity, the base station, virtual boundaries or containment areas, and the like are not depicted here but are understood to be included to enable highly accurate positional information to be captured. In the example shown, training data 4602 is obtained from one or more animals. The training data may correspond to location data that is associated with known activities of animals. The training data 4602 may be aggregated from each of the plurality of animals, and uploaded from respective angle tracking devices (e.g., collars) at a cloud or other server system, such as network cloud 22 of FIG. 1. The training data 4602 is used to generate a predictive model 4604. The predictive model 4604 may be implemented as a neural network or other predictive model, and receives location data from a particular animal for which activity predictions are desired.

In the example shown, the predicted activity information may, if contemporaneous with capture of animal location, return location information to an animal tracking device, such as the animal collar 4630, to generate stimulus events as appropriate based on the predicted action of the animal. Additionally, or in the alternative, upon request by a user mobile device 18, for example via animal boundary management application 850, a mapping tool 4606 may generate a portion of a user interface and provide that user interface to the mobile device 18 for display via the application 850. In examples, the user interface is adjustable to select a relevant time period during which the activities are displayed. Additionally, generalized analysis of animal location data may allow for characterization of the animal, for example to identify periods of high activity, low activity, and the like.

In the example shown, the mapping tool 4606 may generate a display for presentation at the mobile device depicting a satellite image of the property associated with the user account associated with the mobile device 18, including a depiction of the virtual boundary 4610 that is generated. In this example, specific animal activities and locations are presented, which correlate with positions where specific animal activity is inferred by the predictive model. For example, at location 4620, a predicted boundary test was detected (e.g., the animal moving toward and across the virtual boundary 4610) within a predetermined time period (e.g., within the last day, week, and the like). At path 4622, a pacing or running activity is detected. Such detection may be based, for example, on repeated movements along this particular path. Additionally, a relief activity 4624 is depicted, showing a likely location at which the animal released itself, either on a one time basis or repeatedly. Other embodiments may provide indicators where the animal prefers to sleep or play.

In some embodiments, the predictive model 4604 is stored in a remote server and accessible through the cloud. The predictive model 4604 receives position data from the animal collar 4630 over a wireless connection and determines the location of the animal collar 4630 based on the received position data. In some embodiments, the predictive model 4604 can be transmitted and stored on edge devices, such as the animal collar 4630. A processor of the animal collar 4630 can use the predictive model 4604 to determine its own location, then transmit the determined location in the form of data to a computing device, such as a mobile device that displays the location of the animal collar 4630 based on the received data corresponding to the determined location. In such instances, the predictive model 4604 is pretrained at a server prior to transmission to the computing device (e.g., collar), and retrained versions of the predictive model may be periodically updated and sent to provide updated predictions when executed at the computing device.

Figure 52:
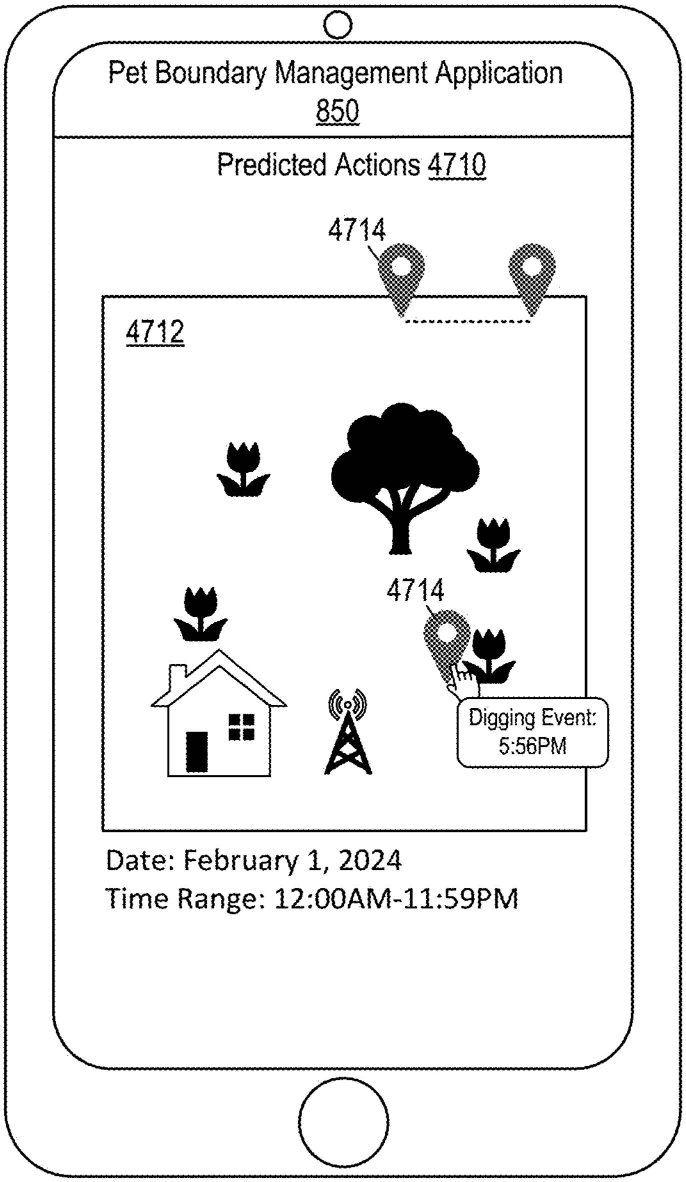
FIG. 52 illustrates an example mapping interface depicting predicted events in an outdoor context displayable within an animal boundary management application.
Figure 53:
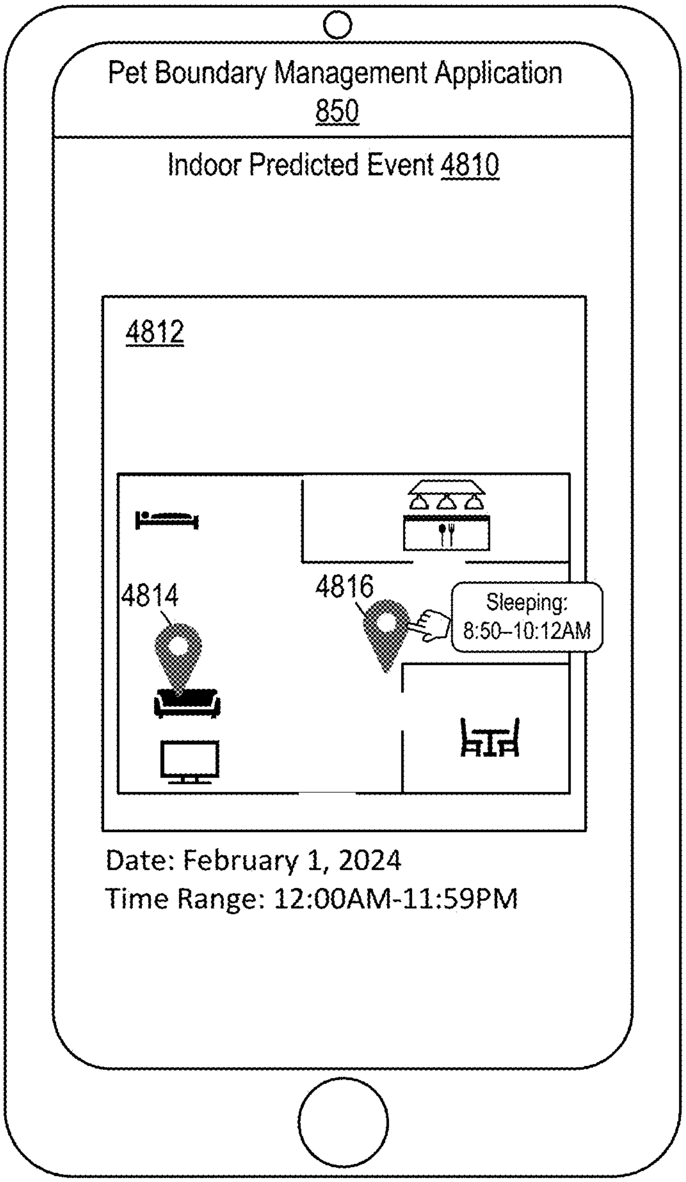
FIG. 53 illustrates an example mapping interface depicting predicted events in an indoor context displayable within an animal boundary management application.

FIGS. 52-53 illustrate a mobile device implementing a boundary management application 850 in which various notifications of predicted actions may be displayed to a user, in an outdoor (FIG. 52) and indoor (FIG. 53) context. In FIG. 52, a predicted actions interface 4710 is shown, depicting a region 4712 encompassed by a virtual boundary. The boundary management application 850 may present the predicted actions interface 4710 in response to selection of a particular date and time range that may be associated with activity of an animal that is tracked.

In the particular implementation shown, a set of predicted actions 4714, 4715 is illustrated. For example, a first predicted action 4714 may correspond to a digging event, for example based on the location lingering at a particular place, combined with other historical information associated with that location (e.g. near a flower bed) that may suggest a digging action rather than a sleeping action. A second predicted action 4715 may correspond to a pacing action, predicted in response to repeated visiting of a particular area and actions at that area, for example the location moving back and forth repeatedly along the virtual boundary. As illustrated, in response to user selection of a predicted action, such as predicted action 4714, additional details may be displayed indicating specific times at which the action occurred, further details regarding the type of action that is detected, and the like.

FIG. 53 illustrates a further predicted actions interface 4810 call depicting a region 4812 in which position tracking is performed using radio frequency technologies, such as in an indoor environment. As discussed previously, the radio frequency technologies may include ultra wideband (UWB) based positioning. In particular, boundary management application 850 presents a graphical depiction of an interior environment, with predicted actions 4814, 4816 illustrated. In the example shown, predicted action 4814 may correspond to detecting presence of the animal during the designated time period in a predefined keep out zone. In this example, the key out zone is illustrated as a position on a piece of furniture (e.g., a couch); however other definable keep out zones may be identified by a user as well. Still further, in circumstances where no keep out zone is predefined, the predicted action 4814 may nevertheless be considered a potential action triggering notification to the user based on other similar actions being predefined or predicted as undesirable to the user. For example, the user may have predefined other furniture on which keep out zones are established, or may set a rule indicating that an animal is not allowed on to any furniture. Accordingly, detection of the animal within 3D space at an elevated height within a room may indicate that a notification should be generated in the form of predicted action 4814.

Additionally, predicted action 4816 may be detected within the user designated time. Such a predicted action may correspond to one or more classifiable actions of the animal (in this case, sleeping). Classifiable actions may include various actions known to be performed by the animal, such as sleeping, eating, defecating, alerting at a front door, and the like. In examples, classification of the predicted action 4816 may be based on pattern of movement, historical classified actions, and various other sensor data obtained from an animal tracking device.

As noted above in conjunction with the discussion of heat maps within a user interface, the boundary management application 850 may be configured to display recurring predicted actions, or locations of predicted actions, and classification notes associated therewith.

Referring to FIGS. 50-53 generally, the predicted actions, and trends in the actions may be generated in response to tracking of fine-grained location data in both outdoor and indoor environments. That is, use of both satellite and or radiofrequency-based positioning may result in predicted actions, trends, and the like that may be used to analyze animal behavior, both with respect to specific actions that may be detected and predicted actions that may be inferred from positional data of the animal.

Furthermore, the particular user interface and feedback features as depicted are intended as exemplary rather than limiting. It is noted that additional features may also be incorporated into such user interfaces to achieve the tracking and display of relevant animals for particular users. For example, user interfaces for setup of virtual boundaries, selection of portions of virtual boundaries to be implemented as virtual gates or exclude zones, identification of settings regarding thresholds for generating warnings or other stimulus to an animal as the animal approaches a virtual boundary, selection and enabling or disabling of particular power conservation features, definitions of particular activities to initiate in response to an animal approaching a particular area, and the like, may all be defined via a user interface generated by the boundary management application 850. As such, a user may conveniently tailor the boundary, response, and performance of an animal tracking system to selectively take advantage of relevant ones of the features enabled by the high accuracy location provided in the animal tracking system described herein.

While particular uses of the technology have been illustrated and discussed above, the disclosed technology can be used with a variety of devices in accordance with many examples of the technology. The above discussion is not meant to suggest that the disclosed technology is only suitable for implementation with the specific collar structure or circuitry shown and described above. For example, while certain technologies described herein were primarily described in the context of an animal collar or animal tracking device, aspects of the present disclosure are not so limited.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., operations, memory arrangements, etc.) described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. An animal tracking system comprising:
- an animal tracking device comprising:
  - a housing affixable to an animal;
  - a memory positioned within the housing;
  - a processor operatively connected to the memory and positioned within the housing;
  - a global positioning unit communicatively connected to the processor; and
  - at least one wireless communication interface;
  - wherein the memory stores instructions which, when executed by the processor, cause the animal tracking device to perform:
    - determining a location of the animal tracking device relative to a virtual boundary based on first position data determined via the global positioning unit;
    - based on the animal tracking device satisfying a predetermined criterion:
      - obtaining observation data via the at least one wireless communication interface, the observation data being derived from positional data of a base station having positional accuracy greater than that of the global positioning unit and used, at the animal tracking device with the first position data determined via the global positioning unit, and
    - determining an adjusted location of the animal tracking device using the observation data obtained from the at least one wireless communication interface to correct the first position data determined via the global positioning unit, the adjusted location having improved accuracy relative to the location independently determined via the global positioning unit;

based on the animal tracking device not satisfying the predetermined criterion, operating at least a portion of the at least one wireless communication interface in a low power mode and using an unadjusted version of the location of the animal tracking device;

determining whether the first position data from the global positioning unit is receivable at the animal tracking device;

based, at least in part, on the first position data being receivable at the animal tracking device, determining a location of the animal tracking device based, at least in part, on the first position data; and based, at least in part, on the first position data not being receivable at the animal tracking device, performing at least one of (1) reducing frequency or ceasing receipt of the observation data or (2) deactivating the global positioning unit;

wherein the animal tracking device stores programmable information regarding a position of a virtual gate, and wherein the animal tracking device is configured to disable a stimulus activation when the animal tracking device passes through the virtual gate while the virtual gate is opened;

wherein the at least one wireless communication interface is configured to obtain second position data based on a relative position of the animal tracking device to one or more wireless communication devices, and wherein the instructions cause the animal tracking device to further perform:

based, at least in part, on the second position data being receivable at the animal tracking device, utilize the second position data and not the first position data to determine the position of the animal tracking device; and wherein the at least one wireless communication interface includes an ultra-wideband (UWB) interface configured to obtain the second position data.

2. The animal tracking system of claim 1, wherein the predetermined criterion includes at least one of:

a determination that the location independently determined via the global positioning unit is within a predetermined threshold distance of the virtual boundary; or a determination that a speed of the animal tracking device, combined with the location independently determined via the global positioning unit, indicates a likelihood of a virtual boundary crossing event.

3. The animal tracking system of claim 1, wherein the predetermined criterion is based, at least in part, on at least one of:

the location of the animal tracking device; or a determination that an activity level has exceeded a threshold.

4. The animal tracking system of claim 1, wherein the at least one wireless communication interface includes a cellular communication interface and/or a radio frequency (RF) communication interface configured to receive observation data from the base station.

5. The animal tracking system of claim 1, further comprising one or more base stations communicatively connectable to the animal tracking device and operable as the base station, and wherein the predetermined criterion includes at least one of:

a signal strength;

a determined positional accuracy of the one or more base stations;

environmental conditions at a location of the one or more base stations;

environmental conditions at a location of the animal tracking device; or a distance between the base station and the animal tracking device.

6. The animal tracking system of claim 5, wherein the predetermined criterion includes a determined positional accuracy of the one or more base stations.

7. The animal tracking system of claim 6, wherein the predetermined criterion includes environmental conditions at a location of at least one of (1) the one or more base stations or (2) the animal tracking device.

8. The animal tracking system of claim 1, wherein the animal tracking device is further caused to perform:

determining whether the animal tracking device has exited a predefined boundary through the virtual gate; and responsive to determining, via the second position data, that the animal tracking device has exited the predefined boundary through the virtual gate, activating the global positioning unit.

9. The animal tracking system of claim 1, wherein the animal tracking device is further configured to:

determine a location of the animal tracking device based, at least in part, on a position determined via the global positioning unit and observation data obtained from the base station; and initiate an alert at the animal tracking device in response to a determination of an alert event, wherein the alert event comprises at least one of (1) the animal tracking device moving toward the virtual boundary from within the virtual boundary, (2) the animal tracking device being within a threshold distance of the virtual boundary, (3) the animal tracking device crossing the virtual boundary, (4) the animal tracking device being positioned outside of the virtual boundary, (5) a predicted boundary event determined based on analysis of the location of the animal and past locations of the animal at a predictive behavioral model; or (6) the animal tracking device moving toward the virtual boundary from outside the virtual boundary in a case the virtual boundary is a boundary of a virtual exclusion zone.

10. The animal tracking system of claim 9, wherein the animal tracking device is further configured to:

receive an indication of at least one virtual exclusion zone positioned within the virtual boundary; and in response to the animal tracking device approaching or entering the virtual exclusion zone, initiate an alert.

11. The animal tracking system of claim 10, wherein the at least one virtual exclusion zone is defined as a three-dimensional volume having a vertical position and height.

12. The animal tracking system of claim 10, wherein the at least one virtual exclusion zone includes a region defined within the animal tracking device and being activated in accordance with a schedule.

13. The animal tracking system of claim 1, wherein the animal tracking device is further configured to:

determine a location of an animal tracking device based on a position determined via the global positioning unit of the animal tracking device;

obtain observation data from a second base station having positional accuracy greater than that of the global positioning unit to determine a second adjusted location;

determine whether the second adjusted location is within the virtual boundary; and in response to determining that the second adjusted location is outside of or has crossed the virtual boundary while the virtual boundary is in an active mode, initiating a stimulus at the animal tracking device.

14. The animal tracking system of claim 1, wherein the animal tracking device further includes an inertial measurement unit configured to estimate a current position of the animal tracking device based on historical position, speed, and direction.

15. The animal tracking system of claim 14, wherein the current position determined by the inertial measurement unit is used as the location of the animal tracking device in response to a determination that the first position data is not available.

16. The animal tracking system of claim 14, wherein the inertial measurement unit is configured to estimate the current position concurrently with at least one of the global positioning unit or the at least one wireless communication interface being operated in a low-power state.

17. The animal tracking system of claim 1, further comprising a user device communicatively connected to the animal tracking device, the user device comprising a mobile device having a mobile application installable thereon.

18. The animal tracking system of claim 17, wherein the mobile application, when executed on the mobile device, causes the mobile device to:

display a map user interface depicting the virtual boundary; and display one or more current or historical positions of the animal tracking device on the map user interface, wherein the map user interface comprises a heatmap depicting historical positions of the animal tracking device.

19. The animal tracking system of claim 1, wherein the at least one wireless communication interface is further configured to perform:

based on the location of the animal tracking device, reducing the frequency of determining adjusted locations of the animal tracking device.

20. The animal tracking system of claim 1, wherein obtaining observation data includes obtaining the observation data at a first frequency, and wherein the instructions further cause the animal tracking device to obtain further observation data at a second frequency slower than the first frequency.

21. The animal tracking system of claim 20, wherein obtaining the further observation data is performed based on the animal tracking device not satisfying the predetermined criterion.

22. The animal tracking system of claim 1, wherein the unadjusted version of the location of the animal tracking device is based on the location determined via the global positioning unit unmodified by the observation data.

23. A method of tracking an animal comprising:

determining, at a first time, a location of an animal tracking device relative to a virtual boundary based on first position data determined via a global positioning unit of the animal tracking device;

in response to the animal tracking device satisfying a predetermined criterion based at least in part on the location:

obtaining observation data via at least one wireless communication interface of the animal tracking device, the observation data being derived from positional data of a base station having positional accuracy greater than that of the global positioning unit and used at the animal tracking device with the first position data determined via the global positioning unit, and determining an adjusted location of the animal tracking device using the observation data obtained from the at least one wireless communication interface to correct the first position data determined via the global positioning unit, the adjusted location having improved accuracy relative to the location as independently determined via the global positioning unit, determining, at a second time, a second location of the animal tracking device relative to a virtual boundary based on position data determined via the global positioning unit of the animal tracking device, the second location being different from the location;

in response to the animal tracking device not satisfying the predetermined criterion based at least in part on the second location, operating at least a portion of the at least one wireless communication interface in a low power mode and using an unadjusted version of the location of the animal tracking device;

determining whether the first position data from the global positioning unit is receivable at the animal tracking device;

based, at least in part, on the first position data being receivable at the animal tracking device, determining a location of the animal tracking device based, at least in part, on the first position data;

based, at least in part, on the first position data not being receivable at the animal tracking device, performing at least one of (1) reducing frequency or ceasing receipt of the observation data or (2) deactivating the global positioning unit;

storing programmable information regarding a position of a virtual gate;

disabling a stimulus activation when the animal tracking device passes through the virtual gate while the virtual gate is opened;

obtaining second position data based on a relative position of the animal tracking device to one or more wireless communication devices, wherein the at least one communication interface includes an ultra-wideband (UWB) that obtains the second position data; and based, at least in part, on the second position data being receivable at the animal tracking device, utilizing the second position data and not the position data to determine the position of the animal tracking device.

24. An animal tracking system comprising:

an animal tracking device comprising:

a housing affixable to an animal;

a memory positioned within the housing;

a processor operatively connected to the memory and positioned within the housing;

a global positioning unit communicatively connected to the processor; and at least one wireless communication interface;

wherein the memory stores instructions which, when executed by the processor, cause the animal tracking device to perform:

determining a location of the animal tracking device relative to a virtual boundary based on first position data determined via the global positioning unit;

based on the animal tracking device satisfying a predetermined criterion:

obtaining observation data via the at least one wireless communication interface, the observation data being derived from positional data of a base station having positional accuracy greater than that of the global positioning unit and used, at the animal tracking device with the first position data determined via the global positioning unit, and determining an adjusted location of the animal tracking device using the observation data obtained from the at least one wireless communication interface to correct the first position data determined via the global positioning unit, the adjusted location having improved accuracy relative to the location independently determined via the global positioning unit;

based on the animal tracking device not satisfying the predetermined criterion, operating at least a portion of the at least one wireless communication interface in a low power mode and using an unadjusted version of the location of the animal tracking device;

determining whether the first position data from the global positioning unit is receivable at the animal tracking device;

based, at least in part, on the first position data being receivable at the animal tracking device, determining a location of the animal tracking device based, at least in part, on the first position data;

based, at least in part, on the first position data not being receivable at the animal tracking device, performing at least one of (1) reducing frequency or ceasing receipt of the observation data or (2) deactivating the global positioning unit;

wherein the animal tracking device stores programmable information regarding a position of a virtual gate, and wherein the animal tracking device is configured to disable a stimulus activation when the animal tracking device passes through the virtual gate while the virtual gate is opened; and a mobile application installable on a user device communicatively connected to the animal tracking device.

* * * * *